US012389398B2

(12) United States Patent
Khoshnevisan et al.

(10) Patent No.: US 12,389,398 B2
(45) Date of Patent: *Aug. 12, 2025

(54) TECHNIQUES FOR DYNAMICALLY AGGREGATING A PHYSICAL DOWNLINK SHARED CHANNEL FOR SEMI-PERSISTENT SCHEDULING

(71) Applicant: QUALCOMM Incorporated, San Diego, CA (US)

(72) Inventors: Mostafa Khoshnevisan, San Diego, CA (US); Seyed Ali Akbar Fakoorian, San Diego, CA (US); Seyedkianoush Hosseini, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,496

(22) Filed: Jun. 7, 2024

(65) Prior Publication Data

US 2024/0323962 A1  Sep. 26, 2024

Related U.S. Application Data

(63) Continuation of application No. 18/342,815, filed on Jun. 28, 2023, which is a continuation of application
(Continued)

(51) Int. Cl.
*H04W 72/04* (2023.01)
*H04W 72/0446* (2023.01)
(Continued)

(52) U.S. Cl.
CPC ... *H04W 72/1273* (2013.01); *H04W 72/0446* (2013.01); *H04W 72/23* (2023.01)

(58) Field of Classification Search
CPC ... H04L 5/0044; H04L 5/0064; H04L 5/0094; H04L 1/08; H04W 72/1273; H04W 72/0446; H04W 72/1289; H04W 72/042
See application file for complete search history.

(56) References Cited

U.S. PATENT DOCUMENTS 10,764,920 B2    9/2020  Yerramalli et al.
10,841,911 B2 *  11/2020  Park ............... H04L 5/0053
(Continued)

FOREIGN PATENT DOCUMENTS

CN    103548409 A    1/2014
WO    WO2019103809 A1    5/2019

OTHER PUBLICATIONS

NOKIA: "Introduction of NR URLLC Support", 3GPP TSG-RAN WG1 Meeting #99, R1-1913650, vol. RAN WG1, No. Reno, USA, Nov. 18, 2019-Nov. 22, 2019, Dec. 7, 2019, XP051838473, 51 Pages.
Qualcomm Incorporated: "Remaining Details on QCL", 3GPP TSG-RAN WG1 Meeting #93, R1-1807398 (Revision ofR1-1807351), 3rd Generation Partnership Project, Mobile Competence Centre, 650, Route Des Lucioles, F-06921 Sophia-Antipolis Cedex, France, vol. RAN WG1, No. Busan, Korea, May 21, 2018-May 25, 2018, May 20, 2018, pp. 1-9, XP051442590.
(Continued)

*Primary Examiner* — Lan-Huong Truong
(74) *Attorney, Agent, or Firm* — Holland & Hart LLP/Qualcomm

(57) ABSTRACT

Methods, systems, and devices for wireless communications are described that support various configurations that enable repetitions of physical downlink shared channel (PDSCH) transmission according to a semi-persistent scheduling (SPS) configuration. A user equipment (UE) may receive downlink control information (DCI) associated with a PDSCH configuration and an SPS configuration. The UE may determine a number of PDSCH repetitions for a PDSCH transmission (e.g., an SPS PDSCH transmission) based on a rule associated with a priority between time domain resource allocation (TDRA) entries and configured repetition factors in an SPS configuration or a PDSCH configuration. The repetition number may be included in the
(Continued)

TDRA entry, and the UE may receive a number of PDSCH repetitions based on a value of the PDSCH repetition number, or one instance of PDSCH may be received in each SPS period.

20 Claims, 19 Drawing Sheets

Related U.S. Application Data

No. 17/205,271, filed on Mar. 18, 2021, now Pat. No. 11,729,768.

(60) Provisional application No. 62/993,562, filed on Mar. 23, 2020.

(51) Int. Cl.
  *H04W 72/1273* (2023.01)
  *H04W 72/23* (2023.01)

(56) References Cited

U.S. PATENT DOCUMENTS

| | | | |
|---|---|---|---|
| 11,411,690 B2* | 8/2022 | Moon | H04B 17/382 |
| 11,729,768 B2 | 8/2023 | Khoshnevisan et al. | |
| 2019/0149365 A1* | 5/2019 | Chatterjee | H04W 76/11 370/329 |
| 2021/0037516 A1* | 2/2021 | Lyu | H04L 1/1854 |
| 2021/0298051 A1 | 9/2021 | Khoshnevisan et al. | |
| 2023/0422246 A1 | 12/2023 | Khoshnevisan et al. | |

OTHER PUBLICATIONS

Intel Corporation: "On Multi-TRP/Multi-Panel Transmission", 3GPP Draft, 3GPP TSG RAN WG1 Meeting #97, R1-1908653, 3rd Generation Partnership Project (3GPP), Mobile Competence Centre, 650, Route Des Lucioles, F-06921 Sophia-Antipolis Cedex, France vol. RAN WG1, No. Prague, CZ, Aug. 26, 2019-Aug. 30, 2019 Aug. 17, 2019 (Aug. 17, 2019), XP051765261, pp. 1-24, Passage "Alignment of PRG grid", paragraph [0002], pp. 6-9, 5.1 Separate HARQ-ACK feedback.

International Search Report and Written Opinion—PCT/US2021/023132—ISA/EPO—Jul. 5, 2021.

International Preliminary Report On Patentability—PCT/US2021/023132, the International Bureau of WIPO—Geneva, Switzerland, Oct. 6, 2022.

NOKIA: "Introduction of NR URLLC Support", 3GPP Draft, 3GPP TSG-RAN WG1 Meeting #99, RP-192639, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Dec. 7, 2019 (Dec. 7, 2019), XP051838473, 51 Pages, sections 5-6.

NTT DOCOMO et al., "Enhancements on Multi-TRP/panel Transmission," 3GPP Draft, 3GPP TSG RAN WG1 #98, R1-1909201, 3rd Generation Partnership Project (3GPP), Mobile Competence Centre, 650, Route Des Lucioles, F-06921, Sophia-Antipolis Cedex, France, vol. RAN WG1. No. Prague. CZ, Aug. 26, 2019-Aug. 30, 2019, Aug. 17, 2019 (Aug. 17, 2019), XP051765806, 36 pages, pp. 5-7 pp. 14-17.

* cited by examiner

TECHNIQUES FOR DYNAMICALLY AGGREGATING A PHYSICAL DOWNLINK SHARED CHANNEL FOR SEMI-PERSISTENT SCHEDULING

CROSS REFERENCE

The present application for patent is a continuation application which claims priority to U.S. patent application Ser. No. 18/342,815 by KHOSHNEVISAN et al., entitled, "TECHNIQUES FOR DYNAMICALLY AGGREGATING A PHYSICAL DOWNLINK SHARED CHANNEL FOR SEMI-PERSISTENT SCHEDULING" filed Jun. 28, 2023, which claims priority to U.S. application Ser. No. 17/205,271 by KHOSHNEVISAN et al., entitled "TECHNIQUES FOR DYNAMICALLY AGGREGATING A PHYSICAL DOWNLINK SHARED CHANNEL FOR SEMI-PERSISTENT SCHEDULING," filed Mar. 18, 2021, and claims the benefit of U.S. Provisional Patent Application No. 62/993,562 by KHOSHNEVISAN et al., entitled "TECHNIQUES FOR DYNAMICALLY AGGREGATING A PHYSICAL DOWNLINK SHARED CHANNEL FOR SEMI-PERSISTENT SCHEDULING," filed Mar. 23, 2020, each of which are assigned to the assignee hereof, and each of which are expressly incorporated by reference herein in its entirety.

FIELD OF TECHNOLOGY

The following relates generally to wireless communications and more specifically to techniques for dynamically aggregating a physical downlink shared channel (PDSCH) for semi-persistent scheduling (SPS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support communications that are semi-statically or semi-persistently configured by a base station. In such cases, downlink control information (DCI) may indicate the activation of a semi-persistent scheduling (SPS) configuration for communications on downlink channels. In some cases, however, configuring SPS communications may be complex.

SUMMARY

The described techniques relate to improved methods, systems, devices, and apparatuses that support techniques for dynamically aggregating a physical downlink shared channel (PDSCH) for semi-persistent scheduling (SPS). Generally, the described techniques provide for determining a number of repetitions of PDSCH for SPS communications. The number of PDSCH repetitions may be based on a repetition number indicated by downlink control information (DCI) or may be based on one or more semi-static configurations. In some examples, a user equipment (UE) may receive, via radio resource control (RRC) signaling, an indication of an SPS configuration (e.g., from a set of SPS configurations) and a PDSCH configuration. The UE may receive DCI associated with the SPS configuration (e.g., DCI that activates PDSCH transmissions for the SPS configuration or DCI that schedules one or more retransmissions of an SPS PDSCH). An expected number of instances of an SPS PDSCH (e.g., within an SPS periodicity given by the SPS configuration) may be determined using a rule that is based on a priority between various configurations, where the rule may be used to identify which configuration may be used to identify a number of PDSCH repetitions. For example, the number of PDSCH repetitions may be dynamically indicated using a time domain resource allocation (TDRA) field within DCI, where a TDRA entry in the TDRA field may indicate a repetition number that is used for the number of PDSCH repetitions. Here, the TDRA entry may be from a TDRA table including at least one TDRA entry that includes the repetition number. In some examples, a first aggregation factor may be configured by the PDSCH configuration and/or a second aggregation factor may be configured by the SPS configuration. In some cases (such as when the TDRA entry does not include the repetition number), one or both of the first aggregation factor or the second aggregation factor (if configured) may be used for determining the SPS PDSCH repetitions. In other cases, it may be determined that a single instance of PDSCH may be transmitted based on the various configurations, for example, as determined by the rule.

In some examples, a number of PDSCH repetitions for SPS PDSCH may be determined based on a configured repetition scheme for PDSCH and a number of configured transmission configuration indicator (TCI) states. When multiple TCI states are indicated (e.g., by DCI), then multiple (e.g., two or more) repetitions of the PDSCH may be included in a same slot in respective SPS periods. In some other cases, each SPS PDSCH may be repeated multiple (e.g., two or more) times per slot across a number of consecutive slots. Additionally or alternatively, the repetition scheme may be configured for a particular SPS configuration, and the repetitions of the PDSCH for SPS (when activated) may be based on the configuration-specific repetition scheme (e.g., as indicated by the SPS configuration, the PDSCH configuration, or both).

A method of wireless communication at a UE is described. The method may include receiving a PDSCH configuration and a SPS configuration from a set of one or more SPS configurations, receiving DCI associated with a PDSCH transmission for the SPS configuration, determining, based on a rule, a repetition number for a number of expected instances of the PDSCH transmission, where the rule is based on a priority between a TDRA entry indicated by the DCI and at least one of the PDSCH configuration or the SPS configuration, and receiving, within each SPS time period of a set of SPS time periods, one or more instances of the PDSCH transmission in accordance with the repetition number.

An apparatus for wireless communication at a UE is described. The apparatus may include a processor, memory coupled with the processor, and instructions stored in the memory. The instructions may be executable by the processor to cause the apparatus to receive a PDSCH configuration and a SPS configuration from a set of one or more SPS configurations, receive DCI associated with a PDSCH transmission for the SPS configuration, determine, based on a rule, a repetition number for a number of expected instances of the PDSCH transmission, where the rule is based on a priority between a TDRA entry indicated by the DCI and at least one of the PDSCH configuration or the SPS configuration, and receive, within each SPS time period of a set of SPS time periods, one or more instances of the PDSCH transmission in accordance with the repetition number.

Another apparatus for wireless communication at a UE is described. The apparatus may include means for receiving a PDSCH configuration and a SPS configuration from a set of one or more SPS configurations, receiving DCI associated with a PDSCH transmission for the SPS configuration, determining, based on a rule, a repetition number for a number of expected instances of the PDSCH transmission, where the rule is based on a priority between a TDRA entry indicated by the DCI and at least one of the PDSCH configuration or the SPS configuration, and receiving, within each SPS time period of a set of SPS time periods, one or more instances of the PDSCH transmission in accordance with the repetition number.

A non-transitory computer-readable medium storing code for wireless communication at a UE is described. The code may include instructions executable by a processor to receive a PDSCH configuration and a SPS configuration from a set of one or more SPS configurations, receive DCI associated with a PDSCH transmission for the SPS configuration, determine, based on a rule, a repetition number for a number of expected instances of the PDSCH transmission, where the rule is based on a priority between a TDRA entry indicated by the DCI and at least one of the PDSCH configuration or the SPS configuration, and receive, within each SPS time period of a set of SPS time periods, one or more instances of the PDSCH transmission in accordance with the repetition number.

Some examples of the method, apparatuses, and non-transitory computer-readable medium described herein, determining the repetition number based on the rule may further include operations, features, means, or instructions for determining that the PDSCH configuration excludes a configuration of a first aggregation factor or the SPS configuration excludes a configuration of a second aggregation factor, or a combination thereof.

In some examples of the method, apparatuses, and non-transitory computer-readable medium described herein, determining the repetition number based on the rule may include operations, features, means, or instructions for determining that the TDRA entry indicated by the DCI includes the repetition number, and identifying a number of repetitions of the PDSCH transmission based at least in part on a value of the repetition number, where two or more instances of the PDSCH transmission may be received based on the identified number of repetitions.

In some examples of the method, apparatuses, and non-transitory computer-readable medium described herein, the number of repetitions of the PDSCH transmission may be within a time period that may be less than or equal to the SPS time period.

In some examples of the method, apparatuses, and non-transitory computer-readable medium described herein, determining the repetition number based on the rule may include operations, features, means, or instructions for determining that the TDRA entry indicated by the DCI excludes the repetition number, and determining that the number of expected instances of the PDSCH transmission may be equal to one based on the TDRA entry excluding the repetition number, where a single instance of the PDSCH transmission may be received based on the number of expected instances.

In some examples of the method, apparatuses, and non-transitory computer-readable medium described herein, determining the repetition number based on the rule may include operations, features, means, or instructions for determining that the TDRA entry indicated by the DCI excludes the repetition number, identifying, based on the TDRA entry excluding the repetition number, a configuration of a first aggregation factor from the SPS configuration, and identifying a number of repetitions of the PDSCH transmission corresponding to a value of the first aggregation factor, where two or more instances of the PDSCH transmission may be received based on the identified number of repetitions.

In some examples of the method, apparatuses, and non-transitory computer-readable medium described herein, determining the repetition number based on the rule may include operations, features, means, or instructions for determining that the TDRA entry indicated by the DCI excludes the repetition number, determining, based on the TDRA entry excluding the repetition number, that the SPS configuration excludes a configuration of a first aggregation factor, identifying, based on the SPS configuration excluding the configuration of the first aggregation factor, a configuration of a second aggregation factor from the PDSCH configuration, and identifying a number of repetitions of the PDSCH transmission corresponding to a value of the second aggregation factor, where two or more instances of the PDSCH transmission may be received based on the identified number of repetitions.

In some examples of the method, apparatuses, and non-transitory computer-readable medium described herein, determining the repetition number based on the rule may include operations, features, means, or instructions for determining that the TDRA entry indicated by the DCI excludes the repetition number, determining, based on the TDRA entry excluding the repetition number, that the SPS configuration excludes a configuration of a first aggregation factor, determining, based on the SPS configuration excluding the configuration of the first aggregation factor, that the PDSCH configuration excludes a configuration of a second aggregation factor, and determining that the number of expected instances of the PDSCH transmission may be equal to one based on the TDRA entry excluding the repetition number, the SPS configuration excluding the configuration of the first aggregation factor, and the PDSCH configuration excluding the configuration of the second aggregation factor, where a single instance of the PDSCH transmission may be received based on the number of expected instances.

Some examples of the method, apparatuses, and non-transitory computer-readable medium described herein may further include operations, features, means, or instructions for identifying, from the SPS configuration, a configuration of a first aggregation factor, and identifying a number of repetitions of the PDSCH transmission corresponding to a value of the first aggregation factor, where two or more instances of the PDSCH transmission may be received based on the identified number of repetitions.

Some examples of the method, apparatuses, and non-transitory computer-readable medium described herein may further include operations, features, means, or instructions for determining that the SPS configuration excludes a configuration of a first aggregation factor, identifying, based on the SPS configuration excluding the configuration of the first aggregation factor, a configuration of a second aggregation factor from the PDSCH configuration, and identifying a number of repetitions of the PDSCH transmission corresponding to a value of the second aggregation factor, where two or more instances of the PDSCH transmission may be received based on the identified number of repetitions.

Some examples of the method, apparatuses, and non-transitory computer-readable medium described herein may further include operations, features, means, or instructions for determining that the SPS configuration excludes a configuration of a first aggregation factor, determining, based on the SPS configuration excluding the configuration of the first aggregation factor, that the PDSCH configuration excludes a configuration of a second aggregation factor, and determining that the number of expected instances of the PDSCH transmission may be equal to one based on the SPS configuration excluding the configuration of the first aggregation factor and the PDSCH configuration excluding the configuration of the second aggregation factor, where a single instance of the PDSCH transmission may be received based on the number of expected instances.

Some examples of the method, apparatuses, and non-transitory computer-readable medium described herein may further include operations, features, means, or instructions for identifying, from the PDSCH configuration, a configuration of a first aggregation factor, and identifying a number of repetitions of the PDSCH transmission corresponding to a value of the first aggregation factor, where two or more instances of the PDSCH transmission may be received based on the identified number of repetitions.

Some examples of the method, apparatuses, and non-transitory computer-readable medium described herein may further include operations, features, means, or instructions for determining that the number of expected instances of the PDSCH transmission may be equal to one based on the PDSCH configuration excluding a configuration of the first aggregation factor, where a single instance of the PDSCH transmission may be received based on the number of expected instances.

In some examples of the method, apparatuses, and non-transitory computer-readable medium described herein, the TDRA entry may be from a TDRA table that includes a set of TDRA entries, and where at least one TDRA entry of the set of TDRA entries includes the repetition number.

Some examples of the method, apparatuses, and non-transitory computer-readable medium described herein may further include operations, features, means, or instructions for receiving a configuration of the TDRA table via RRC signaling.

In some examples of the method, apparatuses, and non-transitory computer-readable medium described herein, the repetition number may be indicated by at least one column of the TDRA table.

In some examples of the method, apparatuses, and non-transitory computer-readable medium described herein, the DCI may have a cyclic redundancy check that may be scrambled by a configured scheduling radio network temporary identifier, the DCI including a new data indicator equal to zero, and where the DCI activates the SPS configuration.

In some examples of the method, apparatuses, and non-transitory computer-readable medium described herein, the DCI may have a cyclic redundancy check that may be scrambled by a configured scheduling radio network temporary identifier, the DCI including a new data indicator equal to one, and where the PDSCH transmission includes a retransmission of semi-persistently scheduled PDSCH scheduled by the DCI.

In some examples of the method, apparatuses, and non-transitory computer-readable medium described herein, the one or more instances of the PDSCH transmission may be received in a different slot time period of a set of consecutive slot time periods.

In some examples of the method, apparatuses, and non-transitory computer-readable medium described herein, the DCI may have a DCI format 1_1.

In some examples of the method, apparatuses, and non-transitory computer-readable medium described herein, the DCI may have a DCI format 1_2.

In some examples of the method, apparatuses, and non-transitory computer-readable medium described herein, the PDSCH configuration and the SPS configuration may be received via RRC signaling.

A method of wireless communication at a UE is described. The method may include receiving a SPS configuration from a set of one or more SPS configurations, identifying a repetition scheme configuration, receiving DCI associated with a PDSCH transmission for the SPS configuration, identifying, within the DCI, an indication of a set of transmission configuration indicator states, and receiving one or more repetitions of the PDSCH transmission based on the repetition scheme configuration, or the set of transmission configuration indicator states, or a combination thereof.

An apparatus for wireless communication at a UE is described. The apparatus may include a processor, memory coupled with the processor, and instructions stored in the memory. The instructions may be executable by the processor to cause the apparatus to receive a SPS configuration from a set of one or more SPS configurations, identify a repetition scheme configuration, receive DCI associated with a PDSCH transmission for the SPS configuration, identify, within the DCI, an indication of a set of transmission configuration indicator states, and receive one or more repetitions of the PDSCH transmission based on the repetition scheme configuration, or the set of transmission configuration indicator states, or a combination thereof.

Another apparatus for wireless communication at a UE is described. The apparatus may include means for receiving a SPS configuration from a set of one or more SPS configurations, identifying a repetition scheme configuration, receiving DCI associated with a PDSCH transmission for the SPS configuration, identifying, within the DCI, an indication of a set of transmission configuration indicator states, and receiving one or more repetitions of the PDSCH transmission based on the repetition scheme configuration, or the set of transmission configuration indicator states, or a combination thereof.

A non-transitory computer-readable medium storing code for wireless communication at a UE is described. The code may include instructions executable by a processor to receive a SPS configuration from a set of one or more SPS configurations, identify a repetition scheme configuration, receive DCI associated with a PDSCH transmission for the SPS configuration, identify, within the DCI, an indication of a set of transmission configuration indicator states, and receive one or more repetitions of the PDSCH transmission based on the repetition scheme configuration, or the set of transmission configuration indicator states, or a combination thereof.

Some examples of the method, apparatuses, and non-transitory computer-readable medium described herein may further include operations, features, means, or instructions for identifying a number of the one or more repetitions of a PDSCH based on the PDSCH excluding a configuration of a first aggregation factor or the semi-persistent scheduling configuration excluding a configuration of a second aggregation factor, or a combination thereof.

In some examples of the method, apparatuses, and non-transitory computer-readable medium described herein, receiving the one or more repetitions of the PDSCH transmission may include operations, features, means, or instructions for receiving the one or more repetitions of the PDSCH transmission within a same slot time period, the slot time period occurring within each SPS time period of a set of SPS time periods.

In some examples of the method, apparatuses, and non-transitory computer-readable medium described herein, receiving the one or more repetitions of the PDSCH transmission may include operations, features, means, or instructions for receiving the one or more repetitions of the PDSCH transmission within a set of consecutive slot time periods occurring within each SPS time period of a set of SPS time periods, each slot time period of the set of consecutive slot time periods including two repetitions of the PDSCH transmission.

Some examples of the method, apparatuses, and non-transitory computer-readable medium described herein may further include operations, features, means, or instructions for identifying, from the SPS configuration, a configuration of a first aggregation factor, and identifying a number of the set of consecutive slot time periods that corresponds to a value of the first aggregation factor.

Some examples of the method, apparatuses, and non-transitory computer-readable medium described herein may further include operations, features, means, or instructions for receiving a PDSCH configuration, determining that the SPS configuration excludes a configuration of a first aggregation factor, identifying, based on the SPS configuration excluding the configuration of the first aggregation factor, a configuration of a second aggregation factor from the PDSCH configuration, and identifying a number of the set of consecutive slot time periods that corresponds to a value of the second aggregation factor.

In some examples of the method, apparatuses, and non-transitory computer-readable medium described herein, identifying the repetition scheme configuration may include operations, features, means, or instructions for identifying the repetition scheme configuration based on the received SPS configuration.

In some examples of the method, apparatuses, and non-transitory computer-readable medium described herein, identifying the repetition scheme configuration may include operations, features, means, or instructions for receiving a PDSCH configuration, and identifying the repetition scheme configuration based on the received PDSCH configuration, where the SPS configuration excludes the repetition scheme configuration.

In some examples of the method, apparatuses, and non-transitory computer-readable medium described herein, the set of transmission configuration indicator states includes two transmission configuration indicator states.

In some examples of the method, apparatuses, and non-transitory computer-readable medium described herein, the repetition scheme configuration may include a first frequency division multiplexing scheme, a second frequency division multiplexing scheme, or a time division multiplexing scheme.

A method of wireless communication at a base station is described. The method may include transmitting, to a UE, a PDSCH configuration and a SPS configuration from a set of one or more SPS configurations, transmitting, to the UE, DCI associated with a PDSCH transmission for the SPS configuration, determining, based on a rule, a repetition number for a number of expected instances of the PDSCH transmission, where the rule is based on a priority between a TDRA entry indicated by the DCI and at least one of the PDSCH configuration or the SPS configuration, and transmitting, within each SPS time period of a set of SPS time periods, one or more instances of the PDSCH transmission in accordance with the repetition number.

An apparatus for wireless communication at a base station is described. The apparatus may include a processor, memory coupled with the processor, and instructions stored in the memory. The instructions may be executable by the processor to cause the apparatus to transmit, to a UE, a PDSCH configuration and a SPS configuration from a set of one or more SPS configurations, transmit, to the UE, DCI associated with a PDSCH transmission for the SPS configuration, determine, based on a rule, a repetition number for a number of expected instances of the PDSCH transmission, where the rule is based on a priority between a TDRA entry indicated by the DCI and at least one of the PDSCH configuration or the SPS configuration, and transmit, within each SPS time period of a set of SPS time periods, one or more instances of the PDSCH transmission in accordance with the repetition number.

Another apparatus for wireless communication at a base station is described. The apparatus may include means for transmitting, to a UE, a PDSCH configuration and a SPS configuration from a set of one or more SPS configurations, transmitting, to the UE, DCI associated with a PDSCH transmission for the SPS configuration, determining, based on a rule, a repetition number for a number of expected instances of the PDSCH transmission, where the rule is based on a priority between a TDRA entry indicated by the DCI and at least one of the PDSCH configuration or the SPS configuration, and transmitting, within each SPS time period of a set of SPS time periods, one or more instances of the PDSCH transmission in accordance with the repetition number.

A non-transitory computer-readable medium storing code for wireless communication at a base station is described. The code may include instructions executable by a processor to transmit, to a UE, a PDSCH configuration and a SPS configuration from a set of one or more SPS configurations, transmit, to the UE, DCI associated with a PDSCH transmission for the SPS configuration, determine, based on a rule, a repetition number for a number of expected instances of the PDSCH transmission, where the rule is based on a priority between a TDRA entry indicated by the DCI and at least one of the PDSCH configuration or the SPS configuration, and transmit, within each SPS time period of a set of SPS time periods, one or more instances of the PDSCH transmission in accordance with the repetition number.

In some examples of the method, apparatuses, and non-transitory computer-readable medium described herein, determining the repetition number based on the rule may include operations, features, means, or instructions for determining that the TDRA entry indicated by the DCI includes the repetition number, and identifying a number of repetitions of the PDSCH transmission based at least in part on a value of the repetition number, where two or more instances of the PDSCH transmission may be transmitted based on the identified number of repetitions.

In some examples of the method, apparatuses, and non-transitory computer-readable medium described herein, the number of repetitions of the PDSCH transmission may be within a time period that may be less than or equal to the SPS time period.

In some examples of the method, apparatuses, and non-transitory computer-readable medium described herein, determining the repetition number based on the rule may include operations, features, means, or instructions for determining that the TDRA entry indicated by the DCI excludes the repetition number, and determining that the number of expected instances of the PDSCH transmission may be equal to one based on the TDRA entry excluding the repetition number, where a single instance of the PDSCH transmission may be transmitted based on the number of expected instances.

In some examples of the method, apparatuses, and non-transitory computer-readable medium described herein, determining the repetition number based on the rule may include operations, features, means, or instructions for determining that the TDRA entry indicated by the DCI excludes the repetition number, where the SPS configuration includes a configuration of a first aggregation factor, and identifying a number of repetitions of the PDSCH transmission corresponding to a value of the first aggregation factor, where two or more instances of the PDSCH transmission may be transmitted based on the identified number of repetitions.

In some examples of the method, apparatuses, and non-transitory computer-readable medium described herein, determining the repetition number based on the rule may include operations, features, means, or instructions for determining that the TDRA entry indicated by the DCI excludes the repetition number, where the SPS configuration excludes a configuration of a first aggregation factor and the PDSCH configuration includes a configuration of a second aggregation factor, and identifying a number of repetitions of the PDSCH transmission corresponding to a value of the second aggregation factor, where two or more instances of the PDSCH transmission may be transmitted based on the identified number of repetitions.

In some examples of the method, apparatuses, and non-transitory computer-readable medium described herein, determining the repetition number based on the rule may include operations, features, means, or instructions for determining that the TDRA entry indicated by the DCI excludes the repetition number, where the SPS configuration excludes a configuration of a first aggregation factor and the PDSCH configuration excludes a configuration of a second aggregation factor, and determining that the number of expected instances of the PDSCH transmission may be equal to one based on the TDRA entry excluding the repetition number, the SPS configuration excluding a configuration of the first aggregation factor, and the PDSCH configuration excluding a configuration of the second aggregation factor, where a single instance of the PDSCH transmission may be transmitted based on the number of expected instances.

In some examples of the method, apparatuses, and non-transitory computer-readable medium described herein, determining the repetition number based on the rule may include operations, features, means, or instructions for configuring a first aggregation factor as part of the SPS configuration, and identifying a number of repetitions of the PDSCH transmission corresponding to a value of the first aggregation factor, where two or more instances of the PDSCH transmission may be transmitted based on the identified number of repetitions.

In some examples of the method, apparatuses, and non-transitory computer-readable medium described herein, determining the repetition number based on the rule may include operations, features, means, or instructions for determining that the SPS configuration excludes a configuration of a first aggregation factor, where the PDSCH configuration includes a configuration of a second aggregation factor, and identifying a number of repetitions of the PDSCH transmission corresponding to a value of the second aggregation factor, where two or more instances of the PDSCH transmission may be transmitted based on the identified number of repetitions.

In some examples of the method, apparatuses, and non-transitory computer-readable medium described herein, determining the repetition number based on the rule may include operations, features, means, or instructions for determining that the number of expected instances of the PDSCH transmission may be equal to one based on the SPS configuration excluding a configuration of a first aggregation factor and the PDSCH configuration excluding a configuration of a second aggregation factor, where a single instance of the PDSCH transmission may be transmitted based on the number of expected instances.

In some examples of the method, apparatuses, and non-transitory computer-readable medium described herein, determining the repetition number based on the rule may include operations, features, means, or instructions for configuring a first aggregation factor as part of the PDSCH configuration, and identifying a number of repetitions of the PDSCH transmission corresponding to a value of the first aggregation factor, where two or more instances of the PDSCH transmission may be transmitted based on the identified number of repetitions.

In some examples of the method, apparatuses, and non-transitory computer-readable medium described herein, determining the repetition number based on the rule may include operations, features, means, or instructions for determining that the number of expected instances of the PDSCH transmission may be equal to one based on the PDSCH configuration excluding a configuration of a first aggregation factor, where a single instance of the PDSCH transmission may be transmitted based on the number of expected instances.

In some examples of the method, apparatuses, and non-transitory computer-readable medium described herein, the TDRA entry may be an entry from a TDRA table that includes a set of TDRA entries, and where at least one TDRA entry of the set of TDRA entries includes the repetition number.

In some examples of the method, apparatuses, and non-transitory computer-readable medium described herein, the DCI includes a new data indicator equal to zero, and where the DCI activates the SPS configuration.

In some examples of the method, apparatuses, and non-transitory computer-readable medium described herein, the DCI includes a new data indicator equal to one, and where the PDSCH transmission includes a retransmission of semi-persistently scheduled PDSCH scheduled by the DCI.

A method of wireless communication at a base station is described. The method may include transmitting, to a UE, a SPS configuration from a set of one or more SPS configurations, configuring a repetition scheme for the UE, transmitting, to the UE, DCI associated with a PDSCH transmission for the SPS configuration, configuring, within the DCI, an indication of a set of transmission configuration indicator states, and transmitting one or more repetitions of the PDSCH transmission to the UE based on the configured repetition scheme, or the set of transmission configuration indicator states, or a combination thereof.

An apparatus for wireless communication at a base station is described. The apparatus may include a processor, memory coupled with the processor, and instructions stored in the memory. The instructions may be executable by the processor to cause the apparatus to transmit, to a UE, a SPS configuration from a set of one or more SPS configurations, configure a repetition scheme for the UE, transmit, to the UE, DCI associated with a PDSCH transmission for the SPS configuration, configure, within the DCI, an indication of a set of transmission configuration indicator states, and transmit one or more repetitions of the PDSCH transmission to the UE based on the configured repetition scheme, or the set of transmission configuration indicator states, or a combination thereof.

Another apparatus for wireless communication at a base station is described. The apparatus may include means for transmitting, to a UE, a SPS configuration from a set of one or more SPS configurations, configuring a repetition scheme for the UE, transmitting, to the UE, DCI associated with a PDSCH transmission for the SPS configuration, configuring, within the DCI, an indication of a set of transmission configuration indicator states, and transmitting one or more repetitions of the PDSCH transmission to the UE based on the configured repetition scheme, or the set of transmission configuration indicator states, or a combination thereof.

A non-transitory computer-readable medium storing code for wireless communication at a base station is described. The code may include instructions executable by a processor to transmit, to a UE, a SPS configuration from a set of one or more SPS configurations, configure a repetition scheme for the UE, transmit, to the UE, DCI associated with a PDSCH transmission for the SPS configuration, configure, within the DCI, an indication of a set of transmission configuration indicator states, and transmit one or more repetitions of the PDSCH transmission to the UE based on the configured repetition scheme, or the set of transmission configuration indicator states, or a combination thereof.

In some examples of the method, apparatuses, and non-transitory computer-readable medium described herein, transmitting the one or more repetitions of the PDSCH transmission may include operations, features, means, or instructions for transmitting the one or more repetitions of the PDSCH transmission within a same slot time period, the slot time period occurring within each SPS time period of a set of SPS time periods.

In some examples of the method, apparatuses, and non-transitory computer-readable medium described herein, transmitting the one or more repetitions of the PDSCH transmission may include operations, features, means, or instructions for transmitting the one or more repetitions of the PDSCH transmission within a set of consecutive slot time periods occurring within each SPS time period of a set of SPS time periods, each slot time period of the set of consecutive slot time periods including two repetitions of the PDSCH transmission.

Some examples of the method, apparatuses, and non-transitory computer-readable medium described herein may further include operations, features, means, or instructions for configuring a first aggregation factor as part of the SPS configuration, where a number of the set of consecutive slot time periods corresponds to a value of the first aggregation factor.

Some examples of the method, apparatuses, and non-transitory computer-readable medium described herein may further include operations, features, means, or instructions for configuring, based on the SPS configuration excluding a configuration of a first aggregation factor, a second aggregation factor as part of a PDSCH configuration, and transmitting the PDSCH configuration to the UE, where a number of the set of consecutive slot time periods corresponds to a value of the second aggregation factor.

Some examples of the method, apparatuses, and non-transitory computer-readable medium described herein may further include operations, features, means, or instructions for transmitting an indication of the configured repetition scheme as part of the SPS configuration.

Some examples of the method, apparatuses, and non-transitory computer-readable medium described herein may further include operations, features, means, or instructions for transmitting, to the UE, a PDSCH configuration including an indication of the configured repetition scheme, where the SPS configuration excludes the indication of the configured repetition scheme.

DETAILED DESCRIPTION

Figure 1:
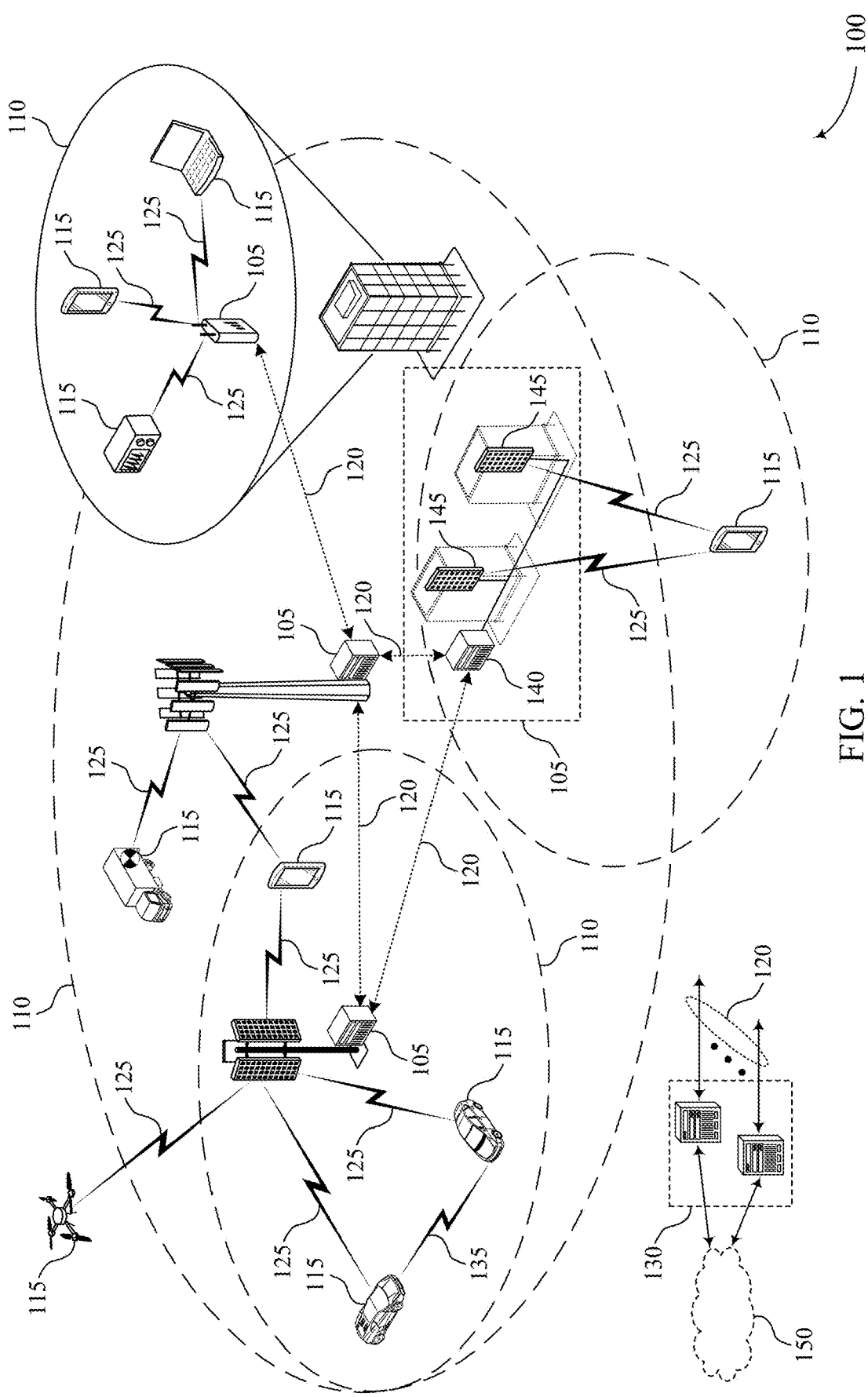
FIG. 1 illustrates an example of a wireless communications system that supports techniques for dynamically aggregating a physical downlink shared channel (PDSCH) for semi-persistent scheduling (SPS) in accordance with aspects of the present disclosure.

In some wireless communications systems, a base station may use semi-static configurations and dynamic grants to allocate resources to a user equipment (UE) for communications with the base station. Semi-static configurations may be transmitted in radio resource control (RRC) signaling and may in some cases be referred to as configured grants (e.g., for uplink transmission) or semi-persistent scheduling (SPS) (e.g., for downlink transmissions). In addition to the semi-static signaling that configures such communications, dynamic signaling (e.g., downlink control information (DCI)) may be used to activate or release a UE's operation using the semi-statically configured communications. For instance, once activated (e.g., by DCI having a cyclic redundancy check (CRC) scrambled with a configured scheduling radio network temporary identifier (CS-RNTI) and including a new data indicator (NDI) equal to zero), a UE may operate using downlink SPS until the base station releases the configuration, at which point the UE may utilize or revert to another communications scheme. In addition, multiple SPS configurations may be available to a UE, and the base station may semi-statically indicate a particular SPS configuration to the UE. As such, the downlink SPS transmissions (e.g., on a physical downlink shared channel (PDSCH)) may be transmitted periodically in accordance with the indicated SPS configuration.

Retransmission of SPS transmissions (e.g., downlink transmissions that may have failed a decoding attempt by the UE and are re-sent by the base station) may also be scheduled using dynamic signaling from the base station. For instance, DCI having a CRC scrambled by the CS-RNTI and including an NDI equal to one may schedule one or more retransmissions of an SPS transmission. The UE may accordingly receive a retransmission of a PDSCH that was previously transmitted as part of the SPS configuration based on the received DCI.

Systems may also support various configurations that enable repetitions of PDSCH (e.g., across consecutive slots). For example, a first aggregation factor may be generally configured for PDSCH through an RRC configuration and a second aggregation factor for PDSCH associated with SPS communications may be configured through another RRC configuration. As multiple different SPS configurations may be possible, the second aggregation factor may also be specific to a particular SPS configuration that is activated via DCI. In addition, the number of PDSCH repetitions may be dynamically indicated using a time domain resource allocation (TDRA) field within the DCI. In such cases, the TDRA field within the DCI may indicate a TDRA entry in a table (e.g., a TDRA table configured via RRC signaling), where some TDRA entries in the table may indicate a number of repetitions for PDSCH. Thus, while PDSCH repetitions may be semi-statically configured and indicated (e.g., through the PDSCH configuration and/or the SPS configuration), the use of the repetitions indicated by the TDRA entries may provide a more dynamic scheme for scheduling repetitions of PDSCH. However, given the multiple configurations for PDSCH repetitions, in addition to multiple SPS configurations, use of TDRA entries that indicate repetitions may add complexity in determining how many repetitions of PDSCH will be received at a UE.

As described herein, a number of PDSCH repetitions for SPS PDSCH may be determined based on the TDRA entries indicated by DCI, the configuration of aggregation factors in one or more RRC configurations, or a combination thereof. For instance, PDSCH repetitions may be determined based on a rule that may be based on a priority between a TDRA entry indicated by DCI and repetition factors in an SPS configuration or a PDSCH configuration, or both. Put another way, when a configured TDRA table includes at least one TDRA entry including a repetition number (e.g., RepNumR16), a UE or base station may determine a number of PDSCH repetitions (e.g., within each SPS period) based on whether a particular TDRA entry indicated by DCI includes the repetition number. Specifically, in cases where the repetition number is included in the TDRA entry, then a number of PDSCH repetitions may be based on a value of the repetition number. In other cases, if the TDRA entry indicated in the DCI does not include the repetition number, one instance of PDSCH may be received in each SPS period. Additionally or alternatively, if the TDRA entry indicated by the DCI (e.g., in the TDRA field) does not include the repetition number, then the number of PDSCH repetitions in an SPS period may be based on one or more of a aggregation factor in the SPS configuration (e.g., if configured) or an aggregation factor in the PDSCH configuration (e.g., if configured). As described herein, the use of a rule to determine SPS PDSCH repetitions may utilized for PDSCH transmissions activated by DCI (e.g., for a particular SPS configuration) and for PDSCH retransmissions scheduled by DCI.

In other examples, multiple TCI states may be indicated by a TCI field of the DCI that activates an SPS configuration, and a number of SPS PDSCH repetitions may be based on the configuration of a number of TCI indicated by the TCI field and a configured repetition scheme (such as a time division multiplexing (TDM) scheme of a UE). In particular, the TCI field of the DCI may indicate multiple (e.g., two or more) TCI states, and the UE may be configured with a particular TDM scheme (e.g., TDMSchemeA). Based on these configurations, the repetitions of the SPS PDSCH may include repetitions of the PDSCH within a same slot, and the SPS PDSCH may be included in one slot per SPS period. An aggregation factor in the SPS RRC configuration and an aggregation factor in the PDSCH RRC configuration may not be configured for the PDSCH repetitions. For example, the repetitions may only be based on the number of TCI states and the configured TDM scheme. Additionally or alternatively, the SPS PDSCH repetitions may be repeated within a slot and also repeated across multiple consecutive slots (e.g., where each slot include multiple repetitions of the PDSCH). For instance, the SPS PDSCH repetitions may include 2N repetitions in N consecutive slots per SPS period (e.g., where each slot includes two instances of the PDSCH). Here, N may be based on the aggregation factor in the SPS RRC configuration, if configured. If not configured, N may be based on the aggregation factor in the PDSCH RRC configuration. In some examples, the UE may be configured with a TDM scheme that is specific to an SPS RRC configuration.

Aspects of the disclosure are initially described in the context of wireless communications systems. For example, aspects of the disclosure are described in the context of communications between a base station and a UE. Aspects of the disclosure are further illustrated by and described with reference to apparatus diagrams, SPS PDSCH configurations, system diagrams, and decision flowcharts that relate to techniques for dynamically aggregating a physical downlink shared channel for SPS.

FIG. 1 illustrates an example of a wireless communications system 100 that supports techniques for dynamically aggregating a physical downlink shared channel for SPS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (CNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHZ), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. A HARQ process may include a combination of error detection (e.g., using a cyclic redundancy check (CRC)), forward error correction (FEC), and retransmission (e.g., automatic repeat request (ARQ)). HARQ processes may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a base station 105 may use semi-static configurations and dynamic grants among other techniques for allocating resources to a UE 115. Semi-static configurations may be transmitted in RRC signaling, which may configure SPS for a UE 115. In addition to the semi-static signaling that configures such communications, dynamic signaling (e.g., DCI) may be used to activate or release communications. For instance, once activated (e.g., by DCI having a CRC scrambled with a CS-RNTI and including an NDI equal to zero), an SPS configuration may be activated for the UE 115. In addition, multiple SPS configurations may be available to a UE 115, and the base station 105 may semi-statically indicate a particular SPS configuration to the UE 115. PDSCH transmissions may be transmitted periodically in accordance with the indicated SPS configuration. Retransmission of SPS transmissions may also be scheduled using dynamic signaling from the base station 105. For instance, using DCI having a CRC scrambled by the CS-RNTI and including an NDI equal to one, a retransmission of an SPS PDSCH may be scheduled.

Wireless communications system 100 may also support various configurations that enable repetitions of PDSCH (e.g., across consecutive slots). For example, a first aggregation factor may be configured for PDSCH through an RRC configuration and a second aggregation factor for PDSCH associated with SPS communications may be configured through another RRC configuration. In addition, the number of PDSCH repetitions may be dynamically indicated to a UE 115 using a TDRA field within DCI and the use of the repetitions indicated by the TDRA entries (e.g., where a configured TDRA table may include at least one TDRA entry that includes a repetition number) may provide a more dynamic scheme for repetitions of PDSCH.

In some examples, a number of PDSCH repetitions for SPS PDSCH may be determined based on the TDRA entries indicated by DCI, the configuration of aggregation factors in one or more RRC configurations, or a combination thereof. For instance, PDSCH repetitions may be determined based on a rule that may be based on a priority between a TDRA entry and configured repetition factors in an SPS configuration or a PDSCH configuration, or both. For example, in cases where the repetition number is included in the TDRA entry, then a number of PDSCH repetitions may be based on a value of the repetition number. In other cases, if the TDRA entry indicated in the DCI does not include the repetition number, one instance of PDSCH may be received in each SPS period. Additionally or alternatively, if the TDRA entry indicated by the DCI (e.g., in the TDRA field) does not include the repetition number, then the number of PDSCH repetitions in an SPS period may be based on an aggregation factor in the SPS configuration (e.g., if configured), an aggregation factor in the PDSCH configuration, or both.

Figure 2:
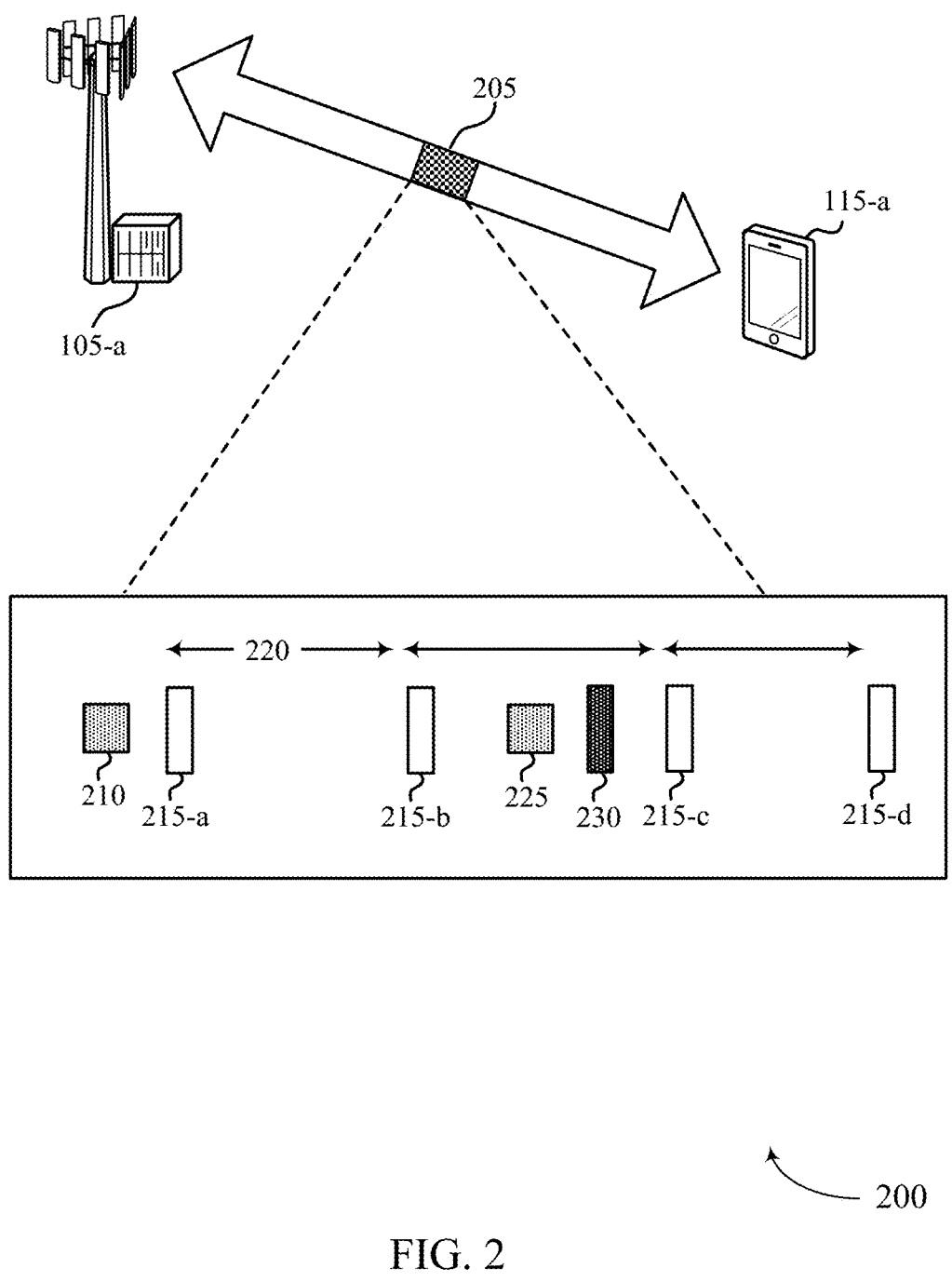
FIG. 2 illustrates an example of a wireless communications system that supports techniques for dynamically aggregating a PDSCH for SPS in accordance with aspects of the present disclosure.

FIG. 2 illustrates an example of a wireless communications system 200 that supports techniques for dynamically aggregating a physical downlink shared channel for SPS in accordance with aspects of the present disclosure. In some examples, wireless communications system 200 may implement aspects of wireless communications system 100. For example, wireless communications system 200 may include communications between a UE 115-*a* and a base station 105-*a*, which may be examples of a UE 115 and a base station 105 described with reference to FIG. 1.

Wireless communications system 200 may support multiple SPS configurations to increase system capacity and reduce control signaling overhead. The base station 105-*a* may transmit, to the UE 115-*a*, a physical downlink control channel transmission 205 containing DCI (e.g., scheduling DCI 210). The base station 105-*a* may also transmit other control signaling such as RRC signaling. The control channel transmission, for example, an RRC message, may include various RRC configured parameters such as sps-ConfigIndex, periodicity, etc. In addition, an SPS configuration may be activated by the control information, such as by DCI 210, and the DCI 210 may include a number of CRC bits scrambled with a CS-RNTI, and a NDI of the DCI 210 may be equal to zero or one (e.g., NDI=0 may be indicated for activating an SPS configuration, whereas NDI=1 may be used for scheduling SPS retransmissions).

Because wireless communications system 200 may use a number of different SPS configurations, the base station 105-*a* may repurpose a HARQ process number field in the DCI 210 for indicating an activated SPS configuration (e.g., sps-ConfigIndex). The SPS configuration may include a number of transmission locations for SPS PDSCH 215 that may be configured according to the periodicity 220. The base station 105-*a* may also use the HARQ process number field to indicate a HARQ process ID for retransmitting data. However, in cases where SPS is activated, the HARQ process ID or HARQ process number may be a function of the time domain such that HARQ process IDs may be incremented based on the periodicity 220 of the SPS. Each SPS PDSCH 215 may be associated with a different HARQ process ID, for example, SPS PDSCH 215-*a* may be associated with a HARQ process ID of 0, SPS PDSCH 215-*b* may be associated with a HARQ process ID of 1, SPS PDSCH 215-*c* may be associated with a HARQ process ID of 2, and SPS PDSCH 215-*d* may be associated with a HARQ process ID of 3.

For a retransmission associated with an SPS PDSCH 215, an initial transmission may be an SPS PDSCH, but if the SPS PDSCH is not successfully decoded, the base station may not be able to send an activating DCI 210 for a retransmission (e.g., the base station may not send a DCI with NDI=0 that activates SPS). Instead, the base station 105-*a* may send a scheduling DCI 225 that may schedule retransmission 230 with CRC scrambled with CS-RNTI and NDI=1.

Wireless communications system 200 may support data transmissions that span multiple slots using an SPS configuration that includes slot aggregation. In some implementations, the UE 115-*a* may receive an aggregation factor as part of a PDSCH configuration (e.g., pdsch-AggregationFactor in pdsch-config) in consecutive slots in cases where the UE 115-*a* receives DCI that schedules transmissions or retransmissions of PDSCH 215, or in cases where the UE 115-*a* receives DCI that activates SPS. In each of the consecutive slots, a UE 115-*a* may receive a PDSCH transmission occasion (e.g., a repetition of the same transport block). In some cases, the same symbol allocation (as indicated in the TDRA field of the DCI) may be applied across the pdsch-AggregationFactor in consecutive slots. In such cases, the pdsch-AggregationFactor may have values of 2, 4, 8, etc. In some cases, the UE 115-*a* may receive a dynamic grant that may schedule a non-SPS PDSCH transmission, activate SPS, or schedule a retransmission of an SPS PDSCH.

In some other implementations, each SPS configuration may be separately configured with an SPS configuration that includes slot aggregation (e.g., separately configured with pdsch-AggregationFactor in sps-config). For example, the pdsch-AggregationFactor may be specific to a given SPS configuration of the multiple SPS configurations that may be configured. In cases where a given SPS configuration is activated (e.g., activated using a DCI with CRC scrambled by CS-RNTI and NDI=0), the value for pdsch-AggregationFactor in sps-config for the activated SPS configuration may be used for the number of slots used for repetitions. In some other cases where a given SPS configuration is activated (e.g., activated using a DCI with CRC scrambled by CS-RNTI and NDI=0), the value for the pdsch-AggregationFactor in pdsch-config may be used, and is common to all SPS configurations and non-SPS PDSCH transmissions. For retransmissions of SPS PDSCH (e.g., activated using a DCI with CRC scrambled by CS-RNTI and NDI=1), the pdsch-AggregationFactor in pdsch-config may be used.

In some examples, the number of repetitions of PDSCH 215 (e.g., PDSCH repetitions) may be indicated dynamically using a TDRA field within DCI, such as scheduling DCI 210. In such cases, the TDRA may indicate a TDRA entry in a table (e.g., pdsch-TimeDomainAllocationList), where some TDRA entries in the table may indicate a number of repetitions for PDSCH transmissions (e.g., in a column of pdsch-TimeDomainAllocationList). However, given the multiple configurations for PDSCH repetitions, in addition to multiple SPS configurations (which may be configured according to a different number of PDSCH repetitions), the repeated TDRA entries may add complexity in determining how many repetitions of PDSCH will be received at the UE 115-*a*.

To improve scheduling and overall communications efficiency between the base station 105-*a* and the UE 115-*a*, the number of PDSCH repetitions for SPS PDSCH may be determined based on the configuration of the TDRA entries in DCI 210, the configuration of aggregation factors in one or more RRC configurations (e.g., sps-config or pdsch-config), or a combination thereof. For instance, as described herein, the number of repetitions of PDSCH 215 may be based on a repetition number indicated by DCI or based on one or more semi-static configurations. As an example, the UE 115-*a* may receive, via RRC signaling, an indication of an SPS configuration (e.g., from a set of SPS configurations) and a PDSCH configuration. The UE 115-*a* may receive DCI associated with the SPS configuration (e.g., DCI that activates PDSCH transmissions for the SPS configuration or DCI that schedules one or more retransmissions of an SPS PDSCH 215). An expected number of instances (e.g., repetitions) of an SPS PDSCH 215 (e.g., within a periodicity 220 (an SPS periodicity)) may be determined using a rule that is based on a priority between various configurations. In some examples, the rule may be used to identify which configuration may be used to identify the number of PDSCH repetitions. For example, the number of PDSCH repetitions may be indicated dynamically using a TDRA field within DCI, and a TDRA entry in the TDRA field may include a repetition number that is used for the number of PDSCH repetitions. For example, a number of repetitions in TDRA field may provide or otherwise indicate the number of PDSCH repetitions. In some examples, the TDRA entry may be from a TDRA table including at least one TDRA entry that includes the repetition number. In some examples, different TDRA entries may include different repetition numbers. For example, a first entry in a TDRA table may indicate a first number of repetitions (e.g., four repetitions), a second entry may indicate a second number of repetitions (e.g., three repetitions), and a third entry may not indicate a number of repetitions (e.g., the third entry may not include a repetition number).

In some examples, a first aggregation factor may be configured through the PDSCH configuration and/or a second aggregation factor may be configured through the SPS configuration. In some cases (such as when the TDRA entry does not include the repetition number), one or both of the first aggregation factor or the second aggregation factor (e.g., if configured) may be used for determining repetitions of the SPS PDSCH 215. In other cases, a single instance of PDSCH 215 may be transmitted based on the various configurations, for example, as determined by the rule.

In some examples, a number of PDSCH repetitions for SPS PDSCH 215 may be determined based on a configured repetition scheme for PDSCH and a number of indicated TCI states in the DCI. In examples in which multiple TCI states are indicated (e.g., by DCI), then multiple (e.g., two) repetitions of the PDSCH 215 may be included in a same slot (e.g., in respective SPS periods). In other cases, each SPS PDSCH 215 may be repeated multiple (e.g., two) times per slot across a number of consecutive slots. Additionally or alternatively, the repetition scheme may be configured for a particular SPS configuration, and the repetitions of the PDSCH 215 for SPS (e.g., when activated) may be based on the configuration-specific repetitions scheme (e.g., as indicated by one or both of the SPS configuration or the PDSCH configuration).

FIGS. 3A, 3B, 3C, and 3D illustrate examples of SPS PDSCH configurations 300-*a*, 300-*b*, 300-*c*, and 300-*d* that support techniques for dynamically aggregating a PDSCH for SPS in accordance with aspects of the present disclosure. In some examples, SPS PDSCH configurations 300-*a* through 300-*d* may implement aspects of wireless communications systems 100 and 200. For example, the SPS PDSCH configurations 300-*a* through 300-*d* may be configured by a base station 105 and may be implemented by a UE 115 described with reference to FIGS. 1 and 2.

Figure 3A:
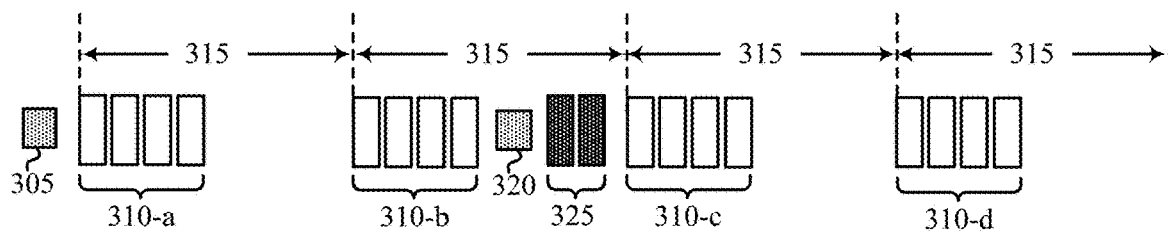
FIGS. 3A, 3B, 3C, and 3D illustrate examples of SPS PDSCH configurations that support techniques for dynamically aggregating a PDSCH for SPS in accordance with aspects of the present disclosure.

In some cases, such as in the example of SPS PDSCH configuration 300-*a* illustrated by FIG. 3A, a wireless communications system may support slot aggregation for SPS transmissions. The slot aggregation may be associated with a given slot aggregation factor as part of a PDSCH configuration (e.g., pdsch-AggregationFactor in pdsch-config). A UE may receive transmissions over a PDSCH scheduled by DCI format 1_1, 1_2, etc. In some cases, the UE may receive the DCI in a physical downlink control channel (PDCCH) with a number of CRC bits scrambled by C-RNTI, MCS-C-RNTI, or CS-RNTI with NDI=1. In such cases, the same symbol allocation may be applied across consecutive slots associated with the pdsch-AggregationFactor. In some other cases, the UE may receive PDSCH scheduled by DCI format 1_1 or 1_2 in a PDCCH with CRC scrambled by CS-RNTI with NDI=0, or in a PDSCH scheduled without corresponding PDCCH transmission using an SPS configuration activated by DCI format 1_1 or 1_2. In such cases, the same symbol allocation may be applied across the pdsch-AggregationFactor in sps-config (if pdsch-AggregationFactor is configured for the activated sps-config) or in pdsch-config (if pdsch-AggregationFactor is not configured for the activated sps-config). In some other cases, the symbol allocation may be indicated by the DCI for consecutive slots.

The activating DCI 305 may activate the SPS configuration, and may indicate sps-ConfigIndex=0 using a repurposed HARQ process field in the DCI 305. In addition, the pdsch-AggregationFactor in sps-config (e.g., for sps-ConfigIndex=0) is 4 repetitions (e.g., 4 SPS PDSCH repetitions 310-*a*, 310-*b*, 310-*c*, and 310-*d*). Further, the pdsch-AggregationFactor in pdsch-config is 2 and may be RRC configured (e.g., 2 slots 325 configured for PDSCH transmission, which may be used for a retransmission of the SPS PDSCH).

Figure 3B:
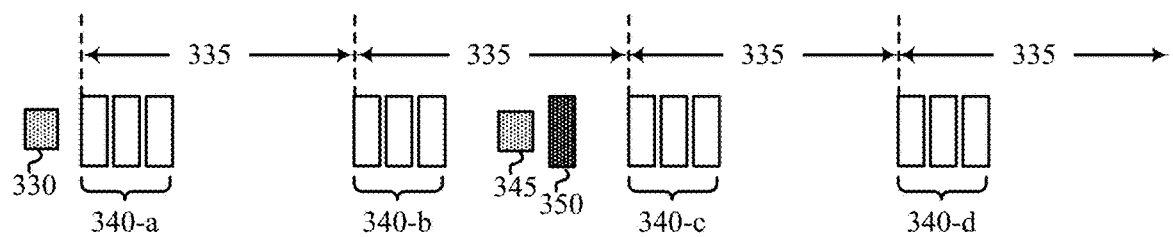

In some examples, SPS PDSCH configuration 300-*b* described in FIG. 3B may implement dynamic PDSCH (e.g., non-SPS PDSCH) that may include a dynamic indication in DCI 305 that indicates of the number of repetitions for the PDSCH in consecutive slots. In some examples, the number of PDSCH repetitions may be indicated dynamically using a time domain resource allocation (TDRA) field within the DCI 305. In such cases, the TDRA field indicates a TDRA entry from a table (e.g., pdsch-TimeDomainAllocationList), where some TDRA entries in the table may indicate a number of repetitions for PDSCH (e.g., in a column of pdsch-TimeDomainAllocationList). In such examples, each TDRA entry may include a number of repetitions (e.g., RepNumR16) in addition to other parameters such as K0, SLIV, mapping type, etc. In cases where an entry is not configured to include a number of repetitions, a single repetition may be assumed. In some examples, the TDRA field in the DCI 305 indicates one TDRA entry, and the number of repetitions may be indicated by the DCI 305 through TDRA field. The TDRA table may be used for a number of DCI formats, including DCI formats 1_1, 1_2, etc. In cases where the TDRA entry (e.g., an entry in the TDRA table) is configured with a number of repetitions (e.g., RepNumR16), the SPS PDSCH may be transmitted or received based on the configured number of repetitions.

As described herein, at least one TDRA table entry is configured with a number of repetitions (e.g., a repetition number, RepNumR16). That is, the TDRA table includes a plurality of TDRA entries, and at least one TDRA entry may include the repetition number. If DCI indicates a TDRA entry that includes a number of repetitions, that number of repetitions may be used for the number of PDSCH repetitions. In other cases, the DCI may indicate that a TDRA entry that does not contain a number of repetitions, and the UE may assume a single repetition. In some other cases, for example, when multiple SPS configurations and RRC parameters (e.g., pdsch-AggregationFactor) are configured per each sps-config, the network may use a different TDRA table than that used for non-SPS PDSCH applications.

In some examples, the UE may derive a time duration from a periodicity 315 corresponding to the sps-config, and the UE may use the periodicity to derive a number of repetitions. In such examples, the UE may not be expected to be indicated by a TDRA entry with RepNumR16 repetitions larger than a time duration derived by a periodicity P obtained from the corresponding sps-config.

In some examples, one or more TDRA entry may include a value indicating number of repetitions (e.g., RepNumR16 or another repetition number), and SPS PDSCH may be activated by information in DCI (e.g., DCI that has CRC scrambled with CS-RNTI with NDI=0). A TDRA field included in the DCI may activate the SPS configuration, and may indicate an entry in pdsch-TimeDomainAllocationList containing a number of repetitions for the PDSCH. In such cases, the number of repetitions may be indicated by RepNumR16 or another number of repetitions. In other cases, the UE may assume a single repetition, such as when the TDRA entry does not include RepNumR16. In some cases, the aggregation factor pdsch-AggregationFactor may be RRC configured per SPS occasion of the multiple SPS occasions. In some other cases, for example, in cases where an entry contains a configured number of repetitions, neither the aggregation factor configured in sps-config nor in the pdsch-config may be used, irrespective of the TDRA entry.

In another example, the number of repetitions may be indicated by a value of the aggregation factor (e.g., pdsch-AggregationFactor) in the activated SPS configuration. In such examples, the TDRA field in the DCI that activates the SPS configuration may not indicate the configured number of repetitions as an entry in pdsch-TimeDomainAllocationList. For example, the aggregation factor (e.g., pdsch-AggregationFactor indicated in sps-config and in pdsch-config) may not be used in cases where the indicated TDRA entry includes the configured number of repetitions. In other examples, the pdsch-AggregationFactor in sps-config may be used. In some other examples the pdsch-AggregationFactor may not be in sps-config that is used, and the pdsch-AggregationFactor in pdsch-config may instead be used. In yet other cases, the number of repetitions may be 1 (e.g., in cases where the RRC parameter pdsch-AggregationFactor is not configured in the activated sps-config or pdsch-config).

In some aspects, the number of repetitions may be indicated by the aggregation factor in the SPS configuration. If pdsch-AggregationFactor is not configured in sps-config, the number of repetitions may be indicated by pdsch-AggregationFactor in pdsch-config. In yet other cases, the number of repetitions may be assumed to be one where pdsch-AggregationFactor is not configured in sps-config or pdsch-config that are activated. In such cases, the determination of the number of repetitions may not be based on the TDRA table or a TDRA entry containing a configured number of repetitions.

In some examples, a wireless communications system may schedule retransmissions associated with an initial SPS PDSCH transmission. For retransmission of an SPS PDSCH (e.g., that is scheduled by DCI with CRC scrambled with CS-RNTI with NDI=1). In some cases, a TDRA field included in the DCI 320 that schedules the retransmission, and indicates an entry in pdsch-TimeDomainAllocationList containing a number of repetitions (e.g., RepNumR16). In other cases (e.g., in cases where an entry does not include the configured number of repetitions), the UE may assume a single repetition for the retransmission. The aggregation factor in some examples may be RRC configured per SPS occasion (e.g., individually for each SPS occasion) of the multiple SPS occasions. In some other cases, for example, where an entry contains the configured number of repetitions, the pdsch-AggregationFactor included in sps-config and in pdsch-config may not be used (e.g., irrespective of the indicated TDRA entry).

In some examples, an aggregation factor for the PDSCH (e.g., pdsch-AggregationFactor) may be configured as part of a PDSC configuration of an SPS configuration (e.g., per SPS-Config). In some cases, if a UE is configured with a higher layer parameter associated with the number of repetitions of the PDSCH (e.g., repetitionNumber) or if the UE is configured by another higher layer parameter (e.g., repetitionScheme) associated with one or more multiplexing schemes (e.g., ' fdmSchemeA', ' fdmSchemeB,' 'tdmSchemeA'), the UE may not expect to be configured with the aggregation factor (e.g., pdsch-AggregationFactor). In such cases, the aggregation factor (e.g., pdsch-AggregationFactor) may not be configured as part of a PDSCH configuration or as part of an SPS configuration.

In some other cases, the number of repetitions for a retransmission may be determined by an aggregation factor in a PDSCH configuration (e.g., if pdsch-config is configured). For example, if the pdsch-AggregationFactor is not configured in the sps-config and is also not configured in pdsch-config, the number of repetitions for the retransmission may be assumed to be 1. In this case, the determination of the number of repetitions may not be based on the TDRA table or a TDRA entry containing the number of repetitions.

In the example of FIG. 3B, an activating DCI 330 may indicate a TDRA entry with a number of repetitions (e.g., RepNumR16=3, such that each SPS PDSCH location 340 has 3 repetitions). The activating DCI 330 may in some cases repurpose a HARQ process field to indicate a value for sps-ConfigIndex, for example, where sps-ConfigIndex=0. In examples where sps-ConfigIndex=0, the pdsch-AggregationFactor in the SPS configuration may be equal to 4 (e.g., 4 SPS PDSCH locations 340-*a*. 340-*b*, 340-*c*, 330-*d*). In the example of FIG. 3B, each SPS PDSCH location may be associated with a different HARQ process ID. For example, PDSCH location 340-*a* may be associated with HARQ process ID 0, PDSCH location 340-*b* may be associated with HARQ process ID 1, PDSCH location 340-*c* may be associated with HARQ process ID 2, and PDSCH location 340-*d* may be associated with HARQ process ID 3.

A DCI 345 may schedule a retransmission 350 associated with the data transmitted in PDSCH location 340-*b* (e.g., HARQ process ID=1). In such cases, the indicated TDRA entry may not include a number of repetitions (e.g., TDRA entry may not have RepNumR16) and the DCI 345 may schedule one repetition for the retransmission.

In some cases, a PDSCH may be scheduled by a given DCI format (e.g., DCI format 1_1 or 1_2) in a PDCCH (e.g., a PDCCH with CRC scrambled by CS-RNTI with NDI=0), and in some other cases a PDSCH may be scheduled without a corresponding PDCCH transmission using an SPS configuration and activated by DCI. In some examples, the UE may not be configured with the time duration for the reception of repetitions (e.g., a number of repetitions given by pdsch-AggregationFactor), in an SPS or PDSCH configuration. In some examples, the number of repetitions may not be larger than the time duration derived by the periodicity P obtained from the corresponding SPS configuration. For example, the number of repetitions may not be larger than the periodicity 335. Accordingly, the number of repetitions in a first period of the periodicity 335 may not overlap with a number of repetitions in a second period of the periodicity. In cases where the number of repetitions exceeds the time duration of the periodicity, the UE may not receive the PDSCH, or may otherwise determine an error.

Figure 3C:
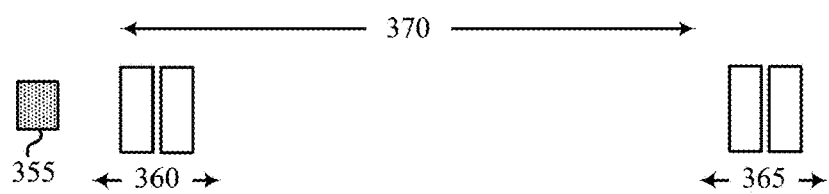

In FIG. 3C, a wireless communications network may support intra-slot repetition, where more than one repetition may occur within a slot (e.g., TDMSchemeA or mini-slot based repetition).

In some examples, a UE may be configured by the higher layer parameter RepScheme Enabler set to one of a number of multi-TRP schemes. The UE may be indicated with two TCI states in a codepoint of the DCI field and DM-RS port(s) within one code division multiplexing (CDM) group in the DCI field. In some cases, two TCI states may be indicated in a DCI and the UE may be set to a first multi-TRP scheme. The number of TCI states may in some examples correspond to a number of repetitions (e.g., a first repetition corresponding to a first TCI state and a second repetition corresponding to a second TCI state). The UE may receive two PDSCH transmission occasions of the same TB, with each TCI state associated with a PDSCH transmission occasion which has non-overlapping time domain resource allocation with respect to the other PDSCH transmission occasion. In some examples, both PDSCH transmission occasions may be received within a single slot.

In cases where two TCI states are indicated in a codepoint of the TCI field of the DCI 355, a UE may transmit two repetitions within a single slot. In such cases, the UE may apply the first TCI state to the first repetition, and may apply the second TCI state to the second repetition. In some cases, the two repetitions may have the same length as indicated by the TDRA field of the DCI.

As illustrated by FIG. 3C, SPS PDSCH may be activated by a DCI 355 (where DCI 355 has a number of CRC bits scrambled with CS-RNTI, and NDI=0). In addition, two TCI states may be indicated by the TCI field of the DCI 355, and the UE is configured with a first multi-TRP scheme (e.g., TDMSchemeA). In some cases, each SPS PDSCH may include two repetitions within the same slot 360, and the SPS PDSCH is configured in one slot per SPS period 370. In such examples, the UE may not use the aggregation factor in in the SPS or PDSCH configurations.

In another example, each SPS PDSCH may include 2*N repetitions in N consecutive slots, each slot containing 2 repetitions (e.g., inter-slot and intra-slot repetition), within an SPS periodicity 390. N may be a value of the aggregation factor configured for the sps-config, or in some other cases N may be the value of the aggregation factor configured for the pdsch-config.

Figure 3D:
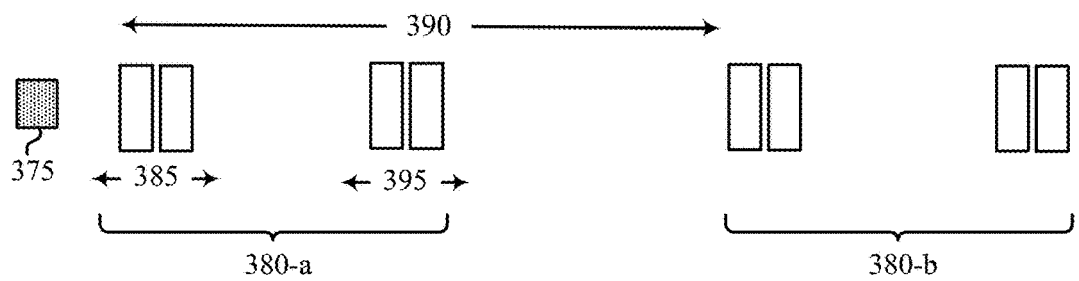

For example, as illustrated in FIG. 3D, the DCI 375 may indicate two TCI states with sps-ConfigIndex=0, which may be indicated in a HARQ process field that is repurposed in the DCI 375. Each SPS PDSCH 380 may have four repetitions: two repetitions in the first slot 385, and two repetitions in the second slot 395 (e.g., because the pdsch-AggregationFactor=2). In some examples, the first slot 385 and the second slot 395 may be consecutive slots. In addition, each SPS PDSCH 380 may be associated with a different HARQ process ID (e.g., PDSCH 380-a may be associated with a HARQ process ID=0, and PDSCH 380-b may be associated with HARQ process ID=1). Within each slot, the first two repetitions (e.g., in slot 360) may be associated with the first TCI state and the second two repetitions (e.g., in slot 365) may be associated with the second TCI state. In another example, the first repetition and the third repetition (e.g., first repetition in each slot of the multiple slots) may be associated with the first TCI state, and the second repetition and the fourth repetition (second repetition in each slot of the multiple slots) may be associated with the second TCI state.

In some other examples, an RRC parameter (e.g., Rep-Scheme Enabler or repetitionScheme (which may be set to a configuration such as one of FDMSchemeA, FDMSchemeB, TDMSchemeA)) may be separately configured per SPS configuration. When an SPS configuration is activated, the PDSCH scheme that is implemented may be determined based on the RRC parameter in an SPS configuration (e.g., sps-config), or in a PDSCH configuration (e.g., if sps-config is not configured). In such cases, the UE may not expect to be configured with an aggregation factor (e.g., pdsch-AggregationFactor) for PDSCH.

Figure 4:
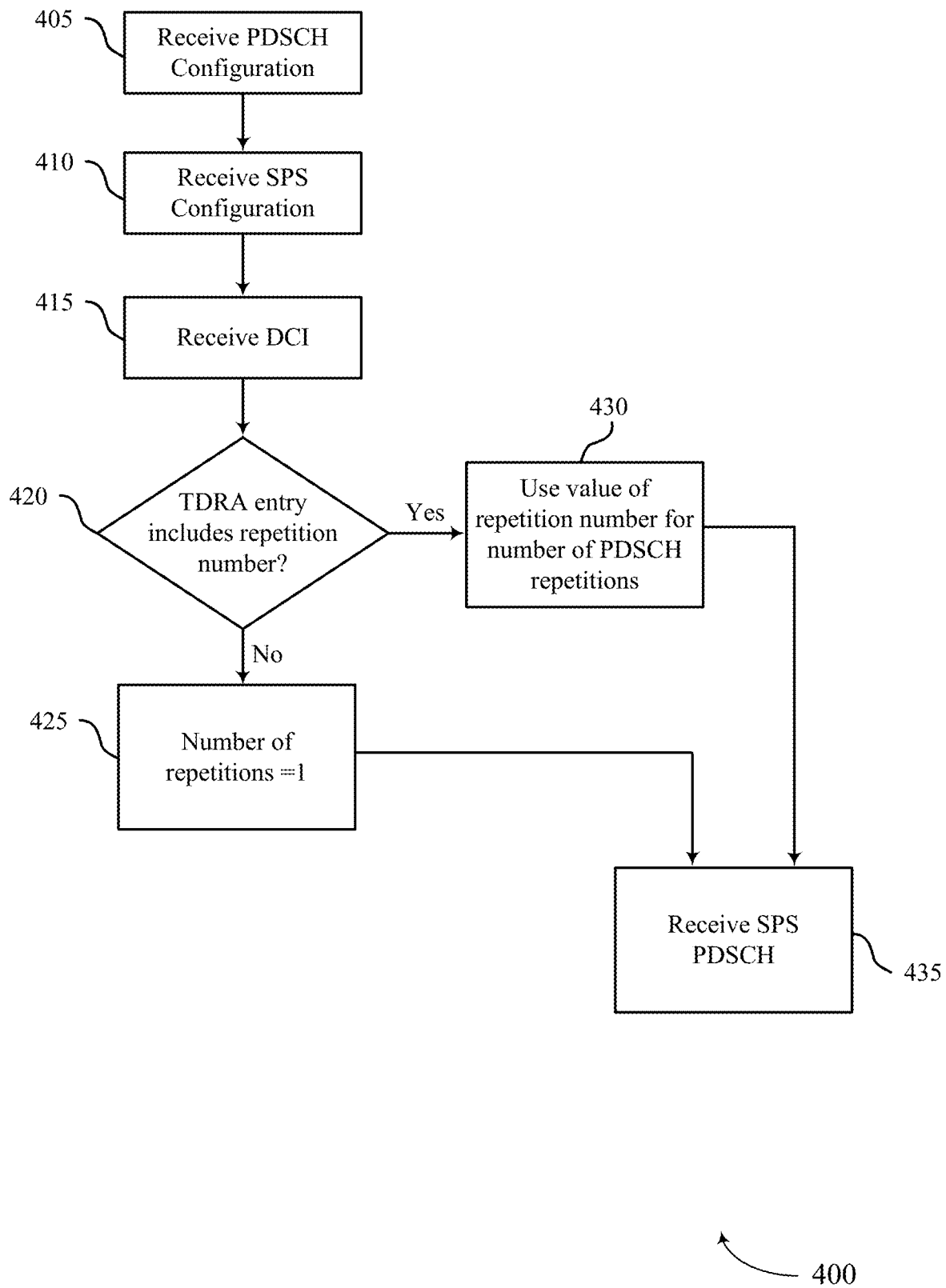
FIGS. 4 through 7 illustrate example flow charts that support techniques for dynamically aggregating a PDSCH for SPS in accordance with aspects of the present disclosure.

FIG. 4 illustrates an example of a flow chart 400 that supports techniques for dynamically aggregating a physical downlink shared channel for SPS in accordance with aspects of the present disclosure. In some examples, flow chart 400 may implement aspects of wireless communications system 100. In some examples, flow chart 400 may be implemented by a UE, such as a UE described with reference to FIGS. 1 and 2. However, it is also noted that aspects of the flow chart 400 may be used by a base station, such as a base station 105 described with reference to FIGS. 1 and 2, when determining a number of repetitions for transmitting PDSCH.

At 405, the UE may receive a PDSCH configuration from a base station. In addition, at 410 the UE may receive an SPS configuration from a set of one or more SPS configurations. In some examples, the PDSCH configuration and the SPS configuration are received via RRC signaling.

At 415, the UE may receive DCI associated with a PDSCH transmission for the SPS configuration. In some cases, the DCI may have a CRC that is scrambled by a CS-RNTI, and may have an NDI equal to zero. In some examples, the DCI may activate the SPS configuration. In some other examples the DCI has a CRC that is scrambled by a CS-RNTI with an NDI equal to one, and DCI may schedule a PDSCH transmission that includes a retransmission of the SPS PDSCH. The DCI may have a number of different formats (e.g., DCI format 1_1, DCI format 1_2, etc.).

At 420, the UE may determine, based on a rule, a repetition number for a number of expected instances of the PDSCH transmission, wherein the rule is based on a priority between a TDRA entry indicated by the DCI and at least one of the PDSCH configuration or the SPS configuration. In some cases, UE may receive a TDRA table including the TDRA entry via RRC signaling. The TDRA entry may in some examples be from a TDRA table that comprises a number of TDRA entries, and where at least one TDRA entry of the number of TDRA entries includes the repetition number. In some examples, the UE may determine whether the TDRA entry includes the repetition number, and the repetition number is indicated by the entry of the TDRA table.

At 430 the UE may determine that the TDRA entry indicated by the DCI includes the repetition number. In addition, the UE may identify a number of repetitions of the PDSCH transmission based on a value of the repetition number, where two or more instances of the PDSCH transmission are received based on the identified number of repetitions. In some examples, the number of repetitions of the PDSCH transmission may occur within a time period that is less than or equal to the SPS time period.

At 425 the UE may determine that the TDRA entry indicated by the DCI excludes the repetition number. The UE may determine that the number of expected instances (e.g., repetitions) of the PDSCH transmission is equal to one based on the TDRA entry excluding the repetition number, where a single instance of the PDSCH transmission is received based on the number of expected instances.

Based on determining whether the TDRA entry includes the repetition number at 420, the UE may determine that the number of repetitions is equal to 1 (e.g., at 425), or the UE may us the value of the repetition number for a number of repetitions of the PDSCH (e.g., at 430). At 435, the UE may receive, within each SPS time period of a number of SPS time periods, one or more instances of the PDSCH transmission in accordance with the determined repetition number. In some examples, the one or more instances of the PDSCH transmission are received in a different slot time period of a plurality of consecutive slot time periods.

Figure 5:
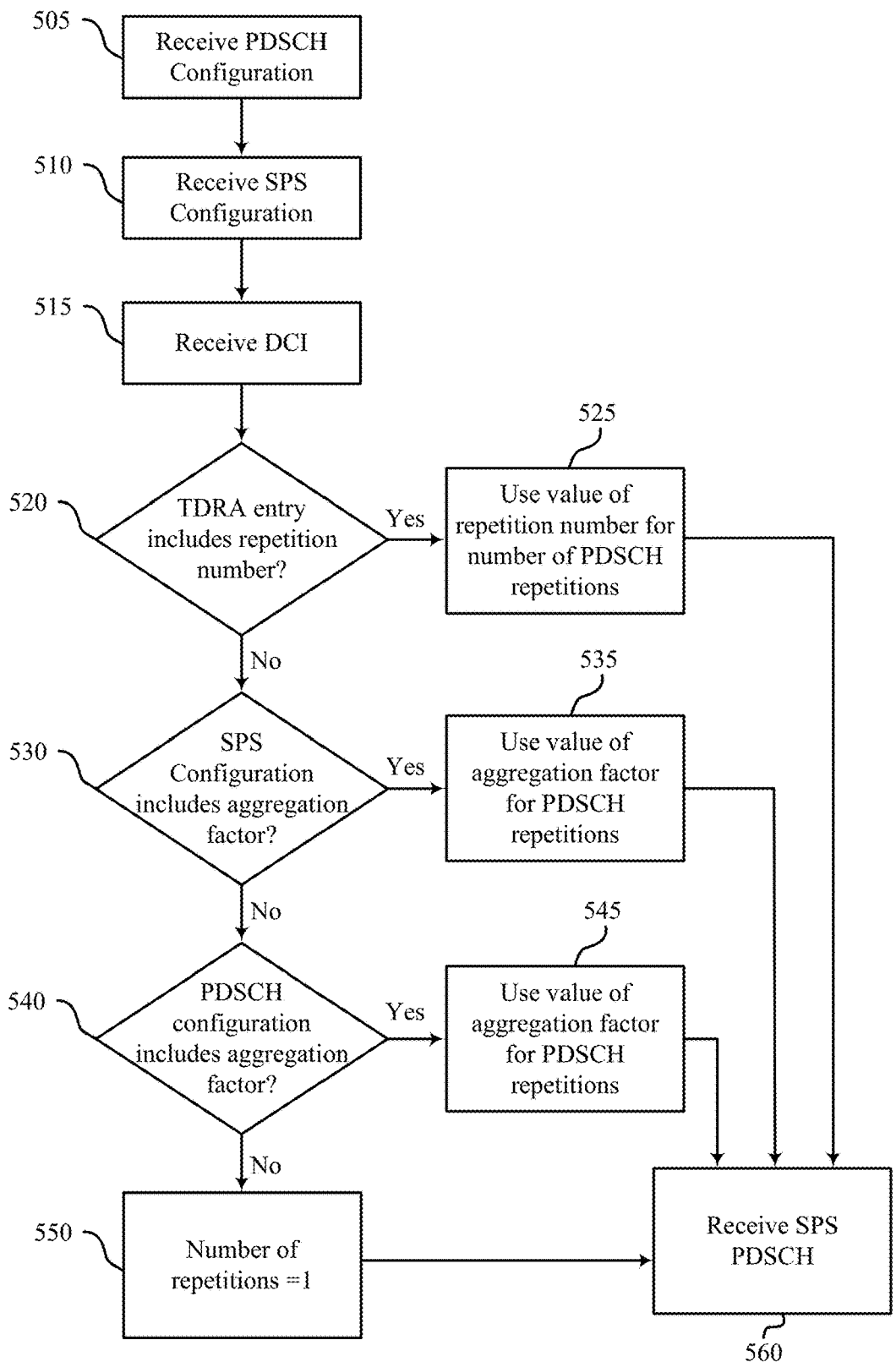

FIG. 5 illustrates an example of a flow chart 500 that supports techniques for dynamically aggregating a physical downlink shared channel for SPS in accordance with aspects of the present disclosure. In some examples, flow chart 500 may implement aspects of wireless communications system 100. In some examples, flow chart 500 may be implemented by a UE, such as a UE described with reference to FIGS. 1 and 2. However, it is also noted that aspects of the flow chart 500 may be used by a base station, such as a base station 105 described with reference to FIGS. 1 and 2, when determining a number of repetitions for transmitting PDSCH.

At 505, the UE may receive a PDSCH configuration from a base station. In addition, at 510, the UE may receive an SPS configuration from a set of one or more SPS configurations. In some examples, the PDSCH configuration and the SPS configuration may be received via RRC signaling. In some examples, the SPS configuration may include a first aggregation factor, and the UE may identify a number of repetitions of a PDSCH transmission corresponding to a value of the first aggregation factor, wherein two or more instances of the PDSCH transmission are received based on the identified number of repetitions.

At 515, the UE may receive DCI associated with a PDSCH transmission for the SPS configuration. In some cases, the DCI may have a CRC that is scrambled by a CS-RNTI, and may have an NDI equal to zero. In some examples, the DCI may activate the SPS configuration. In some other examples the DCI has a CRC that is scrambled by a CS-RNTI with an NDI equal to one, and DCI may schedule a PDSCH transmission that includes a retransmission of the SPS PDSCH. The DCI may have a number of different formats (e.g., DCI format 1_1, DCI format 1_2, etc.).

At 520, the UE may determine, based on a rule, a repetition number for a number of expected instances of the PDSCH transmission, where the rule may be based on a priority between a TDRA entry indicated by the DCI and at least one of the PDSCH configuration or the SPS configuration. In some cases, UE may receive a TDRA table including the TDRA entry via RRC signaling. The TDRA entry may in some examples be from a TDRA table that comprises a number of TDRA entries, and where at least one TDRA entry of the number of TDRA entries includes the repetition number. In some examples, the UE may determine whether the TDRA entry includes the repetition number, and the repetition number may be indicated by the entry of the TDRA table.

At 525 the UE may determine that the TDRA entry indicated by the DCI includes the repetition number. In addition, the UE may identify a number of repetitions of the PDSCH transmission based on a value of the repetition number, and the UE may receive the SPS PDSCH according to the number of repetitions included in the DCI at 560.

At 530, the UE may determine that the TDRA entry does not include the repetition number. The UE may identify a configuration of the first aggregation factor from the SPS configuration and may identify a number of repetitions of the PDSCH transmission at 535 corresponding to a value of the first aggregation factor. In some examples, two or more instances (e.g., repetitions) of the PDSCH transmission are received based on the identified number of repetitions at 560. In some cases, the UE may identify the number of repetitions of the PDSCH transmission corresponding to the first aggregation factor, where two or more instances of the PDSCH transmission are received based on the identified number of repetitions.

At 540, the UE may determine that a TDRA entry excludes the repetition number and that the SPS configuration excludes the configuration of the first aggregation factor. The UE may identify a configuration of a second aggregation factor from the PDSCH configuration based on the exclusion of the first aggregation factor. The UE may identify a number of repetitions of the PDSCH transmission corresponding to a value of the second aggregation factor at 545, where two or more instances (e.g., repetitions) of the PDSCH transmission are received based on the identified number of repetitions at 560.

At 550, the UE may determine, based on the TDRA entry excluding the repetition number, that the SPS configuration excludes a configuration of a first aggregation factor. The UE may determine, based on the SPS configuration excluding the configuration of the first aggregation factor, that the PDSCH configuration also excludes a configuration of a second aggregation factor. The UE may further determine that the number of expected instances of the PDSCH transmission is equal to one based on the TDRA entry excluding the repetition number, the SPS configuration excluding the configuration of the first aggregation factor, and the PDSCH configuration excluding the configuration of the second aggregation factor.

The UE may determine that a single instance of the PDSCH transmission is received based on the number of expected instances at 560. For example, the UE may determine that the number of expected instances of the PDSCH transmission is equal to one based on the SPS configuration excluding the configuration of the first aggregation factor and the PDSCH configuration excluding the configuration of the second aggregation factor, wherein a single instance of the PDSCH transmission is received based on the number of expected instances.

Figure 6:
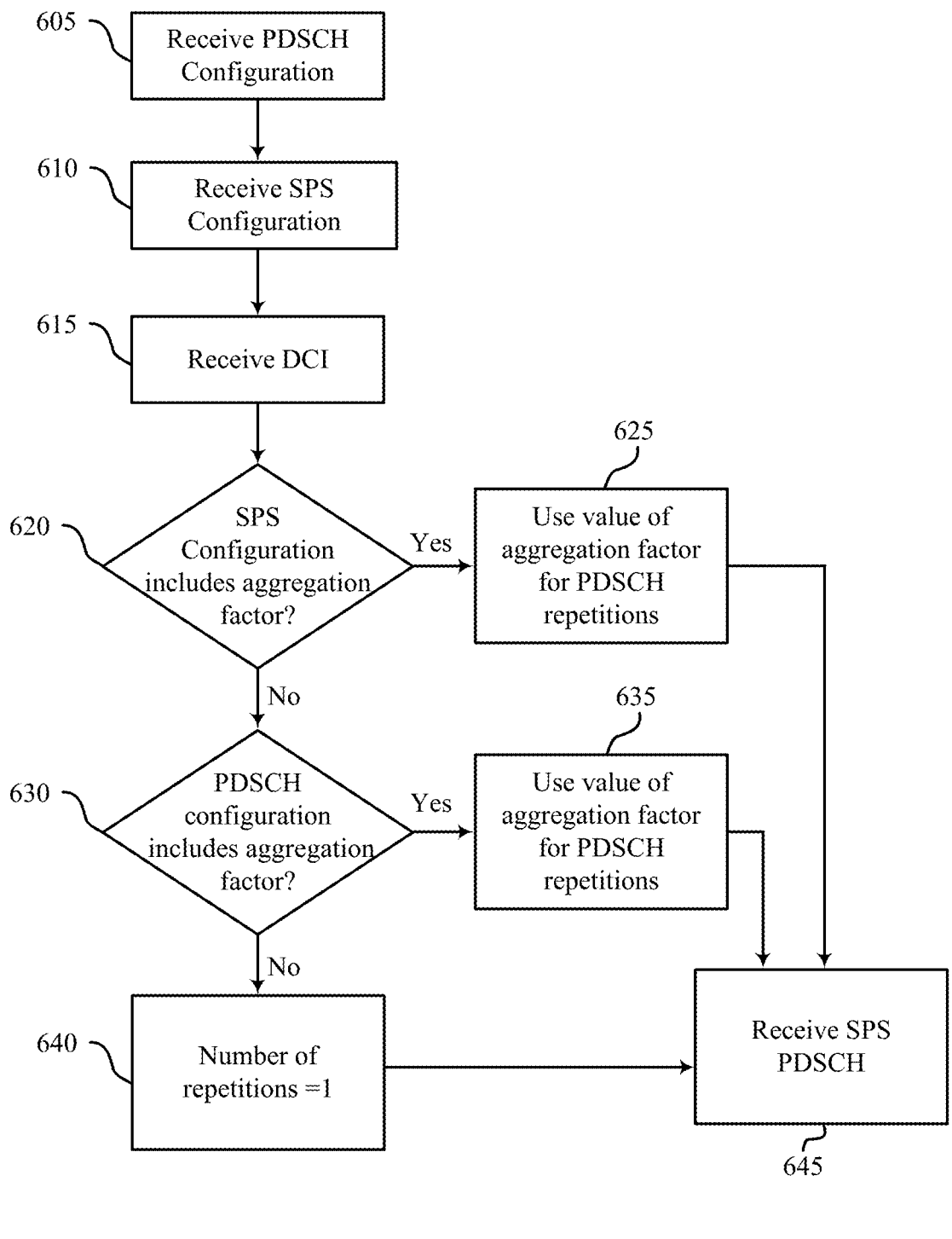

FIG. 6 illustrates an example of a flow chart 600 that supports techniques for dynamically aggregating a physical downlink shared channel for SPS in accordance with aspects of the present disclosure. In some examples, flow chart 600 may implement aspects of wireless communications system 100. In some examples, flow chart 600 may be implemented by a UE, such as a UE described with reference to FIGS. 1 and 2. However, it is also noted that aspects of the flow chart 600 may be used by a base station, such as a base station 105 described with reference to FIGS. 1 and 2, when determining a number of repetitions for transmitting PDSCH.

At 605, the UE may receive a PDSCH configuration from a base station. In addition, at 610, the UE may receive an SPS configuration from a set of one or more SPS configurations. In some examples, the PDSCH configuration and the SPS configuration are received via RRC signaling. In some examples, the SPS configuration may include a first aggregation factor, and the UE may identify a number of repetitions of a PDSCH transmission corresponding to a value of the first aggregation factor, wherein two or more instances of the PDSCH transmission are received based on the identified number of repetitions.

At 615, the UE may receive DCI associated with a PDSCH transmission for the SPS configuration. In some cases, the DCI may have a CRC that is scrambled by a CS-RNTI, and may have an NDI equal to zero. In some examples, the DCI may activate the SPS configuration. In some other examples the DCI has a CRC that is scrambled by a CS-RNTI with an NDI equal to one, and DCI may schedule a PDSCH transmission that includes a retransmission of the SPS PDSCH. The DCI may have a number of different formats (e.g., DCI format 1_1, DCI format 1_2, etc.).

At 620, the UE may determine, based on a rule, a repetition number for a number of expected instances of the PDSCH transmission, where the rule is based at least one of the PDSCH configuration or the SPS configuration. The UE may identify a configuration of the first aggregation factor from the SPS configuration and may identify a number of repetitions of the PDSCH transmission at 625 corresponding to a value of the first aggregation factor. In some examples, two or more instances (e.g., repetitions) of the PDSCH transmission are received based on the identified number of repetitions at 645. In some cases, the UE may identify the number of repetitions of the PDSCH transmission corresponding to the first aggregation factor, where two or more instances of the PDSCH transmission are received based on the identified number of repetitions.

At 630, the UE may determine that the SPS configuration in 620 does not include the configuration of the first aggregation factor. The UE may identify a configuration of a second aggregation factor from the PDSCH configuration based on the exclusion of the first aggregation factor in the SPS configuration. The UE may identify a number of repetitions of the PDSCH transmission corresponding to a value of the second aggregation factor at 635, where two or more instances (e.g., repetitions) of the PDSCH transmission are received based on the identified number of repetitions at 645.

At 640, the UE may determine that the SPS configuration excludes a configuration of a first aggregation factor. The UE may also determine, based on the SPS configuration excluding the configuration of the first aggregation factor, that the PDSCH configuration also excludes a configuration of a second aggregation factor. The UE may further determine that the number of expected instances of the PDSCH transmission is equal to one the SPS configuration excluding the configuration of the first aggregation factor and the PDSCH configuration excluding the configuration of the second aggregation factor.

The UE may determine that a single instance of the PDSCH transmission is received based on the number of expected instances at 640. For example, the UE may determine that the number of expected instances of the PDSCH transmission is equal to one based on the SPS configuration excluding the configuration of the first aggregation factor and the PDSCH configuration excluding the configuration of the second aggregation factor, wherein a single instance of the PDSCH transmission is received based on the number of expected instances.

Figure 7:
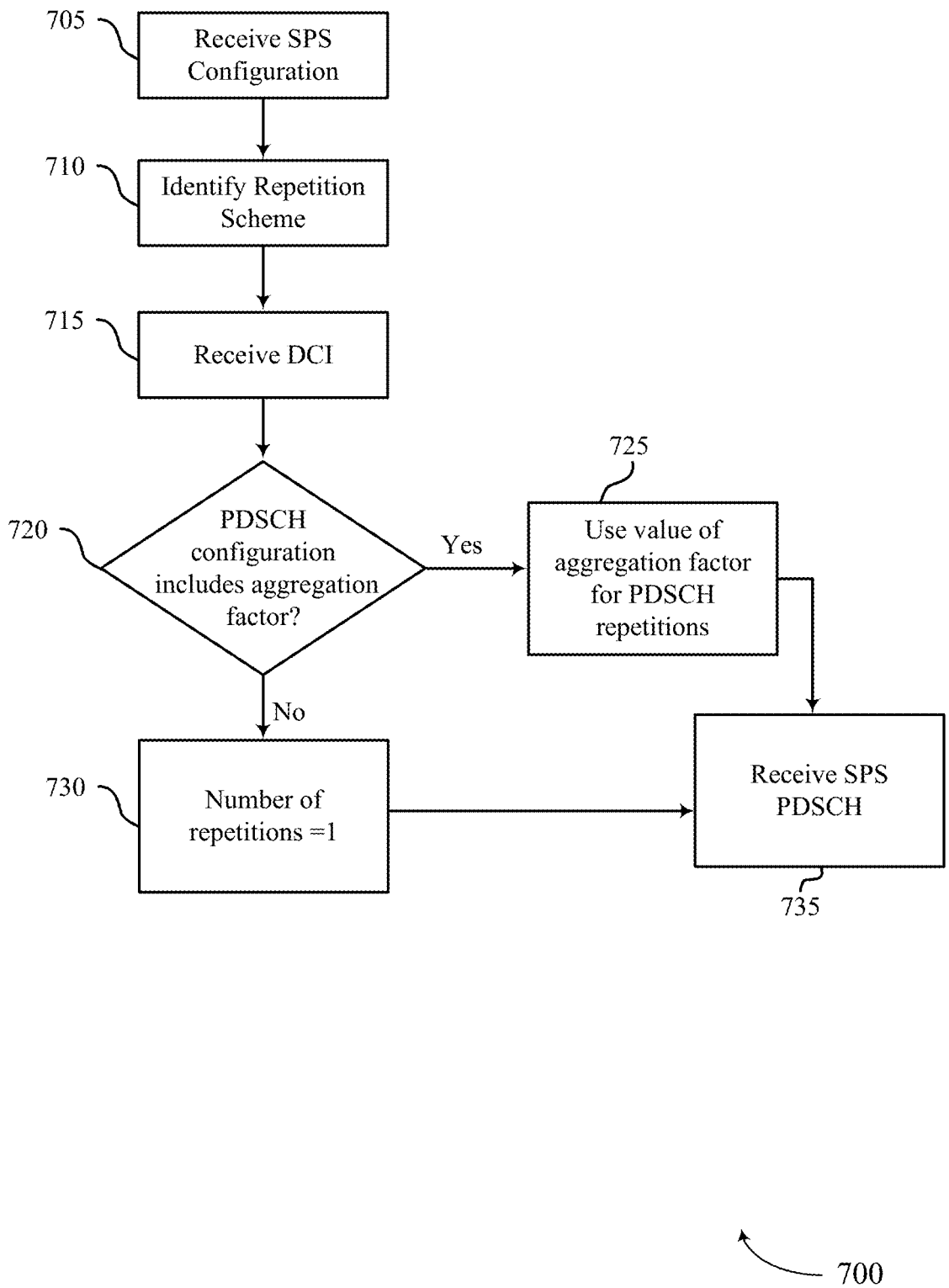

FIG. 7 illustrates an example of a flow chart 700 that supports techniques for dynamically aggregating a physical downlink shared channel for SPS in accordance with aspects of the present disclosure. In some examples, flow chart 700 may implement aspects of wireless communications system 100. In some examples, flow chart 700 may be implemented by a UE, such as a UE described with reference to FIGS. 1 and 2. However, it is also noted that aspects of the flow chart 700 may be used by a base station, such as a base station 105 described with reference to FIGS. 1 and 2, when determining a number of repetitions for transmitting PDSCH.

At 705, the UE may receive an SPS configuration from a set of one or more SPS configurations.

At 710, the UE may identify a repetition scheme configuration based on the received SPS configuration. In some cases, the UE may receive a PDSCH configuration identifying the repetition scheme configuration based on the received PDSCH configuration, where the SPS configuration excludes the repetition scheme configuration. In some examples, the repetition scheme may include a first frequency division multiplexing scheme, a second frequency division multiplexing scheme, and a time division multiplexing scheme.

At 715, the UE may receive DCI associated with a PDSCH transmission for the SPS configuration and may identify, within the DCI, an indication of a number of TCI states. In some cases, the number of TCI states includes two TCI states. In some cases, the DCI may a cyclic redundancy check that is scrambled by a configured scheduling radio network temporary identifier, the DCI containing a new data indicator equal to zero, and wherein the DCI activates the SPS configuration.

At 720, the UE may identify whether the SPS configuration includes an aggregation factor. In some examples, the UE may identify that the SPS configuration includes a configuration of a first aggregation factor.

In some examples, such as at 725, the UE may identify a number of consecutive slot time periods that correspond to a value of the first aggregation factor (e.g., the UE may use the value of the aggregation factor to determine a number of PDSCH repetitions).

In some other examples, such as at 730, the UE may determine that the SPS configuration excludes a configuration of a first aggregation factor and the UE may identify, based on the SPS configuration excluding the configuration of the first aggregation factor, a configuration of a second aggregation factor from the PDSCH configuration. The UE may identify a number of consecutive slot time periods that corresponds to a value of the second aggregation factor. In some other cases, the UE may determine that the SPS configuration does not include the aggregation factor at 730, and may determine the number of repetitions to be 1.

At 735, the UE may receive one or more repetitions of the PDSCH transmission based on the repetition scheme configuration, or the number of transmission configuration indicator states, or a combination thereof. The UE may receive the one or more repetitions of the PDSCH transmission within a same slot time period, the slot time period occurring within each SPS time period of a plurality of SPS time periods. In some other examples, the UE may receive the one or more repetitions of the PDSCH transmission within a plurality of consecutive slot time periods occurring within each SPS time period, each slot time period of the plurality of consecutive slot time periods comprising two repetitions of the PDSCH transmission.

Figure 8:
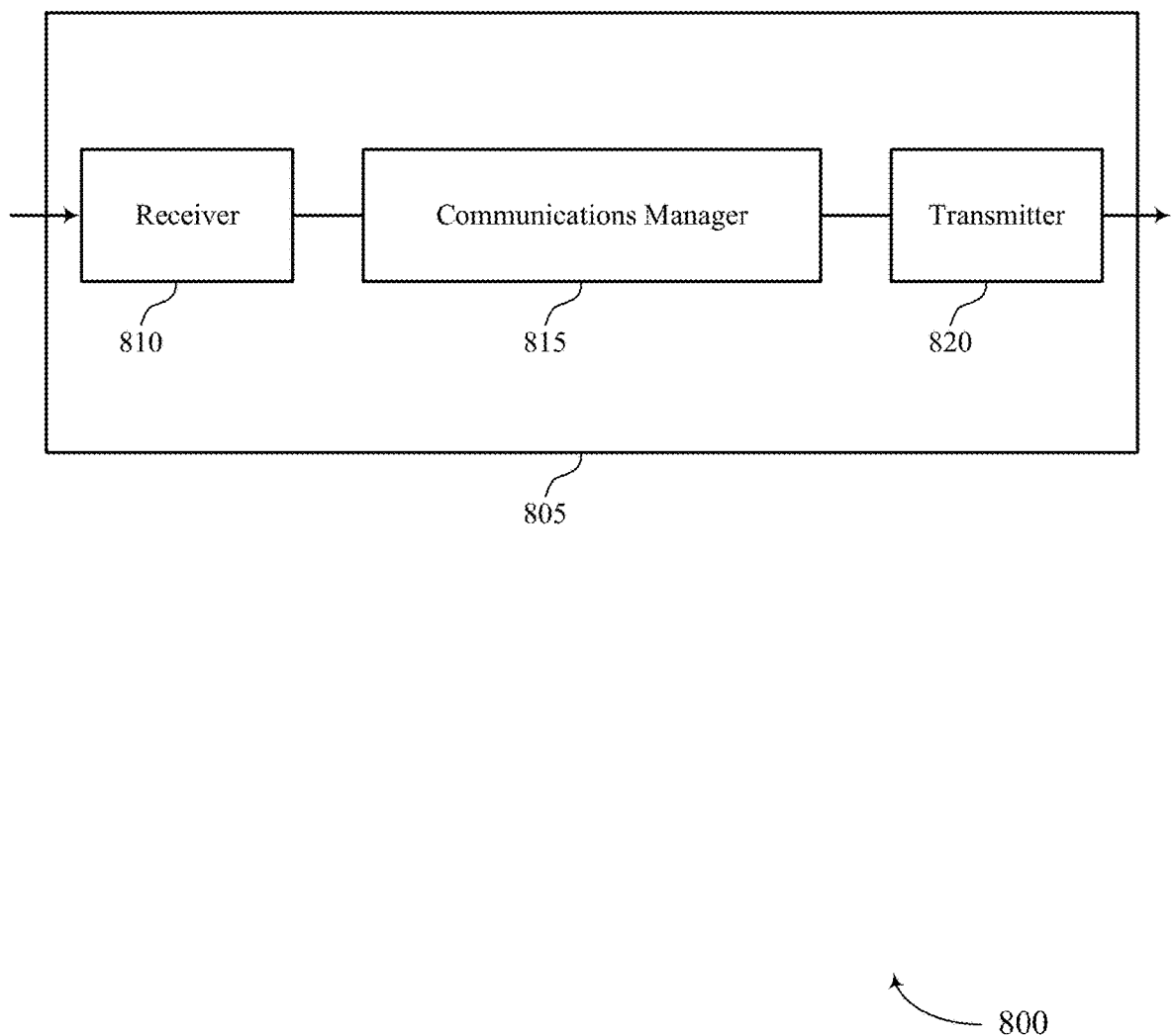
FIGS. 8 and 9 show block diagrams of devices that support techniques for dynamically aggregating a PDSCH for SPS in accordance with aspects of the present disclosure.

FIG. 8 shows a block diagram 800 of a device 805 that supports techniques for dynamically aggregating a PDSCH for SPS in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for dynamically aggregating a PDSCH for SPS, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a PDSCH configuration and an SPS configuration from a set of one or more SPS configurations, receive DCI associated with a PDSCH transmission for the SPS configuration, determine, based on a rule, a repetition number for a number of expected instances of the PDSCH transmission, where the rule is based on a priority between a TDRA entry indicated by the DCI and at least one of the PDSCH configuration or the SPS configuration, and receive, within each SPS time period of a set of SPS time periods, one or more instances of the PDSCH transmission in accordance with the repetition number.

The communications manager 815 may also receive an SPS configuration from a set of one or more SPS configurations, identify a repetition scheme configuration, receive DCI associated with a PDSCH transmission for the SPS configuration, identify, within the DCI, an indication of a set of TCI states, and receive one or more repetitions of the PDSCH transmission based on the repetition scheme configuration, or the set of TCI states, or a combination thereof. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
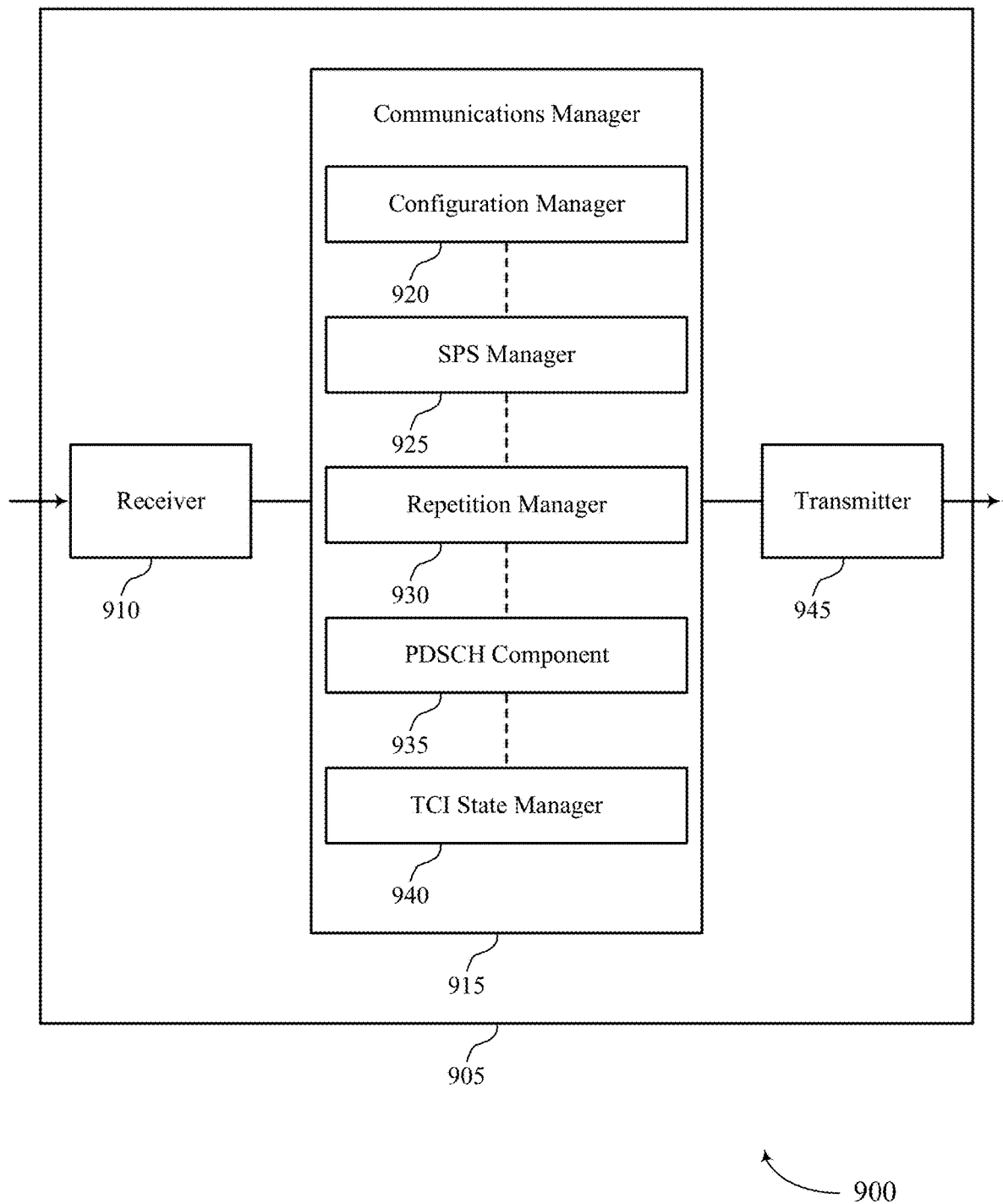

FIG. 9 shows a block diagram 900 of a device 905 that supports techniques for dynamically aggregating a PDSCH for SPS in accordance with aspects of the present disclosure.

The device 905 may be an example of aspects of a device 805, or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to techniques for dynamically aggregating a PDSCH for SPS, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration manager 920, an SPS manager 925, a repetition manager 930, a PDSCH component 935, and a TCI state manager 940. The communications manager 915 may be an example of aspects of the communications manager 1110 described herein.

The configuration manager 920 may receive a PDSCH configuration and an SPS configuration from a set of one or more SPS configurations. In some examples, the configuration manager 920 may identify a repetition scheme configuration. The SPS manager 925 may receive DCI associated with a PDSCH transmission for the SPS configuration.

The repetition manager 930 may determine, based on a rule, a repetition number for a number of expected instances of the PDSCH transmission, where the rule is based on a priority between a TDRA entry indicated by the DCI and at least one of the PDSCH configuration or the SPS configuration.

The PDSCH component 935 may receive, within each SPS time period of a set of SPS time periods, one or more instances of the PDSCH transmission in accordance with the repetition number. In some examples, the PDSCH component 935 may receive one or more repetitions of the PDSCH transmission based on the repetition scheme configuration, or the set of TCI states, or a combination thereof. The TCI state manager 940 may identify, within the DCI, an indication of a set of TCI states.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

In some examples, communications manager 915 may be implemented as an integrated circuit or chipset for a mobile device modem, and the receiver 910 and transmitter 945 may be implemented as analog components (e.g., amplifiers, filters, antennas, etc.) coupled with the mobile device modem to enable wireless transmission and reception.

The communications manager 915 as described herein may be implemented to realize one or more potential advantages. Various implementations may enable communications manager 915 to reduce overall signaling overhead by implementing communications involving SPS. Based on implementing the techniques for dynamically aggregating a PDSCH for SPS as described herein, one or more processors of the device 905 (e.g., processor(s) controlling or incorporated with one or more of receiver 910, communications manager 915, and transmitter 945) may reduce the complexity in determining how many repetitions may be received at the device 905. In addition, the techniques described herein may increase overall communications efficiency and reduce communications latency at the device 905.

Figure 10:
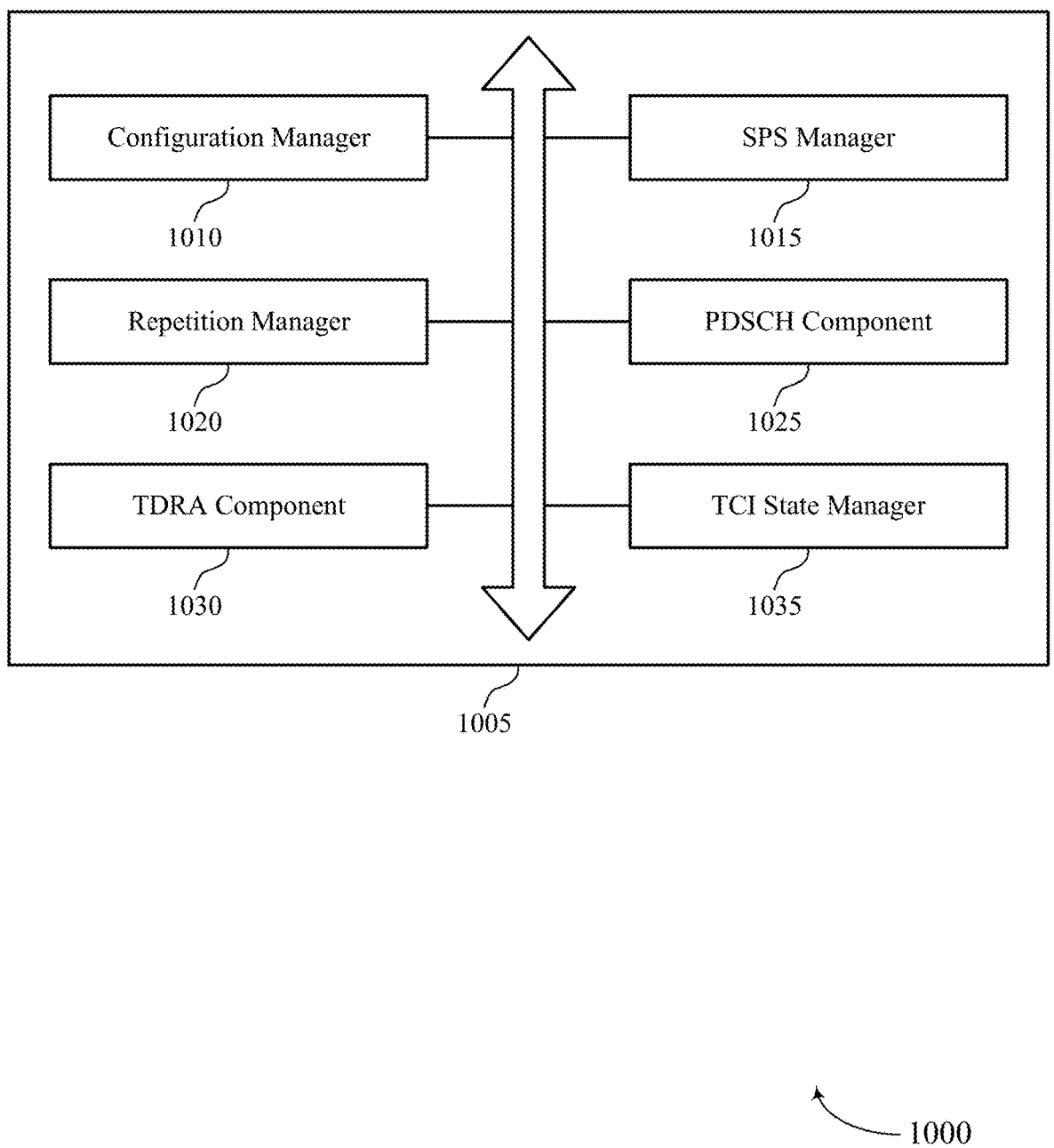
FIG. 10 shows a block diagram of a communications manager that supports techniques for dynamically aggregating a PDSCH for SPS in accordance with aspects of the present disclosure.

FIG. 10 shows a block diagram 1000 of a communications manager 1005 that supports techniques for dynamically aggregating a PDSCH for SPS in accordance with aspects of the present disclosure. The communications manager 1005 may be an example of aspects of a communications manager 815, a communications manager 915, or a communications manager 1110 described herein. The communications manager 1005 may include a configuration manager 1010, an SPS manager 1015, a repetition manager 1020, a PDSCH component 1025, a TDRA component 1030, and a TCI state manager 1035. Each of these modules may communicate, directly or indirectly, with one another (e.g., via one or more buses).

The configuration manager 1010 may receive a PDSCH configuration and an SPS configuration from a set of one or more SPS configurations. In some examples, the configuration manager 1010 may receive an SPS configuration from a set of one or more SPS configurations. In some examples, the configuration manager 1010 may identify a repetition scheme configuration. In some examples, the configuration manager 1010 may identify, based on the TDRA entry excluding the repetition number, a configuration of a first aggregation factor from the SPS configuration. In some examples, the configuration manager 1010 may determine, based on a TDRA entry excluding a repetition number, that the SPS configuration excludes a configuration of a first aggregation factor.

In some examples, the configuration manager 1010 may identify, based on the SPS configuration excluding the configuration of a first aggregation factor, a configuration of a second aggregation factor from the PDSCH configuration. In other examples, the configuration manager 1010 may determine, based on the SPS configuration excluding the configuration of the first aggregation factor, that the PDSCH configuration excludes a configuration of a second aggregation factor.

In some examples, the configuration manager 1010 may identify, from the SPS configuration, a configuration of a first aggregation factor. Additionally or alternatively, the configuration manager 1010 may determine that the SPS configuration excludes a configuration of the first aggregation factor. In some examples, the configuration manager 1010 may identify, from the PDSCH configuration, a configuration of a first aggregation factor. Additionally or alternatively, the configuration manager 1010 may determine that the PDSCH configuration excludes a configuration of a first aggregation factor or the semi-persistent scheduling configuration excludes a configuration of a second aggregation factor, or both. In some examples, the configuration manager 1010 may identify a repetition scheme configuration based on the received SPS configuration. In some examples, the configuration manager 1010 may identify the repetition scheme configuration based on the received PDSCH configuration, where the SPS configuration excludes the repetition scheme configuration.

In some cases, the PDSCH configuration and the SPS configuration are received via RRC signaling. In some cases, the repetition scheme may include a first frequency division multiplexing scheme (e.g., FDMSchemeA), a second frequency division multiplexing scheme (e.g., FDMSchemeB), or a time division multiplexing scheme (e.g., TDMSchemeA), or the like.

The SPS manager 1015 may receive DCI associated with a PDSCH transmission for the SPS configuration. In some cases, the DCI has a cyclic redundancy check that is scrambled by a configured scheduling radio network temporary identifier, the DCI including a new data indicator equal to zero, and where the DCI activates the SPS configuration. In some cases, the DCI has a cyclic redundancy check that is scrambled by a configured scheduling radio network temporary identifier, the DCI including a new data indicator equal to one, and where the PDSCH transmission includes a retransmission of semi-persistently scheduled PDSCH scheduled by the DCI. In some cases, the DCI has a DCI format 1_1. In other examples, the DCI has a DCI format 1_2. In some cases, the DCI has a cyclic redundancy check that is scrambled by a configured scheduling radio network temporary identifier, the DCI including a new data indicator equal to zero, and where the DCI activates the SPS configuration.

The repetition manager 1020 may determine, based on a rule, a repetition number for a number of expected instances of the PDSCH transmission, where the rule is based on a priority between a TDRA entry indicated by the DCI and at least one of the PDSCH configuration or the SPS configuration. In some examples, the repetition manager 1020 may identify a number of repetitions of the PDSCH transmission based at least in part on a value of the repetition number, where two or more instances of the PDSCH transmission are received based on the identified number of repetitions.

In some examples, the repetition manager 1020 may identify a number of repetitions of the PDSCH transmission corresponding to a value of the first aggregation factor, where two or more instances of the PDSCH transmission are received based on the identified number of repetitions. In some examples, the repetition manager 1020 may identify a number of repetitions of the PDSCH transmission corresponding to a value of the second aggregation factor, where two or more instances of the PDSCH transmission are received based on the identified number of repetitions.

In some examples, the repetition manager 1020 may receive the one or more repetitions of the PDSCH transmission within a same slot time period, the slot time period occurring within each SPS time period of a set of SPS time periods. In some examples, the repetition manager 1020 may receive the one or more repetitions of the PDSCH transmission within a set of consecutive slot time periods occurring within each SPS time period of a set of SPS time periods, each slot time period of the set of consecutive slot time periods including two repetitions of the PDSCH transmission. In some cases, the number of repetitions of the PDSCH transmission are within a time period that is less than or equal to the SPS time period.

The PDSCH component 1025 may receive, within each SPS time period of a set of SPS time periods, one or more instances of the PDSCH transmission in accordance with the repetition number. In some examples, the PDSCH component 1025 may receive one or more repetitions of the PDSCH transmission based on the repetition scheme configuration, or the set of TCI states, or a combination thereof.

In some examples, the PDSCH component 1025 may determine that the number of expected instances of the PDSCH transmission is equal to one based on the TDRA entry excluding the repetition number, where a single instance of the PDSCH transmission is received based on the number of expected instances. In some examples, the PDSCH component 1025 may determine that the number of expected instances of the PDSCH transmission is equal to one based on the SPS configuration excluding the configuration of the first aggregation factor and the PDSCH configuration excluding the configuration of the second aggregation factor, where a single instance of the PDSCH transmission is received based on the number of expected instances. In some examples, the PDSCH component 1025 may determine that the number of expected instances of the PDSCH transmission is equal to one based on the PDSCH configuration excluding the configuration of the first aggregation factor, where a single instance of the PDSCH transmission is received based on the number of expected instances.

Additionally or alternatively, the PDSCH component 1025 may determine that the number of expected instances of the PDSCH transmission is equal to one based on the TDRA entry excluding the repetition number, the SPS configuration excluding the configuration of the first aggregation factor, and the PDSCH configuration excluding the configuration of the second aggregation factor, where a single instance of the PDSCH transmission is received based on the number of expected instances.

In some examples, the PDSCH component 1025 may identify a number of the set of consecutive slot time periods that corresponds to a value of the first aggregation factor. In other examples, the PDSCH component 1025 may identify a number of the set of consecutive slot time periods that corresponds to a value of the second aggregation factor. In some cases, the one or more instances of the PDSCH transmission are received in a different slot time period of a set of consecutive slot time periods.

The TCI state manager 1035 may identify, within the DCI, an indication of a set of TCI states. In some cases, the set of TCI states includes two TCI states. The TDRA component 1030 may determine that the TDRA entry indicated by the DCI includes the repetition number. In some examples, the TDRA component 1030 may determine that the TDRA entry indicated by the DCI excludes the repetition number.

In some examples, the TDRA component 1030 may receive a configuration of the TDRA table via RRC signaling. In some cases, the TDRA entry is from a TDRA table that includes a set of TDRA entries, and where at least one TDRA entry of the set of TDRA entries includes the repetition number. In some cases, the repetition number is indicated by at least one column of the TDRA table.

Figure 11:
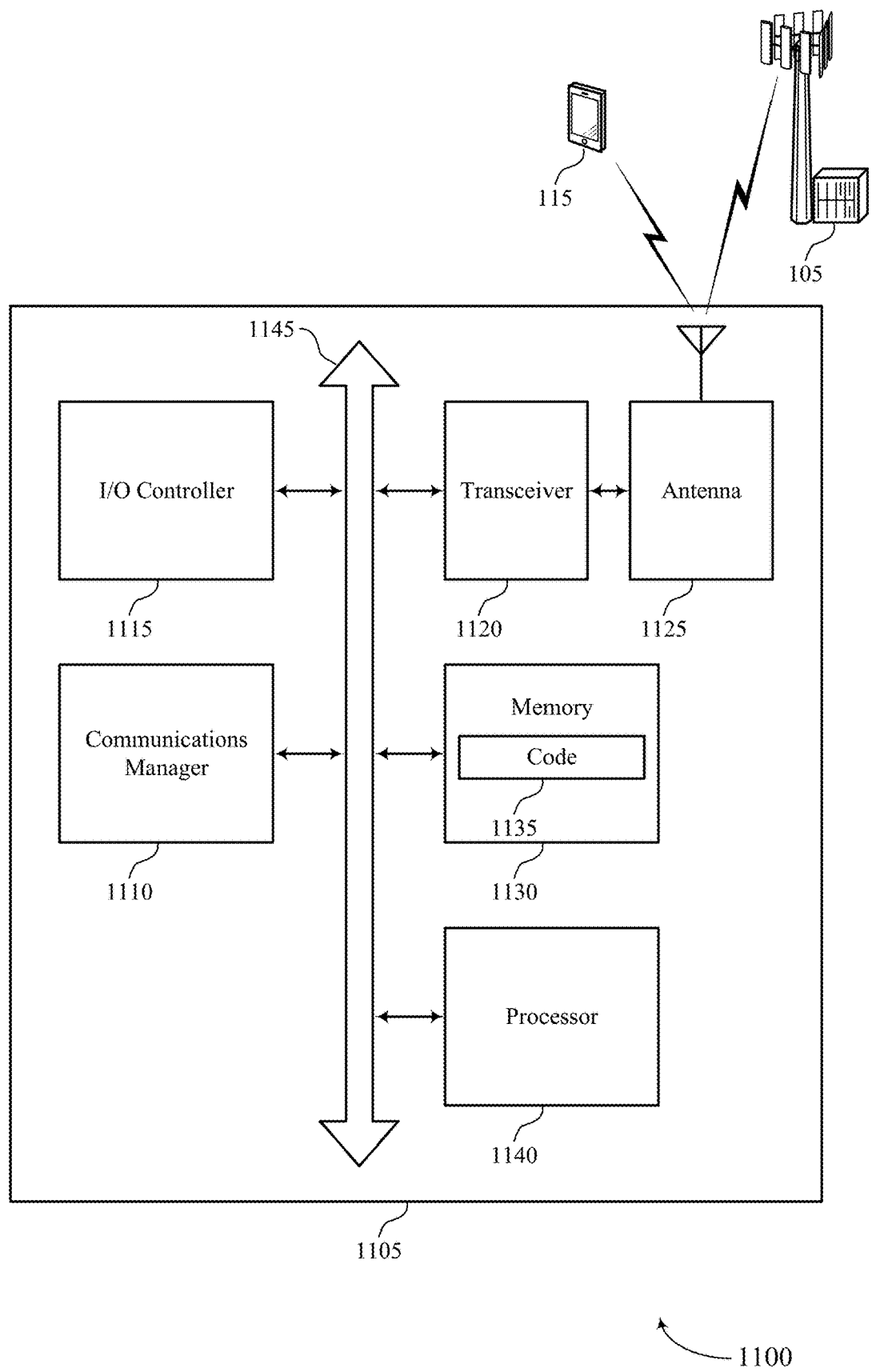
FIG. 11 shows a diagram of a system including a device that supports techniques for dynamically aggregating a PDSCH for SPS in accordance with aspects of the present disclosure.

FIG. 11 shows a diagram of a system 1100 including a device 1105 that supports techniques for dynamically aggregating a PDSCH for SPS in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a PDSCH configuration and an SPS configuration from a set of one or more SPS configurations, receive DCI associated with a PDSCH transmission for the SPS configuration, determine, based on a rule, a repetition number for a number of expected instances of the PDSCH transmission, where the rule is based on a priority between a TDRA entry indicated by the DCI and at least one of the PDSCH configuration or the SPS configuration, and receive, within each SPS time period of a set of SPS time periods, one or more instances of the PDSCH transmission in accordance with the repetition number.

The communications manager 1110 may also receive an SPS configuration from a set of one or more SPS configurations, identify a repetition scheme configuration, receive DCI associated with a PDSCH transmission for the SPS configuration, identify, within the DCI, an indication of a set of TCI states, and receive one or more repetitions of the PDSCH transmission based on the repetition scheme configuration, or the set of TCI states, or a combination thereof.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for dynamically aggregating a PDSCH for SPS).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
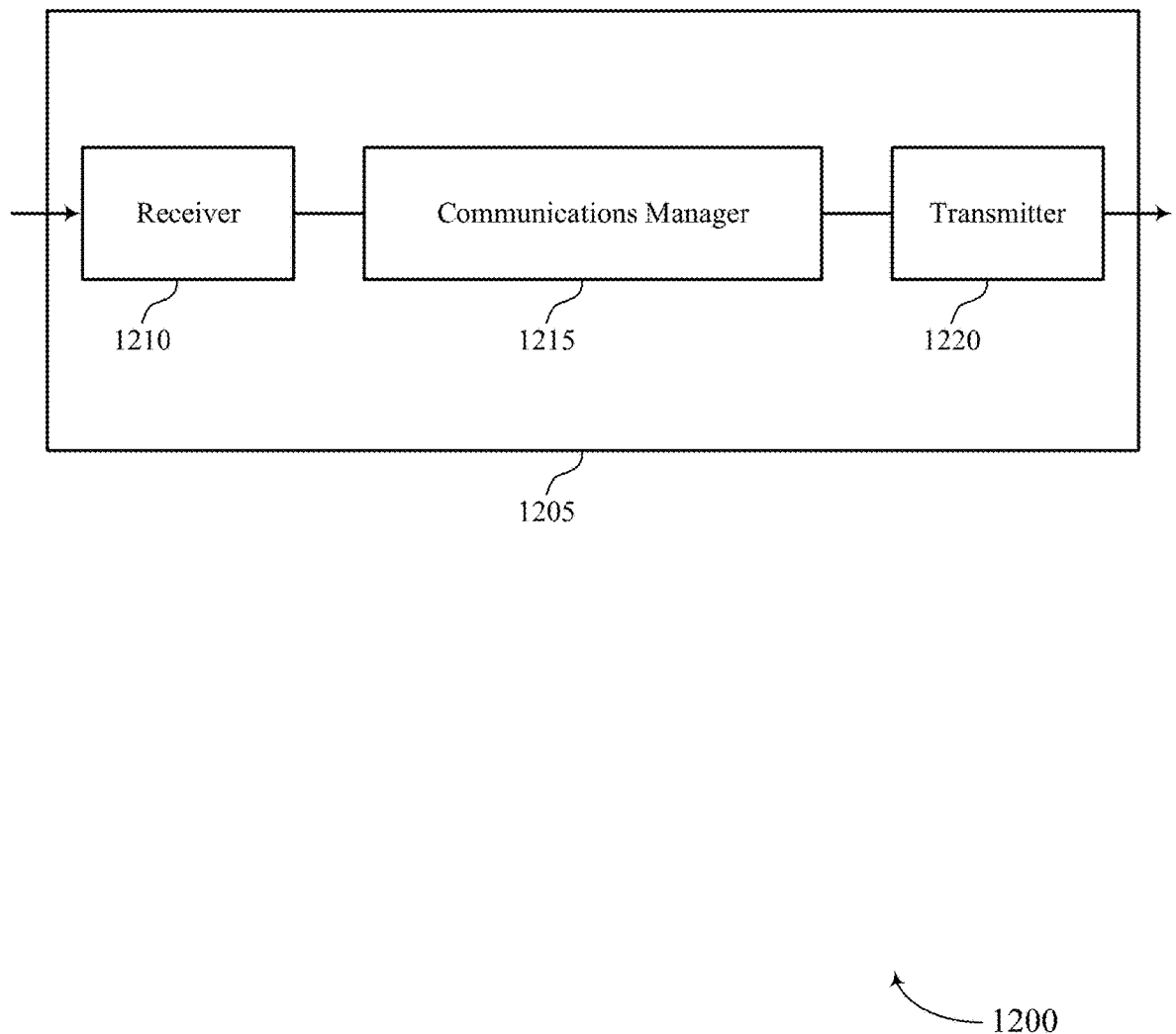
FIGS. 12 and 13 show block diagrams of devices that support techniques for dynamically aggregating a PDSCH for SPS in accordance with aspects of the present disclosure.

FIG. 12 shows a block diagram 1200 of a device 1205 that supports techniques for dynamically aggregating a PDSCH for SPS in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for dynamically aggregating a PDSCH for SPS, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, a PDSCH configuration and an SPS configuration from a set of one or more SPS configurations, transmit, to the UE, DCI associated with a PDSCH transmission for the SPS configuration, determine, based on a rule, a repetition number for a number of expected instances of the PDSCH transmission, where the rule is based on a priority between a TDRA entry indicated by the DCI and at least one of the PDSCH configuration or the SPS configuration, and transmit, within each SPS time period of a set of SPS time periods, one or more instances of the PDSCH transmission in accordance with the repetition number. The communications manager 1215 may also transmit, to a UE, an SPS configuration from a set of one or more SPS configurations, configure a repetition scheme for the UE, transmit, to the UE, DCI associated with a PDSCH transmission for the SPS configuration, configure, within the DCI, an indication of a set of TCI states, and transmit one or more repetitions of the PDSCH transmission to the UE based on the configured repetition scheme, or the set of TCI states, or a combination thereof. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
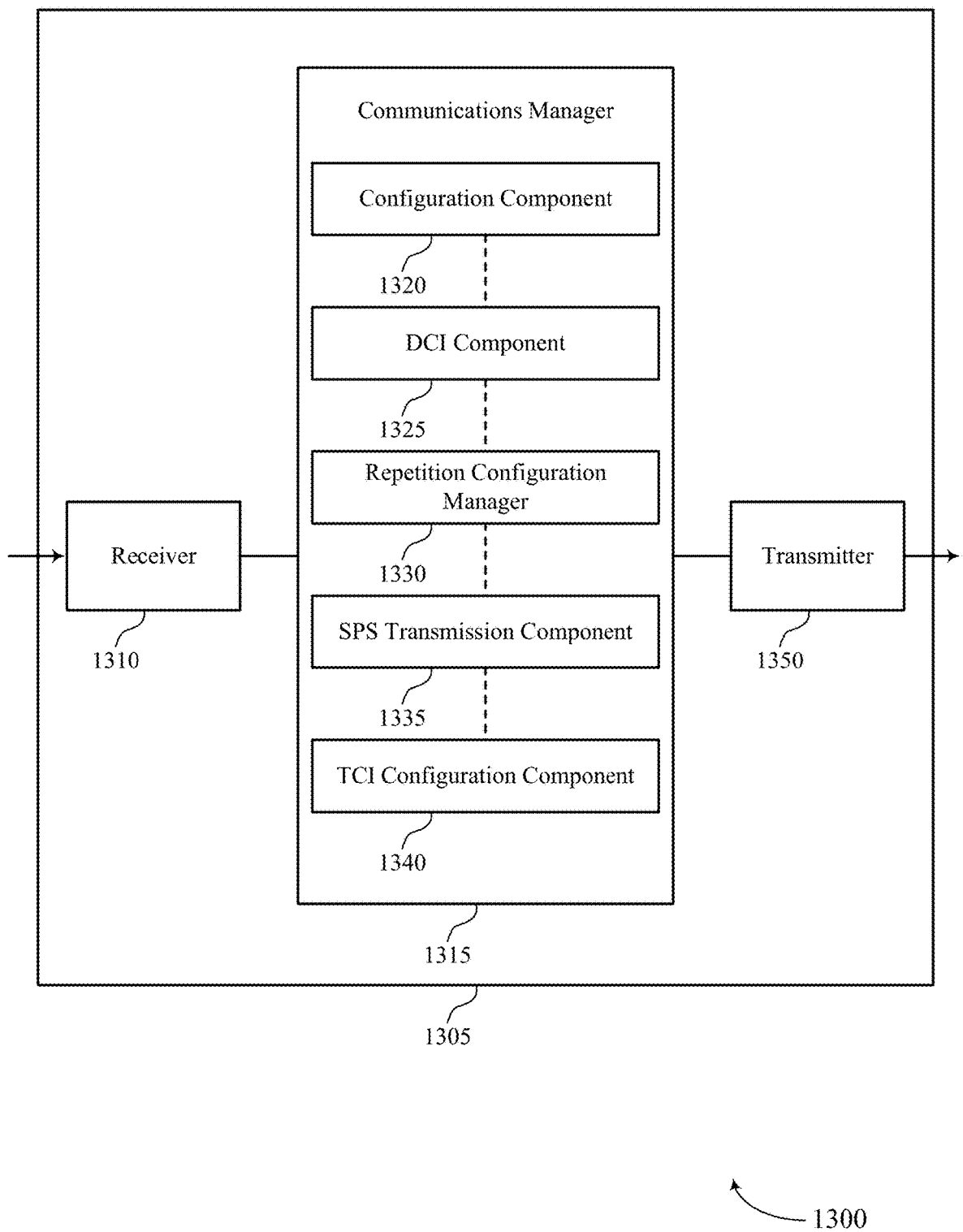

FIG. 13 shows a block diagram 1300 of a device 1305 that supports techniques for dynamically aggregating a PDSCH for SPS in accordance with aspects of the present disclosure. The device 1305 may be an example of aspects of a device 1205, or a base station 105 as described herein. The device 1305 may include a receiver 1310, a communications manager 1315, and a transmitter 1350. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for dynamically aggregating a PDSCH for SPS, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration component 1320, a DCI component 1325, a repetition configuration manager 1330, an SPS transmission component 1335, and TCI configuration component 1340. The communications manager 1315 may be an example of aspects of the communications manager 1510 described herein.

The configuration component 1320 may transmit, to a UE, a PDSCH configuration and an SPS configuration from a set of one or more SPS configurations. In some cases, the configuration component 1320 may configure a repetition scheme for the UE.

The DCI component 1325 may transmit, to the UE, DCI associated with a PDSCH transmission for the SPS configuration. The repetition configuration manager 1330 may determine, based on a rule, a repetition number for a number of expected instances of the PDSCH transmission, where the rule is based on a priority between a TDRA entry indicated by the DCI and at least one of the PDSCH configuration or the SPS configuration.

The SPS transmission component 1335 may transmit, within each SPS time period of a set of SPS time periods, one or more instances of the PDSCH transmission in accordance with the repetition number. The SPS transmission component 1335 may transmit one or more repetitions of the PDSCH transmission to the UE based on the configured repetition scheme, or the set of TCI states, or a combination thereof. The TCI configuration component 1340 may configure, within the DCI, an indication of a set of TCI states.

The transmitter 1350 may transmit signals generated by other components of the device 1305. In some examples, the transmitter 1350 may be collocated with a receiver 1310 in a transceiver module. For example, the transmitter 1350 may be an example of aspects of the transceiver 1520 described with reference to FIG. 15. The transmitter 1350 may utilize a single antenna or a set of antennas.

Figure 14:
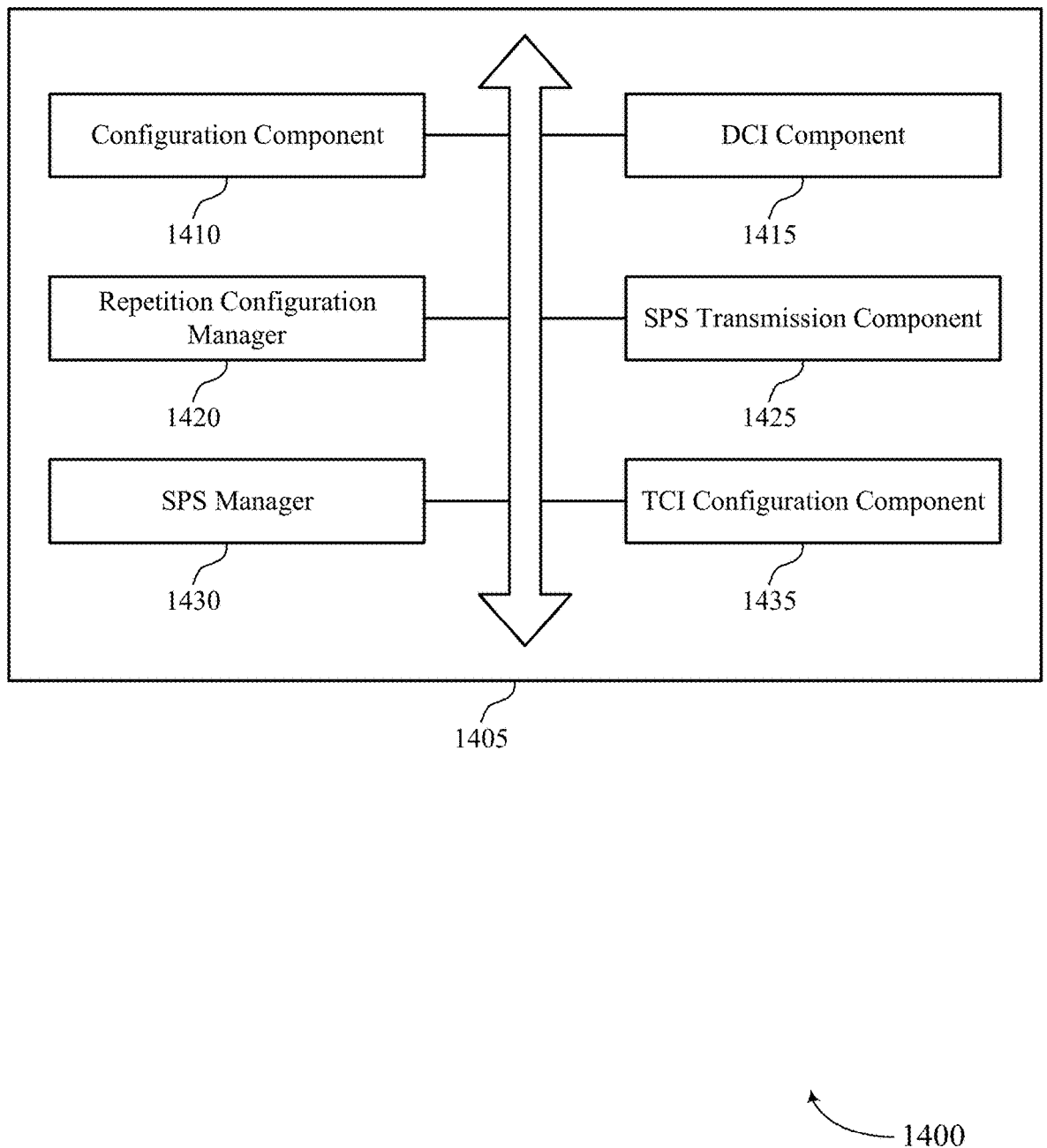
FIG. 14 shows a block diagram of a communications manager that supports techniques for dynamically aggregating a PDSCH for SPS in accordance with aspects of the present disclosure.

FIG. 14 shows a block diagram 1400 of a communications manager 1405 that supports techniques for dynamically aggregating a PDSCH for SPS in accordance with aspects of the present disclosure. The communications manager 1405 may be an example of aspects of a communications manager 1215, a communications manager 1315, or a communications manager 1510 described herein. The communications manager 1405 may include a configuration component 1410, a DCI component 1415, a repetition configuration manager 1420, an SPS transmission component 1425, an SPS manager 1430, and a TCI configuration component 1435. Each of these modules may communicate, directly or indirectly, with one another (e.g., via one or more buses).

The configuration component 1410 may transmit, to a UE, a PDSCH configuration and an SPS configuration from a set of one or more SPS configurations. In some examples, the configuration component 1410 may configure a first aggregation factor as part of the PDSCH configuration. In some examples, the configuration component 1410 may configure a first aggregation factor as part of the SPS configuration, where a number of a set of consecutive slot time periods corresponds to a value of the first aggregation factor. In some examples, the configuration component 1410 may configure, based on the SPS configuration excluding a configuration of a first aggregation factor, a second aggregation factor as part of a PDSCH configuration.

In some examples, the configuration component 1410 may transmit the PDSCH configuration to the UE, where a number of the set of consecutive slot time periods corresponds to a value of the second aggregation factor. In some examples, the configuration component 1410 may transmit an indication of the configured repetition scheme as part of the SPS configuration. In some examples, the configuration component 1410 may transmit, to the UE, a PDSCH configuration including an indication of the configured repetition scheme, where the SPS configuration excludes the indication of the configured repetition scheme. In some cases, the repetition scheme may include a first frequency division multiplexing scheme, a second frequency division multiplexing scheme, or a time division multiplexing scheme. The configuration component 1410 may configure a repetition scheme for the UE.

The DCI component 1415 may transmit, to the UE, DCI associated with a PDSCH transmission for the SPS configuration. In some cases, the DCI includes a new data indicator equal to zero, and where the DCI activates the SPS configuration. In some cases, the DCI includes a new data indicator equal to one, and where the PDSCH transmission includes a retransmission of semi-persistently scheduled PDSCH scheduled by the DCI. In some cases, the DCI has a DCI format 1_1. Additionally or alternatively, the DCI has a DCI format 1_2. In some cases, the DCI has a cyclic redundancy check that is scrambled by a configured scheduling radio network temporary identifier, the DCI including a NDI equal to zero, and where the DCI activates the SPS configuration.

The repetition configuration manager 1420 may determine, based on a rule, a repetition number for a number of expected instances of the PDSCH transmission, where the rule is based on a priority between a TDRA entry indicated by the DCI and at least one of the PDSCH configuration or the SPS configuration. In some examples, the repetition configuration manager 1420 may determine that the TDRA entry indicated by the DCI includes the repetition number. In some examples, the repetition configuration manager 1420 may determine that the TDRA entry indicated by the DCI excludes the repetition number.

In some examples, determining that the TDRA entry indicated by the DCI excludes the repetition number, where the SPS configuration includes a configuration of a first aggregation factor.

In some examples, the repetition configuration manager 1420 may determine that the TDRA entry indicated by the DCI excludes the repetition number, where the SPS configuration excludes a configuration of a first aggregation factor and the PDSCH configuration includes a configuration of a second aggregation factor. In some examples, the repetition configuration manager 1420 may determine that the TDRA entry indicated by the DCI excludes the repetition number, where the SPS configuration excludes a configuration of a first aggregation factor and the PDSCH configuration excludes a configuration of a second aggregation factor.

In some examples, the repetition configuration manager 1420 may configure a first aggregation factor as part of the SPS configuration. In some examples, determining that the SPS configuration excludes a configuration of a first aggregation factor, where the PDSCH configuration includes a configuration of a second aggregation factor. In some examples, the repetition configuration manager 1420 may transmit, to the UE, a configuration of the TDRA table via radio resource control signaling.

In some cases, the TDRA entry is an entry from a TDRA table that includes a set of TDRA entries, and where at least one TDRA entry of the set of TDRA entries includes the repetition number. In some cases, the repetition number is indicated by at least one column of the TDRA table.

The SPS transmission component 1425 may transmit, within each SPS time period of a set of SPS time periods, one or more instances of the PDSCH transmission in accordance with the repetition number. In some examples, the SPS transmission component 1425 may transmit one or more repetitions of the PDSCH transmission to the UE based on the configured repetition scheme, or the set of TCI states, or a combination thereof.

In some examples, the SPS transmission component 1425 may identify a number of repetitions of the PDSCH transmission based at least in part on a value of the repetition number, where two or more instances of the PDSCH transmission are transmitted based on the identified number of repetitions. In some examples, the SPS transmission component 1425 may determine that the number of expected instances of the PDSCH transmission is equal to one based on the TDRA entry excluding the repetition number, where a single instance of the PDSCH transmission is transmitted based on the number of expected instances. Additionally or alternatively, the SPS transmission component 1425 may identify a number of repetitions of the PDSCH transmission corresponding to a value of the first aggregation factor, where two or more instances of the PDSCH transmission are transmitted based on the identified number of repetitions.

In some examples, the SPS transmission component 1425 may identify a number of repetitions of the PDSCH transmission corresponding to a value of the second aggregation factor, where two or more instances of the PDSCH transmission are transmitted based on the identified number of repetitions. In some examples, the SPS transmission component 1425 may determine that the number of expected instances of the PDSCH transmission is equal to one based on the TDRA entry excluding the repetition number, the SPS configuration excluding a configuration of the first aggregation factor, and the PDSCH configuration excluding a configuration of the second aggregation factor, where a single instance of the PDSCH transmission is transmitted based on the number of expected instances.

In some examples, the SPS transmission component 1425 may determine that the number of expected instances of the PDSCH transmission is equal to one based on the SPS configuration excluding a configuration of a first aggregation factor and the PDSCH configuration excluding a configuration of a second aggregation factor, where a single instance of the PDSCH transmission is transmitted based on the number of expected instances. In some cases, the SPS transmission component 1425 may determine that the number of expected instances of the PDSCH transmission is equal to one based on the PDSCH configuration excluding a configuration of a first aggregation factor, where a single instance of the PDSCH transmission is transmitted based on the number of expected instances.

In some examples, the SPS transmission component 1425 may transmit the one or more repetitions of the PDSCH transmission within a same slot time period, the slot time period occurring within each SPS time period of a set of SPS time periods. In some examples, the SPS transmission component 1425 may transmit the one or more repetitions of the PDSCH transmission within a set of consecutive slot time periods occurring within each SPS time period of a set of SPS time periods, each slot time period of the set of consecutive slot time periods including two repetitions of the PDSCH transmission. In some cases, the number of repetitions of the PDSCH transmission are within a time period that is less than or equal to the SPS time period.

TCI configuration component 1435 may configure, within the DCI, an indication of a set of TCI states. In some cases, the set of TCI states includes two TCI states. In some cases, the one or more instances of the PDSCH transmission are received in a different slot time period of a set of consecutive slot time periods.

Figure 15:
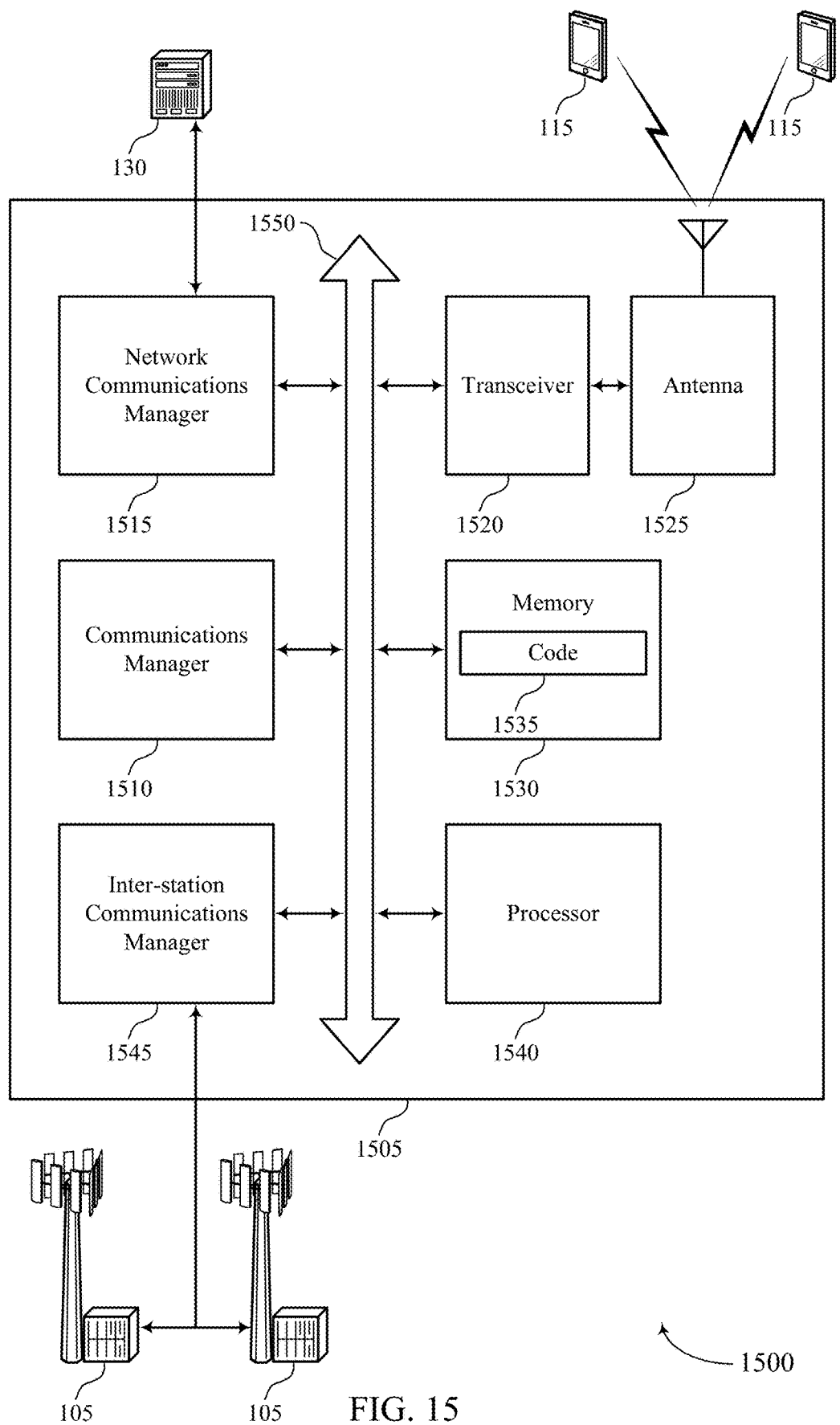
FIG. 15 shows a diagram of a system including a device that supports techniques for dynamically aggregating a PDSCH for SPS in accordance with aspects of the present disclosure.

FIG. 15 shows a diagram of a system 1500 including a device 1505 that supports techniques for dynamically aggregating a PDSCH for SPS in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, a PDSCH configuration and an SPS configuration from a set of one or more SPS configurations, transmit, to the UE, DCI associated with a PDSCH transmission for the SPS configuration, determine, based on a rule, a repetition number for a number of expected instances of the PDSCH transmission, where the rule is based on a priority between a TDRA entry indicated by the DCI and at least one of the PDSCH configuration or the SPS configuration, and transmit, within each SPS time period of a set of SPS time periods, one or more instances of the PDSCH transmission in accordance with the repetition number. The communications manager 1510 may also transmit, to a UE, an SPS configuration from a set of one or more SPS configurations, configure a repetition scheme for the UE, transmit, to the UE, DCI associated with a PDSCH transmission for the SPS configuration, configure, within the DCI, an indication of a set of TCI states, and transmit one or more repetitions of the PDSCH transmission to the UE based on the configured repetition scheme, or the set of TCI states, or a combination thereof.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting techniques for dynamically aggregating a PDSCH for SPS).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
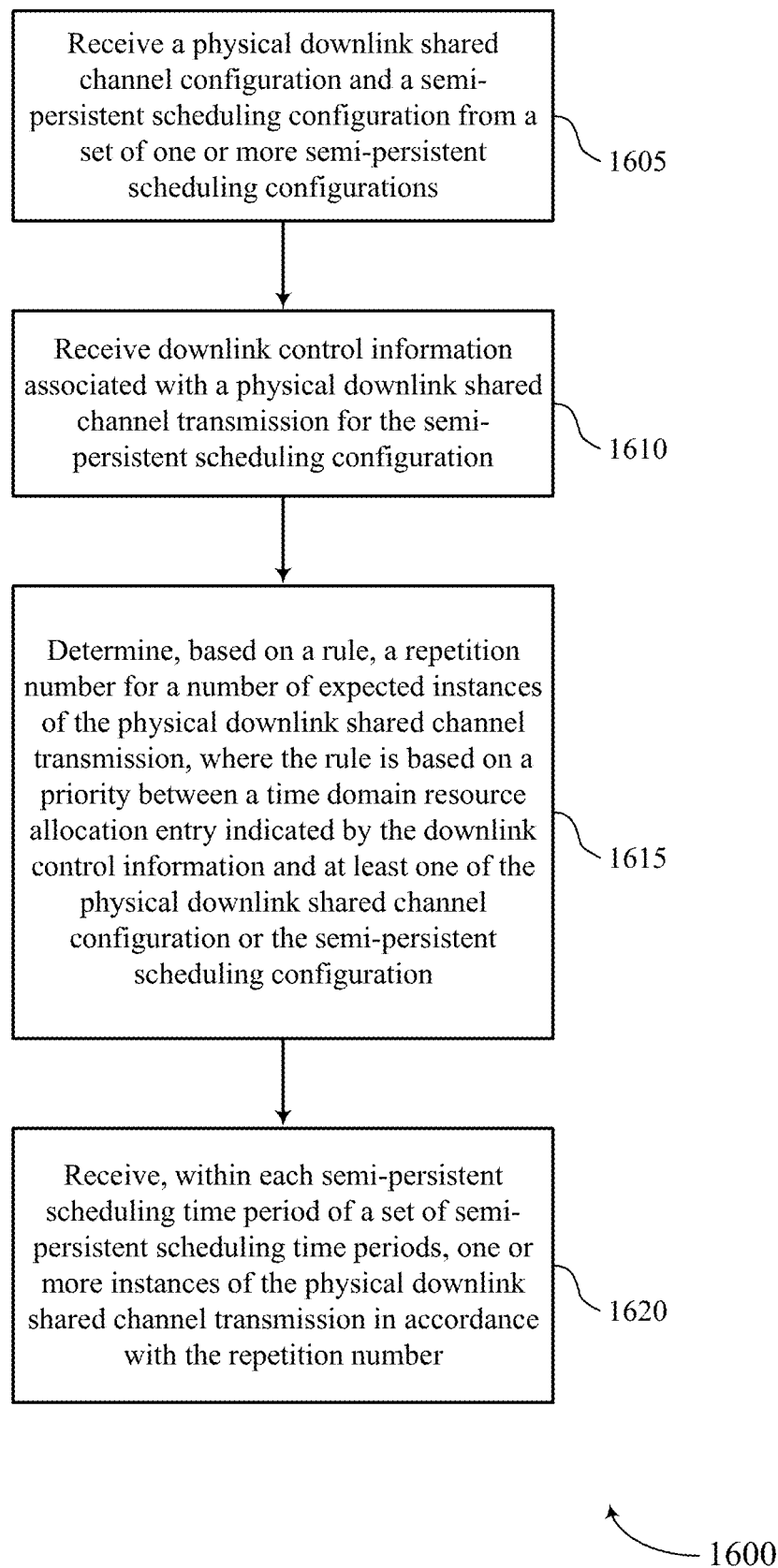
FIGS. 16 through 19 show flowcharts illustrating methods that support techniques for dynamically aggregating a PDSCH for SPS in accordance with aspects of the present disclosure.

FIG. 16 shows a flowchart illustrating a method 1600 that supports techniques for dynamically aggregating a PDSCH for SPS in accordance with aspects of the present disclosure.

The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive a PDSCH configuration and an SPS configuration from a set of one or more SPS configurations. The operations of 1605 may be performed according to the methods described herein. In some examples, aspects of the operations of 1605 may be performed by a configuration manager as described with reference to FIGS. 8 through 11.

At 1610, the UE may receive DCI associated with a PDSCH transmission for the SPS configuration. The operations of 1610 may be performed according to the methods described herein. In some examples, aspects of the operations of 1610 may be performed by an SPS manager as described with reference to FIGS. 8 through 11.

At 1615, the UE may determine, based on a rule, a repetition number for a number of expected instances of the PDSCH transmission, where the rule is based on a priority between a TDRA entry indicated by the DCI and at least one of the PDSCH configuration or the SPS configuration. The operations of 1615 may be performed according to the methods described herein. In some examples, aspects of the operations of 1615 may be performed by a repetition manager as described with reference to FIGS. 8 through 11.

At 1620, the UE may receive, within each SPS time period of a set of SPS time periods, one or more instances of the PDSCH transmission in accordance with the repetition number. The operations of 1620 may be performed according to the methods described herein. In some examples, aspects of the operations of 1620 may be performed by a PDSCH component as described with reference to FIGS. 8 through 11.

Figure 17:
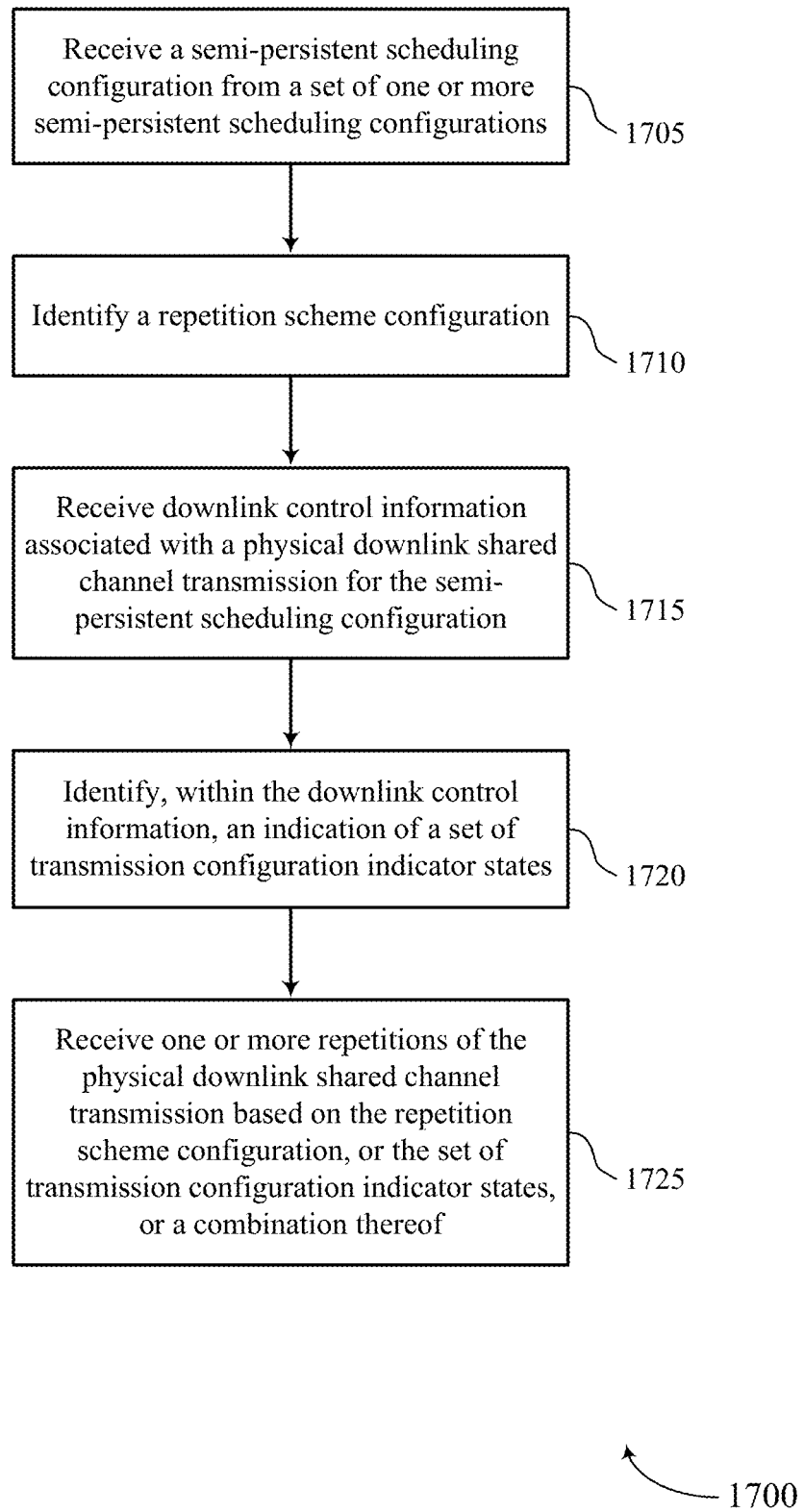

FIG. 17 shows a flowchart illustrating a method 1700 that supports techniques for dynamically aggregating a PDSCH for SPS in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive an SPS configuration from a set of one or more SPS configurations. The operations of 1705 may be performed according to the methods described herein. In some examples, aspects of the operations of 1705 may be performed by a configuration manager as described with reference to FIGS. 8 through 11.

At 1710, the UE may identify a repetition scheme configuration. The operations of 1710 may be performed according to the methods described herein. In some examples, aspects of the operations of 1710 may be performed by a configuration manager as described with reference to FIGS. 8 through 11.

At 1715, the UE may receive DCI associated with a PDSCH transmission for the SPS configuration. The operations of 1715 may be performed according to the methods described herein. In some examples, aspects of the operations of 1715 may be performed by an SPS manager as described with reference to FIGS. 8 through 11.

At 1720, the UE may identify, within the DCI, an indication of a set of TCI states. The operations of 1720 may be performed according to the methods described herein. In some examples, aspects of the operations of 1720 may be performed by a TCI state manager as described with reference to FIGS. 8 through 11.

At 1725, the UE may receive one or more repetitions of the PDSCH transmission based on the repetition scheme configuration, or the set of TCI states, or a combination thereof. The operations of 1725 may be performed according to the methods described herein. In some examples, aspects of the operations of 1725 may be performed by a PDSCH component as described with reference to FIGS. 8 through 11.

Figure 18:
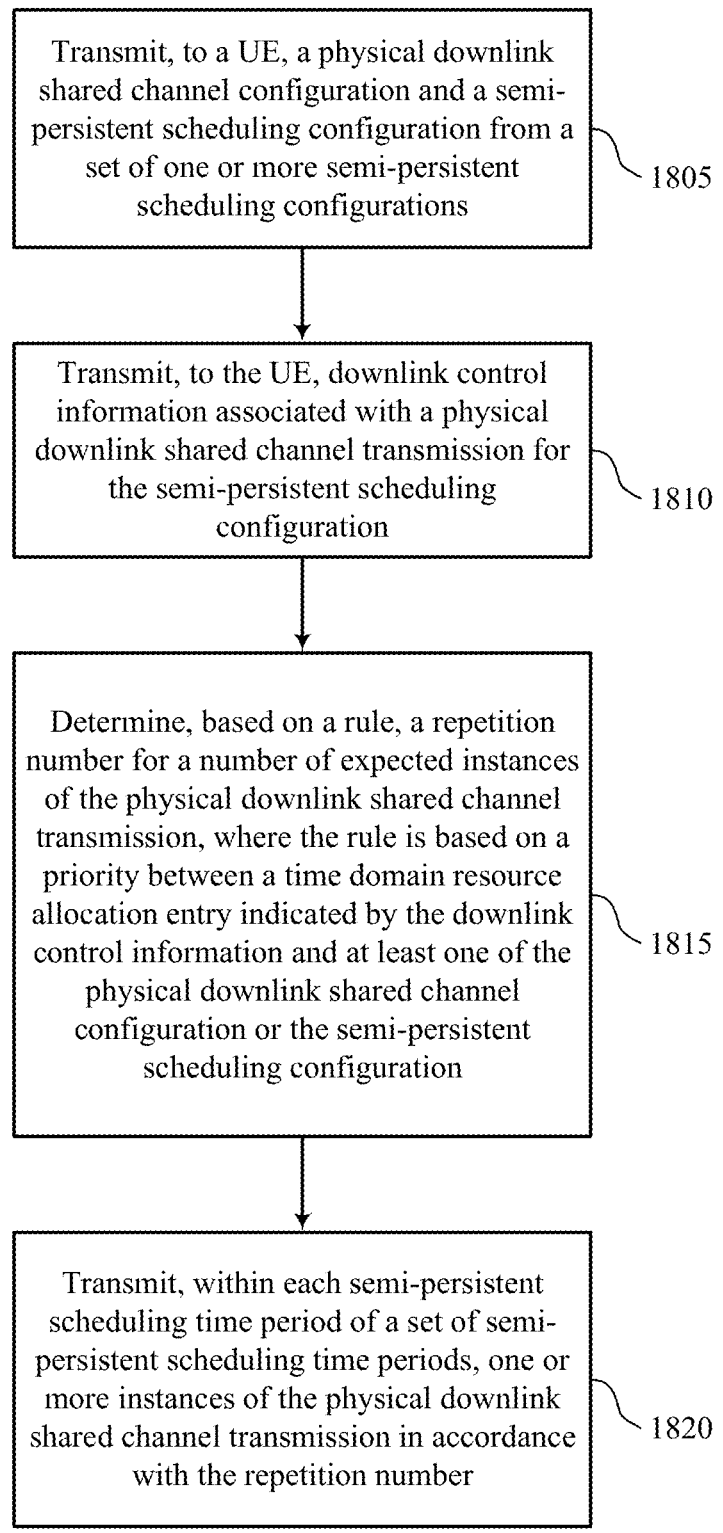

FIG. 18 shows a flowchart illustrating a method 1800 that supports techniques for dynamically aggregating a PDSCH for SPS in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, a PDSCH configuration and an SPS configuration from a set of one or more SPS configurations. The operations of 1805 may be performed according to the methods described herein. In some examples, aspects of the operations of 1805 may be performed by a configuration component as described with reference to FIGS. 12 through 15.

At 1810, the base station may transmit, to the UE, DCI associated with a PDSCH transmission for the SPS configuration. The operations of 1810 may be performed according to the methods described herein. In some examples, aspects of the operations of 1810 may be performed by a DCI component as described with reference to FIGS. 12 through 15.

At 1815, the base station may determine, based on a rule, a repetition number for a number of expected instances of the PDSCH transmission, where the rule is based on a priority between a TDRA entry indicated by the DCI and at least one of the PDSCH configuration or the SPS configuration. The operations of 1815 may be performed according to the methods described herein. In some examples, aspects of the operations of 1815 may be performed by a repetition configuration manager as described with reference to FIGS. 12 through 15.

At 1820, the base station may transmit, within each SPS time period of a set of SPS time periods, one or more instances of the PDSCH transmission in accordance with the repetition number. The operations of 1820 may be performed according to the methods described herein. In some examples, aspects of the operations of 1820 may be performed by an SPS transmission component as described with reference to FIGS. 12 through 15.

Figure 19:
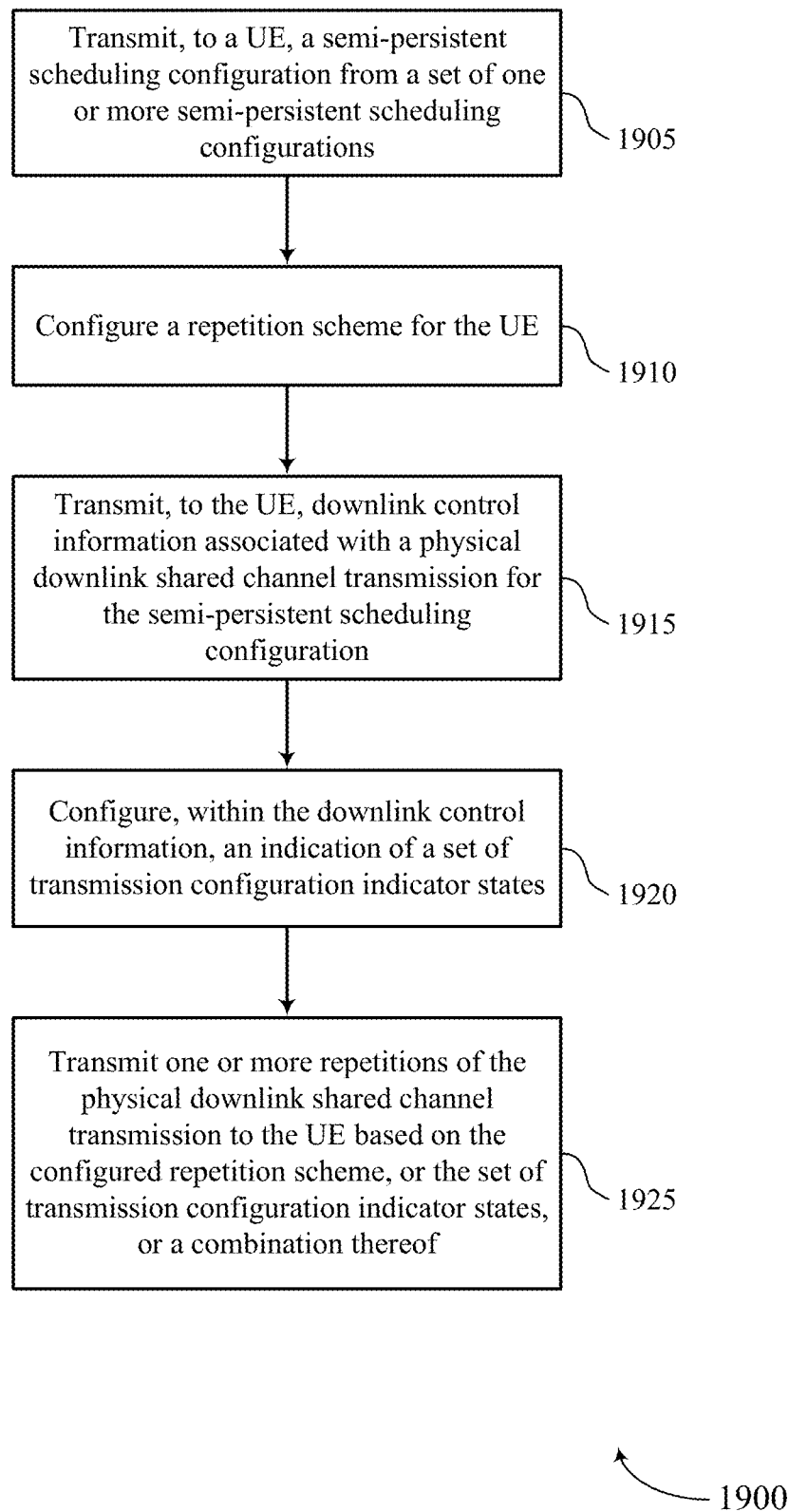

FIG. 19 shows a flowchart illustrating a method 1900 that supports techniques for dynamically aggregating a PDSCH for SPS in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may transmit, to a UE, an SPS configuration from a set of one or more SPS configurations. The operations of 1905 may be performed according to the methods described herein. In some examples, aspects of the operations of 1905 may be performed by a configuration component as described with reference to FIGS. 12 through 15.

At 1910, the base station may configure a repetition scheme for the UE. The operations of 1910 may be performed according to the methods described herein. In some examples, aspects of the operations of 1910 may be performed by a configuration component as described with reference to FIGS. 12 through 15.

At 1915, the base station may transmit, to the UE, DCI associated with a PDSCH transmission for the SPS configuration. The operations of 1915 may be performed according to the methods described herein. In some examples, aspects of the operations of 1915 may be performed by a DCI component as described with reference to FIGS. 12 through 15.

At 1920, the base station may configure, within the DCI, an indication of a set of TCI states. The operations of 1920 may be performed according to the methods described herein. In some examples, aspects of the operations of 1920 may be performed by a TCI configuration component as described with reference to FIGS. 12 through 15.

At 1925, the base station may transmit one or more repetitions of the PDSCH transmission to the UE based on the configured repetition scheme, or the set of TCI states, or a combination thereof. The operations of 1925 may be performed according to the methods described herein. In some examples, aspects of the operations of 1925 may be performed by an SPS transmission component as described with reference to FIGS. 12 through 15.

The following provides an overview of aspects of the present disclosure:

Aspect 1: A method for wireless communication at a UE, comprising: receiving a physical downlink shared channel configuration and a semi-persistent scheduling configuration from a set of one or more semi-persistent scheduling configurations; receiving downlink control information associated with a physical downlink shared channel transmission for the semi-persistent scheduling configuration; determining, based at least in part on a rule, a repetition number for a number of expected instances of the physical downlink shared channel transmission, wherein the rule is based at least in part on a priority between a time domain resource allocation entry indicated by the downlink control information and at least one of the physical downlink shared channel configuration or the semi-persistent scheduling configuration; and receiving, within each semi-persistent scheduling time period of a plurality of semi-persistent scheduling time periods, one or more instances of the physical downlink shared channel transmission in accordance with the repetition number.

Aspect 2: The method of aspect 1, wherein determining the repetition number based at least in part on the rule comprises: determining that the physical downlink shared channel configuration excludes a configuration of a first aggregation factor or the semi-persistent scheduling configuration excludes a configuration of a second aggregation factor, or a combination thereof.

Aspect 3: The method of any of aspects 1 through 2, wherein determining the repetition number based at least in part on the rule comprises: determining that the time domain resource allocation entry indicated by the downlink control information includes the repetition number; and identifying a number of repetitions of the physical downlink shared channel transmission based at least in part on a value of the repetition number, wherein two or more instances of the physical downlink shared channel transmission are received based at least in part on the identified number of repetitions.

Aspect 4: The method of aspect 3, wherein the number of repetitions of the physical downlink shared channel transmission are within a time period that is less than or equal to the semi-persistent scheduling time period.

Aspect 5: The method of any of aspects 1 through 4, wherein determining the repetition number based at least in part on the rule comprises: determining that the time domain resource allocation entry indicated by the downlink control information excludes the repetition number; and determining that the number of expected instances of the physical downlink shared channel transmission is equal to one based at least in part on the time domain resource allocation entry excluding the repetition number, wherein a single instance of the physical downlink shared channel transmission is received based at least in part on the number of expected instances.

Aspect 6: The method of any of aspects 1 through 4, wherein determining the repetition number based at least in part on the rule comprises: determining that the time domain resource allocation entry indicated by the downlink control information excludes the repetition number; identifying, based at least in part on the time domain resource allocation entry excluding the repetition number, a configuration of a first aggregation factor from the semi-persistent scheduling configuration; and identifying a number of repetitions of the physical downlink shared channel transmission corresponding to a value of the first aggregation factor, wherein two or more instances of the physical downlink shared channel transmission are received based at least in part on the identified number of repetitions.

Aspect 7: The method of any of aspects 1 through 4, wherein determining the repetition number based at least in part on the rule comprises: determining that the time domain resource allocation entry indicated by the downlink control information excludes the repetition number; determining, based at least in part on the time domain resource allocation entry excluding the repetition number, that the semi-persistent scheduling configuration excludes a configuration of a first aggregation factor; identifying, based at least in part on the semi-persistent scheduling configuration excluding the configuration of the first aggregation factor, a configuration of a second aggregation factor from the physical downlink shared channel configuration; and identifying a number of repetitions of the physical downlink shared channel transmission corresponding to a value of the second aggregation factor, wherein two or more instances of the physical downlink shared channel transmission are received based at least in part on the identified number of repetitions.

Aspect 8: The method of any of aspects 1 through 4, wherein determining the repetition number based at least in part on the rule comprises: determining that the time domain resource allocation entry indicated by the downlink control information excludes the repetition number; determining, based at least in part on the time domain resource allocation entry excluding the repetition number, that the semi-persistent scheduling configuration excludes a configuration of a first aggregation factor; determining, based at least in part on the semi-persistent scheduling configuration excluding the configuration of the first aggregation factor, that the physical downlink shared channel configuration excludes a configuration of a second aggregation factor; and determining that the number of expected instances of the physical downlink shared channel transmission is equal to one based at least in part on the time domain resource allocation entry excluding the repetition number, the semi-persistent scheduling configuration excluding the configuration of the first aggregation factor, and the physical downlink shared channel configuration excluding the configuration of the second aggregation factor, wherein a single instance of the physical downlink shared channel transmission is received based at least in part on the number of expected instances.

Aspect 9: The method of any of aspects 1 through 8, further comprising: identifying, from the semi-persistent scheduling configuration, a configuration of a first aggregation factor; and identifying a number of repetitions of the physical downlink shared channel transmission corresponding to a value of the first aggregation factor, wherein two or more instances of the physical downlink shared channel transmission are received based at least in part on the identified number of repetitions.

Aspect 10: The method of any of aspects 1 through 9, further comprising: determining that the semi-persistent scheduling configuration excludes a configuration of a first aggregation factor; identifying, based at least in part on the semi-persistent scheduling configuration excluding the configuration of the first aggregation factor, a configuration of a second aggregation factor from the physical downlink shared channel configuration; and identifying a number of repetitions of the physical downlink shared channel transmission corresponding to a value of the second aggregation factor, wherein two or more instances of the physical downlink shared channel transmission are received based at least in part on the identified number of repetitions.

Aspect 11: The method of any of aspects 1 through 10, further comprising: determining that the semi-persistent scheduling configuration excludes a configuration of a first aggregation factor; determining, based at least in part on the semi-persistent scheduling configuration excluding the configuration of the first aggregation factor, that the physical downlink shared channel configuration excludes a configuration of a second aggregation factor; and determining that the number of expected instances of the physical downlink shared channel transmission is equal to one based at least in part on the semi-persistent scheduling configuration excluding the configuration of the first aggregation factor and the physical downlink shared channel configuration excluding the configuration of the second aggregation factor, wherein a single instance of the physical downlink shared channel transmission is received based at least in part on the number of expected instances.

Aspect 12: The method of any of aspects 1 through 11, further comprising: identifying, from the physical downlink shared channel configuration, a configuration of a first aggregation factor; and identifying a number of repetitions of the physical downlink shared channel transmission corresponding to a value of the first aggregation factor, wherein two or more instances of the physical downlink shared channel transmission are received based at least in part on the identified number of repetitions.

Aspect 13: The method of any of aspects 1 through 12, further comprising: determining that the number of expected instances of the physical downlink shared channel transmission is equal to one based at least in part on the physical downlink shared channel configuration excluding a configuration of a first aggregation factor, wherein a single instance of the physical downlink shared channel transmission is received based at least in part on the number of expected instances.

Aspect 14: The method of any of aspects 1 through 13, further comprising: receiving a configuration of the time domain resource allocation table via radio resource control signaling, wherein the time domain resource allocation table comprises a plurality of time domain resource allocation entries, and wherein at least one time domain resource allocation entry of the plurality of time domain resource allocation entries includes the repetition number indicated by at least one column of the time domain resource allocation table.

Aspect 15: The method of any of aspects 1 through 14, wherein the downlink control information has a cyclic redundancy check that is scrambled by a configured scheduling radio network temporary identifier, the downlink control information comprising a new data indicator equal to zero, and the downlink control information activates the semi-persistent scheduling configuration.

Aspect 16: The method of any of aspects 1 through 14, wherein the downlink control information has a cyclic redundancy check that is scrambled by a configured scheduling radio network temporary identifier, the downlink control information comprising a new data indicator equal to one, and the physical downlink shared channel transmission comprises a retransmission of semi-persistently scheduled physical downlink shared channel scheduled by the downlink control information.

Aspect 17: The method of any of aspects 1 through 16, wherein the one or more instances of the physical downlink shared channel transmission are received in a different slot time period of a plurality of consecutive slot time periods.

Aspect 18: The method of any of aspects 1 through 17, wherein the downlink control information has a downlink control information format 1_1 or 1_2.

Aspect 19: The method of any of aspects 1 through 18, wherein the physical downlink shared channel configuration and the semi-persistent scheduling configuration are received via radio resource control signaling.

Aspect 20: A method for wireless communication at a UE, comprising: receiving a semi-persistent scheduling configuration from a set of one or more semi-persistent scheduling configurations; identifying a repetition scheme configuration; receiving downlink control information associated with a physical downlink shared channel transmission for the semi-persistent scheduling configuration; identifying, within the downlink control information, an indication of a plurality of transmission configuration indicator states; and receiving one or more repetitions of the physical downlink shared channel transmission based at least in part on the repetition scheme configuration, or the plurality of transmission configuration indicator states, or a combination thereof.

Aspect 21: The method of aspect 20, further comprising: identifying a number of the one or more repetitions of a physical downlink shared channel based at least in part on the physical downlink shared channel excluding a configuration of a first aggregation factor or the semi-persistent scheduling configuration excluding a configuration of a second aggregation factor, or a combination thereof.

Aspect 22: The method of any of aspects 20 through 21, wherein receiving the one or more repetitions of the physical downlink shared channel transmission comprises: receiving the one or more repetitions of the physical downlink shared channel transmission within a same slot time period, the slot time period occurring within each semi-persistent scheduling time period of a plurality of semi-persistent scheduling time periods.

Aspect 23: The method of any of aspects 20 through 21, wherein receiving the one or more repetitions of the physical downlink shared channel transmission comprises: receiving the one or more repetitions of the physical downlink shared channel transmission within a plurality of consecutive slot time periods occurring within each semi-persistent scheduling time period of a plurality of semi-persistent scheduling time periods, each slot time period of the plurality of consecutive slot time periods comprising two repetitions of the physical downlink shared channel transmission.

Aspect 24: The method of aspect 23, further comprising: identifying, from the semi-persistent scheduling configuration, a configuration of a first aggregation factor; and identifying a number of the plurality of consecutive slot time periods that corresponds to a value of the first aggregation factor.

Aspect 25: The method of any of aspects 23 through 24, further comprising: receiving a physical downlink shared channel configuration; determining that the semi-persistent scheduling configuration excludes a configuration of a first aggregation factor; identifying, based at least in part on the semi-persistent scheduling configuration excluding the configuration of the first aggregation factor, a configuration of a second aggregation factor from the physical downlink shared channel configuration; and identifying a number of the plurality of consecutive slot time periods that corresponds to a value of the second aggregation factor.

Aspect 26: The method of any of aspects 20 through 25, wherein identifying the repetition scheme configuration comprises: receiving a physical downlink shared channel configuration; and identifying the repetition scheme configuration based at least in part on the received physical downlink shared channel configuration, wherein the semi-persistent scheduling configuration excludes the repetition scheme configuration.

Aspect 27: The method of any of aspects 20 through 26, wherein the plurality of transmission configuration indicator states comprises two transmission configuration indicator states.

Aspect 28: The method of any of aspects 20 through 27, wherein the repetition scheme configuration is from a group consisting of a first frequency division multiplexing scheme, a second frequency division multiplexing scheme, and a time division multiplexing scheme.

Aspect 29: The method of any of aspects 20 through 28, wherein the downlink control information has a cyclic redundancy check that is scrambled by a configured scheduling radio network temporary identifier, the downlink control information comprising a new data indicator equal to zero, and the downlink control information activates the semi-persistent scheduling configuration.

Aspect 30: The method of any of aspects 20 through 29, wherein identifying the repetition scheme configuration comprises: identifying the repetition scheme configuration based at least in part on the received semi-persistent scheduling configuration.

Aspect 31: A method for wireless communication at a base station, comprising: transmitting, to a UE, a physical downlink shared channel configuration and a semi-persistent scheduling configuration from a set of one or more semi-persistent scheduling configurations; transmitting, to the UE, downlink control information associated with a physical downlink shared channel transmission for the semi-persistent scheduling configuration; determining, based at least in part on a rule, a repetition number for a number of expected instances of the physical downlink shared channel transmission, wherein the rule is based at least in part on a priority between a time domain resource allocation entry indicated by the downlink control information and at least one of the physical downlink shared channel configuration or the semi-persistent scheduling configuration; and transmitting, within each semi-persistent scheduling time period of a plurality of semi-persistent scheduling time periods, one or more instances of the physical downlink shared channel transmission in accordance with the repetition number.

Aspect 32: The method of aspect 31, wherein determining the repetition number based at least in part on the rule comprises: determining that the time domain resource allocation entry indicated by the downlink control information includes the repetition number; and identifying a number of repetitions of the physical downlink shared channel transmission based at least in part on a value of the repetition number, wherein two or more instances of the physical downlink shared channel transmission are transmitted based at least in part on the identified number of repetitions.

Aspect 33: The method of any of aspects 31 through 32, wherein the number of repetitions of the physical downlink shared channel transmission are within a time period that is less than or equal to the semi-persistent scheduling time period.

Aspect 34: The method of aspect 31, wherein determining the repetition number based at least in part on the rule comprises: determining that the time domain resource allocation entry indicated by the downlink control information excludes the repetition number; and determining that the number of expected instances of the physical downlink shared channel transmission is equal to one based at least in part on the time domain resource allocation entry excluding the repetition number, wherein a single instance of the physical downlink shared channel transmission is transmitted based at least in part on the number of expected instances.

Aspect 35: The method of aspect 31, wherein determining the repetition number based at least in part on the rule comprises: determining that the time domain resource allocation entry indicated by the downlink control information excludes the repetition number, wherein the semi-persistent scheduling configuration comprises a configuration of a first aggregation factor; and identifying a number of repetitions of the physical downlink shared channel transmission corresponding to a value of the first aggregation factor, wherein two or more instances of the physical downlink shared channel transmission are transmitted based at least in part on the identified number of repetitions.

Aspect 36: The method of aspect 31, wherein determining the repetition number based at least in part on the rule comprises: determining that the time domain resource allocation entry indicated by the downlink control information excludes the repetition number, wherein the semi-persistent scheduling configuration excludes a configuration of a first aggregation factor and the physical downlink shared channel configuration comprises a configuration of a second aggregation factor; and identifying a number of repetitions of the physical downlink shared channel transmission corresponding to a value of the second aggregation factor, wherein two or more instances of the physical downlink shared channel transmission are transmitted based at least in part on the identified number of repetitions.

Aspect 37: The method of aspect 31, wherein determining the repetition number based at least in part on the rule comprises: determining that the time domain resource allocation entry indicated by the downlink control information excludes the repetition number, wherein the semi-persistent scheduling configuration excludes a configuration of a first aggregation factor and the physical downlink shared channel configuration excludes a configuration of a second aggregation factor; and determining that the number of expected instances of the physical downlink shared channel transmission is equal to one based at least in part on the time domain resource allocation entry excluding the repetition number, the semi-persistent scheduling configuration excluding a configuration of the first aggregation factor, and the physical downlink shared channel configuration excluding a configuration of the second aggregation factor, wherein a single instance of the physical downlink shared channel transmission is transmitted based at least in part on the number of expected instances.

Aspect 38: The method of aspect 31, wherein determining the repetition number based at least in part on the rule comprises: configuring a first aggregation factor as part of the semi-persistent scheduling configuration; and identifying a number of repetitions of the physical downlink shared channel transmission corresponding to a value of the first aggregation factor, wherein two or more instances of the physical downlink shared channel transmission are transmitted based at least in part on the identified number of repetitions.

Aspect 39: The method of aspect 31, wherein determining the repetition number based at least in part on the rule comprises: determining that the semi-persistent scheduling configuration excludes a configuration of a first aggregation factor, wherein the physical downlink shared channel configuration comprises a configuration of a second aggregation factor; and identifying a number of repetitions of the physical downlink shared channel transmission corresponding to a value of the second aggregation factor, wherein two or more instances of the physical downlink shared channel transmission are transmitted based at least in part on the identified number of repetitions.

Aspect 40: The method of aspect 31, wherein determining the repetition number based at least in part on the rule comprises: determining that the number of expected instances of the physical downlink shared channel transmission is equal to one based at least in part on the semi-persistent scheduling configuration excluding a configuration of a first aggregation factor and the physical downlink shared channel configuration excluding a configuration of a second aggregation factor, wherein a single instance of the physical downlink shared channel transmission is transmitted based at least in part on the number of expected instances.

Aspect 41: The method of aspect 31, wherein determining the repetition number based at least in part on the rule comprises: configuring a first aggregation factor as part of the physical downlink shared channel configuration; and identifying a number of repetitions of the physical downlink shared channel transmission corresponding to a value of the first aggregation factor, wherein two or more instances of the physical downlink shared channel transmission are transmitted based at least in part on the identified number of repetitions.

Aspect 42: The method of aspect 31, wherein determining the repetition number based at least in part on the rule comprises: determining that the number of expected instances of the physical downlink shared channel transmission is equal to one based at least in part on the physical downlink shared channel configuration excluding a configuration of a first aggregation factor, wherein a single instance of the physical downlink shared channel transmission is transmitted based at least in part on the number of expected instances.

Aspect 43: The method of any of aspects 31 through 42, wherein the time domain resource allocation entry is an entry from a time domain resource allocation table that comprises a plurality of time domain resource allocation entries, and at least one time domain resource allocation entry of the plurality of time domain resource allocation entries includes the repetition number.

Aspect 44: The method of aspect 43, further comprising: transmitting, to the UE, a configuration of the time domain resource allocation table via radio resource control signaling.

Aspect 45: The method of any of aspects 43 through 44, wherein the repetition number is indicated by at least one column of the time domain resource allocation table.

Aspect 46: The method of any of aspects 31 through 45, wherein the downlink control information comprises a new data indicator equal to zero, and the downlink control information activates the semi-persistent scheduling configuration.

Aspect 47: The method of any of aspects 31 through 46, wherein the downlink control information comprises a new data indicator equal to one, and the physical downlink shared channel transmission comprises a retransmission of semi-persistently scheduled physical downlink shared channel scheduled by the downlink control information.

Aspect 48: The method of any of aspects 31 through 47, wherein the one or more instances of the physical downlink shared channel transmission are received in a different slot time period of a plurality of consecutive slot time periods.

Aspect 49: The method of any of aspects 31 through 48, wherein the downlink control information has a downlink control information format 1_1.

Aspect 50: The method of any of aspects 31 through 49, wherein the downlink control information has a downlink control information format 1_2.

Aspect 51: The method of any of aspects 31 through 50, wherein determining the repetition number based at least in part on the rule comprises: determining that the physical downlink shared channel configuration excludes a configuration of a first aggregation factor or the semi-persistent scheduling configuration excludes a configuration of a second aggregation factor, or both.

Aspect 52: A method for wireless communication at a base station, comprising: transmitting, to a UE, a semi-persistent scheduling configuration from a set of one or more semi-persistent scheduling configurations; configuring a repetition scheme for the UE; transmitting, to the UE, downlink control information associated with a physical downlink shared channel transmission for the semi-persistent scheduling configuration; configuring, within the downlink control information, an indication of a plurality of transmission configuration indicator states; and transmitting one or more repetitions of the physical downlink shared channel transmission to the UE based at least in part on the configured repetition scheme, or the plurality of transmission configuration indicator states, or a combination thereof.

Aspect 53: The method of aspect 52, wherein transmitting the one or more repetitions of the physical downlink shared channel transmission comprises: transmitting the one or more repetitions of the physical downlink shared channel transmission within a same slot time period, the slot time period occurring within each semi-persistent scheduling time period of a plurality of semi-persistent scheduling time periods.

Aspect 54: The method of any of aspects 52 through 53, wherein transmitting the one or more repetitions of the physical downlink shared channel transmission comprises: transmitting the one or more repetitions of the physical downlink shared channel transmission within a plurality of consecutive slot time periods occurring within each semi-persistent scheduling time period of a plurality of semi-persistent scheduling time periods, each slot time period of the plurality of consecutive slot time periods comprising two repetitions of the physical downlink shared channel transmission.

Aspect 55: The method of aspect 54, further comprising: configuring a first aggregation factor as part of the semi-persistent scheduling configuration, wherein a number of the plurality of consecutive slot time periods corresponds to a value of the first aggregation factor.

Aspect 56: The method of any of aspects 54 through 55, further comprising: configuring, based at least in part on the semi-persistent scheduling configuration excluding a configuration of a first aggregation factor, a second aggregation factor as part of a physical downlink shared channel configuration; and transmitting the physical downlink shared channel configuration to the UE, wherein a number of the plurality of consecutive slot time periods corresponds to a value of the second aggregation factor.

Aspect 57: The method of any of aspects 52 through 56, further comprising: transmitting an indication of the configured repetition scheme as part of the semi-persistent scheduling configuration.

Aspect 58: The method of any of aspects 52 through 57, further comprising: transmitting, to the UE, a physical downlink shared channel configuration comprising an indication of the configured repetition scheme, wherein the semi-persistent scheduling configuration excludes the indication of the configured repetition scheme.

Aspect 59: The method of any of aspects 52 through 58, wherein the plurality of transmission configuration indicator states comprises two transmission configuration indicator states.

Aspect 60: The method of any of aspects 52 through 59, wherein the configured repetition scheme is from the group consisting of a first frequency division multiplexing scheme, a second frequency division multiplexing scheme, and a time division multiplexing scheme.

Aspect 61: The method of any of aspects 52 through 60, wherein the downlink control information has a cyclic redundancy check that is scrambled by a configured scheduling radio network temporary identifier, the downlink control information comprising a new data indicator equal to zero, and the downlink control information activates the semi-persistent scheduling configuration.

Aspect 62: The method of any of aspects 52 through 61, further comprising: identifying a number of the one or more repetitions of a physical downlink shared channel based at least in part on the physical downlink shared channel excluding a configuration of a first aggregation factor or the semi-persistent scheduling configuration excluding a configuration of a second aggregation factor, or both.

Aspect 63: An apparatus for wireless communication at a UE, comprising a processor; memory coupled with the processor; and instructions stored in the memory and executable by the processor to cause the apparatus to perform a method of any of aspects 1 through 19.

Aspect 64: An apparatus for wireless communication at a UE, comprising at least one means for performing a method of any of aspects 1 through 19.

Aspect 65: A non-transitory computer-readable medium storing code for wireless communication at a UE, the code comprising instructions executable by a processor to perform a method of any of aspects 1 through 19.

Aspect 66: An apparatus for wireless communication at a UE, comprising a processor; memory coupled with the processor; and instructions stored in the memory and executable by the processor to cause the apparatus to perform a method of any of aspects 20 through 30.

Aspect 67: An apparatus for wireless communication at a UE, comprising at least one means for performing a method of any of aspects 20 through 30.

Aspect 68: A non-transitory computer-readable medium storing code for wireless communication at a UE, the code comprising instructions executable by a processor to perform a method of any of aspects 20 through 30.

Aspect 69: An apparatus for wireless communication at a base station, comprising a processor; memory coupled with the processor; and instructions stored in the memory and executable by the processor to cause the apparatus to perform a method of any of aspects 31 through 51.

Aspect 70: An apparatus for wireless communication at a base station, comprising at least one means for performing a method of any of aspects 31 through 51.

Aspect 71: A non-transitory computer-readable medium storing code for wireless communication at a base station, the code comprising instructions executable by a processor to perform a method of any of aspects 31 through 51.

Aspect 72: An apparatus for wireless communication at a base station, comprising a processor; memory coupled with the processor; and instructions stored in the memory and executable by the processor to cause the apparatus to perform a method of any of aspects 52 through 62.

Aspect 73: An apparatus for wireless communication at a base station, comprising at least one means for performing a method of any of aspects 52 through 62.

Aspect 74: A non-transitory computer-readable medium storing code for wireless communication at a base station, the code comprising instructions executable by a processor to perform a method of any of aspects 52 through 62.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
      receive a physical downlink shared channel configuration and a semi-persistent scheduling configuration;
      receive downlink control information that schedules a physical downlink shared channel transmission associated with the semi-persistent scheduling configuration;
      determine, based at least in part on a rule, a repetition number for a number of instances of the physical downlink shared channel transmission, wherein the rule is based at least in part on a time domain resource allocation entry indicated by the downlink control information and at least one of the physical downlink shared channel configuration or the semi-persistent scheduling configuration; and
      receive one or more instances of the physical downlink shared channel transmission in accordance with the repetition number.

2. The apparatus of claim 1, wherein the instructions to determine the repetition number based at least in part on the rule are further executable by the one or more processors to cause the apparatus to:
  determine that the physical downlink shared channel configuration excludes a configuration of a first aggregation factor or that the semi-persistent scheduling configuration excludes a configuration of a second aggregation factor, or a combination thereof.

3. The apparatus of claim 1, wherein the instructions to determine the repetition number based at least in part on the rule are further executable by the one or more processors to cause the apparatus to:
  determine that the time domain resource allocation entry indicated by the downlink control information includes the repetition number; and
  identify a number of repetitions of the physical downlink shared channel transmission based at least in part on a value of the repetition number, wherein two or more instances of the physical downlink shared channel transmission are received based at least in part on the number of repetitions.

4. The apparatus of claim 3, wherein the number of repetitions of the physical downlink shared channel transmission are within a time period that is less than or equal to a semi-persistent scheduling time period of a plurality of semi-persistent scheduling time periods.

5. The apparatus of claim 1, wherein the instructions to determine the repetition number based at least in part on the rule are further executable by the one or more processors to cause the apparatus to:
  determine that the time domain resource allocation entry indicated by the downlink control information excludes the repetition number; and
  determine that the number of instances of the physical downlink shared channel transmission is equal to one based at least in part on the time domain resource allocation entry excluding the repetition number, wherein a single instance of the physical downlink shared channel transmission is received based at least in part on the number of instances.

6. The apparatus of claim 1, wherein the instructions to determine the repetition number based at least in part on the rule are further executable by the one or more processors to cause the apparatus to:
  determine that the time domain resource allocation entry indicated by the downlink control information excludes the repetition number;
  identify, based at least in part on the time domain resource allocation entry excluding the repetition number, a configuration of a first aggregation factor from the semi-persistent scheduling configuration; and
  identify a number of repetitions of the physical downlink shared channel transmission corresponding to a value of the first aggregation factor, wherein two or more instances of the physical downlink shared channel transmission are received based at least in part on the number of repetitions.

7. The apparatus of claim 1, wherein the instructions to determine the repetition number based at least in part on the rule are further executable by the one or more processors to cause the apparatus to:
  determine that the time domain resource allocation entry indicated by the downlink control information excludes the repetition number;
  determine, based at least in part on the time domain resource allocation entry excluding the repetition number, that the semi-persistent scheduling configuration excludes a configuration of a first aggregation factor;
  identify, based at least in part on the semi-persistent scheduling configuration excluding the configuration of the first aggregation factor, a configuration of a second aggregation factor from the physical downlink shared channel configuration; and
  identify a number of repetitions of the physical downlink shared channel transmission corresponding to a value of the second aggregation factor, wherein two or more instances of the physical downlink shared channel transmission are received based at least in part on the number of repetitions.

8. The apparatus of claim 1, wherein the instructions to determine the repetition number based at least in part on the rule are further executable by the one or more processors to cause the apparatus to:
  determine that the time domain resource allocation entry indicated by the downlink control information excludes the repetition number;
  determine, based at least in part on the time domain resource allocation entry excluding the repetition number, that the semi-persistent scheduling configuration excludes a configuration of a first aggregation factor;
  determine, based at least in part on the semi-persistent scheduling configuration excluding the configuration of the first aggregation factor, that the physical downlink shared channel configuration excludes a configuration of a second aggregation factor; and
  determine that the number of instances of the physical downlink shared channel transmission is equal to one based at least in part on the time domain resource allocation entry excluding the repetition number, the semi-persistent scheduling configuration excluding the configuration of the first aggregation factor, and the physical downlink shared channel configuration excluding the configuration of the second aggregation factor, wherein a single instance of the physical downlink shared channel transmission is received based at least in part on the number of instances.

9. The apparatus of claim 1, wherein the instructions are further executable by the one or more processors to cause the apparatus to:
  identify, from the semi-persistent scheduling configuration, a configuration of a first aggregation factor; and
  identify a number of repetitions of the physical downlink shared channel transmission corresponding to a value of the first aggregation factor, wherein two or more instances of the physical downlink shared channel transmission are received based at least in part on the number of repetitions.

10. The apparatus of claim 1, wherein the instructions are further executable by the one or more processors to cause the apparatus to:
  determine that the semi-persistent scheduling configuration excludes a configuration of a first aggregation factor;
  identify, based at least in part on the semi-persistent scheduling configuration excluding the configuration of the first aggregation factor, a configuration of a second aggregation factor from the physical downlink shared channel configuration; and
  identify a number of repetitions of the physical downlink shared channel transmission corresponding to a value of the second aggregation factor, wherein two or more instances of the physical downlink shared channel transmission are received based at least in part on the number of repetitions.

11. The apparatus of claim 1, wherein the instructions are further executable by the one or more processors to cause the apparatus to:
determine that the semi-persistent scheduling configuration excludes a configuration of a first aggregation factor;
determine, based at least in part on the semi-persistent scheduling configuration excluding the configuration of the first aggregation factor, that the physical downlink shared channel configuration excludes a configuration of a second aggregation factor; and
determine that the number of instances of the physical downlink shared channel transmission is equal to one based at least in part on the semi-persistent scheduling configuration excluding the configuration of the first aggregation factor and the physical downlink shared channel configuration excluding the configuration of the second aggregation factor, wherein a single instance of the physical downlink shared channel transmission is received based at least in part on the number of instances.

12. The apparatus of claim 1, wherein the instructions are further executable by the one or more processors to cause the apparatus to:
identify, from the physical downlink shared channel configuration, a configuration of a first aggregation factor; and
identify a number of repetitions of the physical downlink shared channel transmission corresponding to a value of the first aggregation factor, wherein two or more instances of the physical downlink shared channel transmission are received based at least in part on the number of repetitions.

13. The apparatus of claim 1, wherein the instructions are further executable by the one or more processors to cause the apparatus to:
determine that the number of instances of the physical downlink shared channel transmission is equal to one based at least in part on the physical downlink shared channel configuration excluding a configuration of a first aggregation factor, wherein a single instance of the physical downlink shared channel transmission is received based at least in part on the number of instances.

14. The apparatus of claim 1, wherein the instructions are further executable by the one or more processors to cause the apparatus to:
receive a configuration of a time domain resource allocation table via radio resource control signaling, wherein the time domain resource allocation table comprises a plurality of time domain resource allocation entries, and wherein at least one time domain resource allocation entry of the plurality of time domain resource allocation entries includes the repetition number indicated by at least one column of the time domain resource allocation table.

15. The apparatus of claim 1, wherein the downlink control information has a cyclic redundancy check that is scrambled by a configured scheduling radio network temporary identifier, the downlink control information comprising a new data indicator equal to zero, and wherein the downlink control information activates the semi-persistent scheduling configuration.

16. The apparatus of claim 1, wherein the downlink control information has a cyclic redundancy check that is scrambled by a configured scheduling radio network temporary identifier, the downlink control information comprising a new data indicator equal to one, and wherein the physical downlink shared channel transmission comprises a retransmission of semi-persistently scheduled physical downlink shared channel scheduled by the downlink control information.

17. The apparatus of claim 1, wherein the one or more instances of the physical downlink shared channel transmission are received in a different slot time period of a plurality of consecutive slot time periods.

18. The apparatus of claim 1, wherein the downlink control information has a downlink control information format 1_1 or 1_2.

19. An apparatus for wireless communication at a user equipment (UE), comprising:
one or more processors;
one or more memories coupled with the one or more processors; and
instructions stored in the one or more memories and executable by the one or more processors to cause the apparatus to:
receive a semi-persistent scheduling configuration;
receive downlink control information that schedules a physical downlink shared channel transmission associated with the semi-persistent scheduling configuration and includes an indication of one or more transmission configuration indicator states; and
receive one or more repetitions of the physical downlink shared channel transmission based at least in part on an identified repetition scheme configuration and the one or more transmission configuration indicator states, the one or more repetitions corresponding to respective transmission occasions having non-overlapping time domain resource allocations within a same slot.

20. A method for wireless communications at a user equipment (UE), comprising:
receiving a physical downlink shared channel configuration and a semi-persistent scheduling configuration;
receiving downlink control information that schedules a physical downlink shared channel transmission associated with the semi-persistent scheduling configuration;
determining, based at least in part on a rule, a repetition number for a number of instances of the physical downlink shared channel transmission, wherein the rule is based at least in part on a time domain resource allocation entry indicated by the downlink control information and at least one of the physical downlink shared channel configuration or the semi-persistent scheduling configuration; and
receiving one or more instances of the physical downlink shared channel transmission in accordance with the repetition number.

* * * * *